US011343489B2

(12) United States Patent
Kang et al.

(10) Patent No.: US 11,343,489 B2
(45) Date of Patent: May 24, 2022

(54) METHOD AND APPARATUS FOR ENCODING/DECODING IMAGE USING GEOMETRICALLY MODIFIED REFERENCE PICTURE

(71) Applicants: Electronics and Telecommunications Research Institute, Daejeon (KR); UNIVERSITY-INDUSTRY COOPERATION GROUP OF KYUNG HEE UNIVERSITY, Yongin-si (KR)

(72) Inventors: Jung Won Kang, Daejeon (KR); Ha Hyun Lee, Seoul (KR); Sung Chang Lim, Daejeon (KR); Jin Ho Lee, Daejeon (KR); Hui Yong Kim, Daejeon (KR); Gwang Hoon Park, Seongnam-si (KR); Tae Hyun Kim, Hwaseong-si (KR); Dae Young Lee, Ansan-si (KR)

(73) Assignees: Electronics and Telecommunications Research Institute, Daejeon (KR); UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 0 days.

(21) Appl. No.: 16/982,493

(22) PCT Filed: Mar. 18, 2019

(86) PCT No.: PCT/KR2019/003129
§ 371 (c)(1),
(2) Date: Sep. 18, 2020

(87) PCT Pub. No.: WO2019/182312
PCT Pub. Date: Sep. 26, 2019

(65) Prior Publication Data
US 2021/0021810 A1    Jan. 21, 2021

(30) Foreign Application Priority Data

Mar. 19, 2018    (KR) .................. 10-2018-0031401
Mar. 19, 2018    (KR) .................. 10-2018-0031402
Mar. 19, 2018    (KR) .................. 10-2018-0031403

(51) Int. Cl.
*H04N 19/00*    (2014.01)
*H04N 19/105*    (2014.01)
(Continued)

(52) U.S. Cl.
CPC ......... *H04N 19/105* (2014.11); *H04N 19/159* (2014.11); *H04N 19/176* (2014.11); *H04N 19/61* (2014.11)

(58) Field of Classification Search
CPC ..................................................... H04N 19/00
See application file for complete search history.

(56) References Cited

U.S. PATENT DOCUMENTS 6,954,502 B2    10/2005    Lainema
9,838,691 B2    12/2017    Lim et al.
(Continued)

FOREIGN PATENT DOCUMENTS

KR    100728032 B1    6/2007
KR    100772576 B1    11/2007
(Continued)

*Primary Examiner* — Maryam A Nasri
(74) *Attorney, Agent, or Firm* — William Park & Associates Ltd.

(57) ABSTRACT

There is provided an image encoding/decoding method and apparatus. The image encoding method of the present invention includes: generating at least one candidate block including warped reference picture (WRP) Flag information in an advanced motion vector prediction (AMVP) mode; con-
(Continued)

structing a candidate list including the at least one candidate block; and generating a prediction block of a current block based on the candidate list.

18 Claims, 65 Drawing Sheets

(51) Int. Cl.
*H04N 19/159* (2014.01)
*H04N 19/176* (2014.01)
*H04N 19/61* (2014.01)

(56) References Cited

U.S. PATENT DOCUMENTS

| | | | |
|---|---|---|---|
| 9,843,803 | B2 | 12/2017 | Lim et al. |
| 2012/0314027 | A1* | 12/2012 | Tian ................. H04N 19/172 |
| | | | 348/43 |
| 2015/0229967 | A1 | 8/2015 | Lee |
| 2020/0169746 | A1 | 5/2020 | Jeong et al. |
| 2020/0275092 | A1 | 8/2020 | Kang et al. |

FOREIGN PATENT DOCUMENTS

| | | | |
|---|---|---|---|
| KR | 1020130028633 | A | 3/2013 |
| KR | 1020140034053 | A | 3/2014 |
| KR | 1020170059423 | A | 5/2017 |
| KR | 1020170078672 | A | 7/2017 |
| WO | 2018048904 | A1 | 3/2018 |

* cited by examiner (a) temporally/spatially adjacent block of AMVP (b) constructing motion vector and WRP Flag of temporally/spatially adjacent block of AMVP (c) constructing candidate list of existing AMVP (d) constructing candidate list of AMVP including WRP Flag (a) spatial candidate of AMVP (b) temporal candidate of AMVP

| candidate | $A_0$ | $B_1$ |
|---|---|---|
| motion vector | (5,3) | (6,4) |

(c) example of candidate list of AMVP

| candidate | $A_0$ | $B_1$ |
|---|---|---|
| motion vector | (5,3) | (6,4) |
| WRP Flag | True | False |

(d) example of candidate list of AMVP including WRP Flag

FIG. 17

(a) example of candidate list of AMVP (b) example of candidate list of AMVP including WRP Flag

FIG. 18

| candidate | $A_0$ | $B_1$ | H | $Z_0$ | $Z_1$ |
|---|---|---|---|---|---|
| motion vector | (5,3) | (6,4) | (3,3) | (0,0) | (0,0) |

(a) filling AMVP zero vector candidates

| candidate | $A_0$ | $B_1$ | H | $A_0'$ | $B_1'$ |
|---|---|---|---|---|---|
| motion vector | (5,3) | (6,4) | (3,3) | (5,3) | (6,4) |
| WRP Flag | True | False | True | False | True |

(b) filling candidates by inverting WRP Flag

| candidate | $A_0$ | $B_1$ | H | $Z_0$ | $Z_1$ |
|---|---|---|---|---|---|
| motion vector | (5,3) | (6,4) | (3,3) | (0,0) | (0,0) |
| WRP Flag | True | False | True | True | False |

(c) filling zero vector candidates by setting WRP Flag to be different (a) spatial candidate of merge mode    (b) temporal candidate of merge mode (a) example of searching for temporal/spatial candidate of merge mode (b) example of candidate list in which the number of filled candidates is insufficient (c) example of filling candidates by changing WRP Flag of spatial candidate

FIG. 29B

☐ : temporal/spatial merge candidate

▨ : empty space in candidate list

▩ : point where value of WRP Flag is changed

| candidate | | $A_0$ | $B_0$ | | | |
|---|---|---|---|---|---|---|
| motion information of L0 merge candidate | motion vector | (5,3) | (6,4) | | | |
| | reference picture number | 1 | 2 | | | |
| WRP Flag of L0 merge candidate | | True | False | | | |
| motion information of L1 merge candidate | motion vector | (2,1) | (4,3) | | | |
| | reference picture number | 0 | 1 | | | |
| WRP Flag of L1 merge candidate | | False | True | | | |

FIG. 29C

| candidate | | $A_0$ | $B_0$ | $A_{1-0}$ | $A_{1-1}$ | $A_{1-2}$ |
|---|---|---|---|---|---|---|
| motion information of L0 merge candidate | motion vector | (5,3) | (6,4) | (5,3) | (5,3) | (5,3) |
| | reference picture number | 1 | 2 | 1 | 1 | 1 |
| WRP Flag of L0 merge candidate | | True | False | False | True | False |
| motion information of L1 merge candidate | motion vector | (2,1) | (4,3) | (2,1) | (2,1) | (2,1) |
| | reference picture number | 0 | 1 | 0 | 0 | 0 |
| WRP Flag of L1 merge candidate | | False | True | False | True | True |

FIG. 29D

| candidate generated by changing WRP Flag | | $A_{1-0}$ | $A_{1-1}$ | $A_{1-2}$ | $B_{0-0}$ | $B_{0-1}$ | $B_{0-2}$ |
|---|---|---|---|---|---|---|---|
| motion information of L0 merge candidate | motion vector | (5,3) | (5,3) | (5,3) | (6,4) | (6,4) | (6,4) |
| | reference picture number | 1 | 1 | 1 | 2 | 2 | 2 |
| WRP Flag of L0 merge candidate | | False | True | False | True | False | True |
| motion information of L1 merge candidate | motion vector | (2,1) | (2,1) | (2,1) | (4,3) | (4,3) | (4,3) |
| | reference picture number | 0 | 0 | 0 | 1 | 1 | 1 |
| WRP Flag of L1 merge candidate | | False | True | True | True | False | False |

↓ selection

| candidate | | $A_1$ | $B_0$ | $A_{1-0}$ | $A_{1-1}$ | $B_{0-2}$ |
|---|---|---|---|---|---|---|
| motion information of L0 merge candidate | motion vector | (5,3) | (6,4) | (5,3) | (5,3) | (6,4) |
| | reference picture number | 1 | 2 | 1 | 1 | 2 |
| WRP Flag of L0 merge candidate | | True | False | False | True | False |
| motion information of L1 merge candidate | motion vector | (2,1) | (4,3) | (2,1) | (2,1) | (4,3) |
| | reference picture number | 0 | 1 | 0 | 0 | 1 |
| WRP Flag of L1 merge candidate | | False | True | False | True | False |

(a) example of searching for temporal/spatial candidate of merge mode (b) example of candidate list in which the number of filled candidates is insufficient (c) example of filling candidates by changing WRP Flag of temporal candidate

FIG. 31A

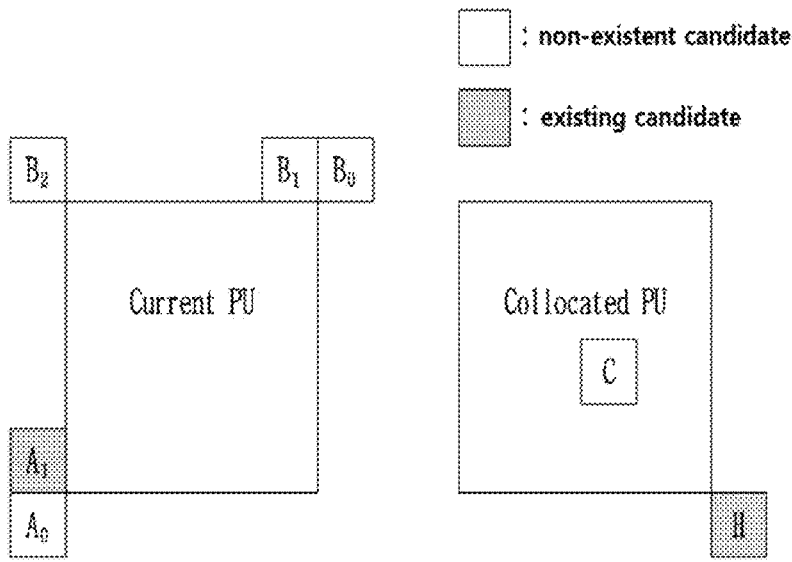

(a) example of searching for temporal/spatial candidate of merge mode

| candidate | | $A_1$ | H | | | |
|---|---|---|---|---|---|---|
| motion information of L0 merge candidate | motion vector | (5,3) | (6,4) | | | |
| | reference picture number | 1 | 2 | | | |
| WRP Flag of L0 merge candidate | | True | False | | | |
| motion information of L1 merge candidate | motion vector | (2,1) | (4,3) | | | |
| | reference picture number | 0 | 1 | | | |
| WRP Flag of L1 merge candidate | | False | True | | | |

(b) example of candidate list in which the number of filled candidates is insufficient

FIG. 31B

| candidate | | $A_1$ | H | H-0 | H-1 | H-2 |
|---|---|---|---|---|---|---|
| motion information of L0 merge candidate | motion vector | (5,3) | (6,4) | (6,4) | (6,4) | (6,4) |
| | reference picture number | 1 | 2 | 2 | 2 | 2 |
| WRP Flag of L0 merge candidate | | True | False | True | False | True |
| motion information of L1 merge candidate | motion vector | (2,1) | (4,3) | (4,3) | (4,3) | (4,3) |
| | reference picture number | 0 | 1 | 1 | 1 | 1 |
| WRP Flag of L1 merge candidate | | False | True | True | False | False |

FIG. 33B

☐ : temporal/spatial merge candidate

▨ : empty space in candidate list

▩ : point where value of WRP Flag is changed

| candidate | | $A_1$ | $B_0$ | C | | |
|---|---|---|---|---|---|---|
| motion information of L0 merge candidate | motion vector | (4,3) | (8,2) | (4,3) | | |
| | reference picture number | 1 | 2 | 1 | | |
| WRP Flag of L0 merge candidate | | True | False | False | | |
| motion information of L1 merge candidate | motion vector | (2,1) | (3,6) | (3,6) | | |
| | reference picture number | 0 | 1 | 1 | | |
| WRP Flag of L1 merge candidate | | False | True | True | | |

| candidate | | $A_1$ | $B_0$ | C-2 |
|---|---|---|---|---|
| motion information of L0 merge candidate | motion vector | (4,3) | (8,2) | (4,3) |
| | reference picture number | 1 | 2 | 1 |
| WRP Flag of L0 merge candidate | | True | False | False |
| motion information of L1 merge candidate | motion vector | (2,1) | (3,6) | (3,6) |
| | reference picture number | 0 | 1 | 1 |
| WRP Flag of L1 merge candidate | | False | True | False | replaced candidate

FIG. 34

| candidate generated by changing WRP Flag | | Z0 | Z1 | Z2 | Z3 |
|---|---|---|---|---|---|
| motion information of L0 merge candidate | motion vector | (0,0) | (0,0) | (0,0) | (0,0) |
| | reference picture number | 0 | 0 | 0 | 0 |
| WRP Flag of L0 merge candidate | | True | True | False | False |
| motion information of L1 merge candidate | motion vector | (0,0) | (0,0) | (0,0) | (0,0) |
| | reference picture number | 0 | 0 | 0 | 0 |
| WRP Flag of L1 merge candidate | | True | False | True | False |

(a) example of inter prediction information construction of existing encoder/decoder (b) example of inter prediction information construction of encoder/decoder using geometric transform picture

METHOD AND APPARATUS FOR ENCODING/DECODING IMAGE USING GEOMETRICALLY MODIFIED REFERENCE PICTURE

TECHNICAL FIELD

The present invention relates to a video encoding/decoding method, a video encoding/decoding apparatus, and a recording medium storing a bitstream. More particularly, the present invention relates to a video encoding/decoding method and apparatus based on a geometric transform reference picture.

BACKGROUND ART

Recently, broadcasting services with Ultra High Definition (UHD) resolution (3840×2160) have been expanded not only in Korea but also over the world. Now, many users are getting accustomed to high resolution and ultra high resolution video, and therefore, many organizations are accelerating the development of next-generation imaging devices. Moving Picture Experts Group (MPEG) and Video Coding Experts Group (VCEG) jointly established the Joint Collaborative Team on Video Coding (JCT-VC) and completed in 2001 the standardization of a High Efficiency Video Coding (HEVC)/H.265 which is a next generation video codec having a compression efficiency twice as high as H.264/AVC.

DISCLOSURE

Technical Problem

An object of the present invention is to provide a video encoding/decoding method and apparatus using a geometric transform reference picture.

In addition, it is another object of the present invention to provide a video encoding/decoding method and apparatus using WRP Flag information in AMVP candidate generation.

In addition, it is another object of the present invention to provide a video encoding/decoding method and apparatus using WRP Flag information when a merge candidate is generated.

Technical Solution

A video encoding method according to the present invention, the method may comprise generating at least one candidate block including warped reference picture (WRP) Flag information in an advanced motion vector prediction (AMVP) mode; constructing a candidate list including the at least one candidate block; and generating a prediction block of a current block based on the candidate list.

In the video encoding method according to the present invention, wherein the constructing of the candidate list includes: comparing the WRP Flag information between candidate blocks having same motion information.

In the video encoding method according to the present invention, wherein the constructing of the candidate list includes: determining whether a candidate block and the current block refers to a WRP.

In the video encoding method according to the present invention, wherein the constructing of the candidate list includes: determining a priority among candidate blocks based on the WRP Flag information of the current block.

In the video encoding method according to the present invention, wherein the constructing of the candidate list includes: generating a new candidate block by changing a WRP Flag value of the at least one generated candidate block.

In the video encoding method according to the present invention, wherein the constructing of the candidate list includes: when there is a zero vector candidate in the candidate list, generating a new zero vector candidate by changing a WRP Flag value of the zero vector candidate.

In the video encoding method according to the present invention, wherein the constructing of the candidate list includes: when WRP Flag values of the candidate block and the current block are the same, not performing motion information scaling.

Also, a video decoding method according to the present invention, the method may comprise generating at least one candidate block including warped reference picture (WRP) Flag information in an advanced motion vector prediction (AMVP) mode; constructing a candidate list including the at least one candidate block; and generating a prediction block of a current block based on the candidate list.

In the video decoding method according to the present invention, wherein the constructing of the candidate list includes: comparing the WRP Flag information between candidate blocks having same motion information.

In the video decoding method according to the present invention, wherein the constructing of the candidate list includes: determining whether a candidate block and the current block refers to a WRP.

In the video decoding method according to the present invention, wherein the constructing of the candidate list includes: determining a priority among candidate blocks based on the WRP Flag information of the current block.

In the video decoding method according to the present invention, wherein the constructing of the candidate list includes: generating a new candidate block by changing a WRP Flag value of the at least one generated candidate block.

In the video decoding method according to the present invention, wherein the constructing of the candidate list includes: when there is a zero vector candidate in the candidate list, generating a new zero vector candidate by changing a WRP Flag value of the zero vector candidate.

In the video decoding method according to the present invention, wherein the constructing of the candidate list includes: when WRP Flag values of the candidate block and the current block are the same, not performing motion information scaling.

Also, a computer-readable recording medium according to the present invention may store a bitstream generated by a video encoding method according to the present invention.

Also, a video encoding method according to the present invention, the method may comprise generating at least one candidate block including warped reference picture (WRP) Flag information in a merge mode; constructing a candidate list including the at least one candidate block; and generating a prediction block of a current block based on the candidate list.

In the video encoding method according to the present invention, wherein the constructing of the candidate list includes: generating a new candidate block by changing a WRP Flag value of the at least one generated candidate block.

Also, a video decoding method according to the present invention, the method may comprise generating at least one candidate block including warped reference picture (WRP)

Flag information in a merge mode; constructing a candidate list including the at least one candidate block; and generating a prediction block of a current block based on the candidate list.

In the video decoding method according to the present invention, wherein the constructing of the candidate list includes: generating a new candidate block by changing a WRP Flag value of the at least one generated candidate block.

Advantageous Effects

According to the present invention, a video encoding/decoding method and an apparatus using a geometric transform reference picture can be provided.

In addition, according to the present invention, it is possible to provide a video encoding/decoding method and apparatus using WRP Flag information when an AMVP candidate is generated.

In addition, according to the present invention, it is possible to provide a video encoding/decoding method and apparatus using WRP Flag information when a merge candidate is generated.

DESCRIPTION OF DRAWINGS

FIG. 17 is a diagram illustrating an example in which candidates are not removed from a candidate list through comparison of WRP Flags according to an embodiment of the present invention.

FIG. 18 is a diagram illustrating a candidate expansion process by setting a WRP Flag according to an embodiment of the present invention.

FIGS. 29A to 29D are diagrams illustrating a process of generating a merge candidate having bidirectional motion information by changing a WRP Flag of a spatial candidate according to an embodiment of the present invention.

FIGS. 31A and 31B are diagrams illustrating a process of generating a merge candidate having bidirectional motion information by changing a WRP Flag of a temporal candidate according to an embodiment of the present invention.

FIGS. 33A to 33F are diagrams illustrating a process of generating a candidate by changing a WRP Flag of a combined list merge candidate according to an embodiment of the present invention.

FIG. 34 is a diagram illustrating a process of generating zero vector candidates that have the same motion information but are different from each other by changing the WRP Flag according to an embodiment of the present invention.

MODE FOR INVENTION

Figure 1:
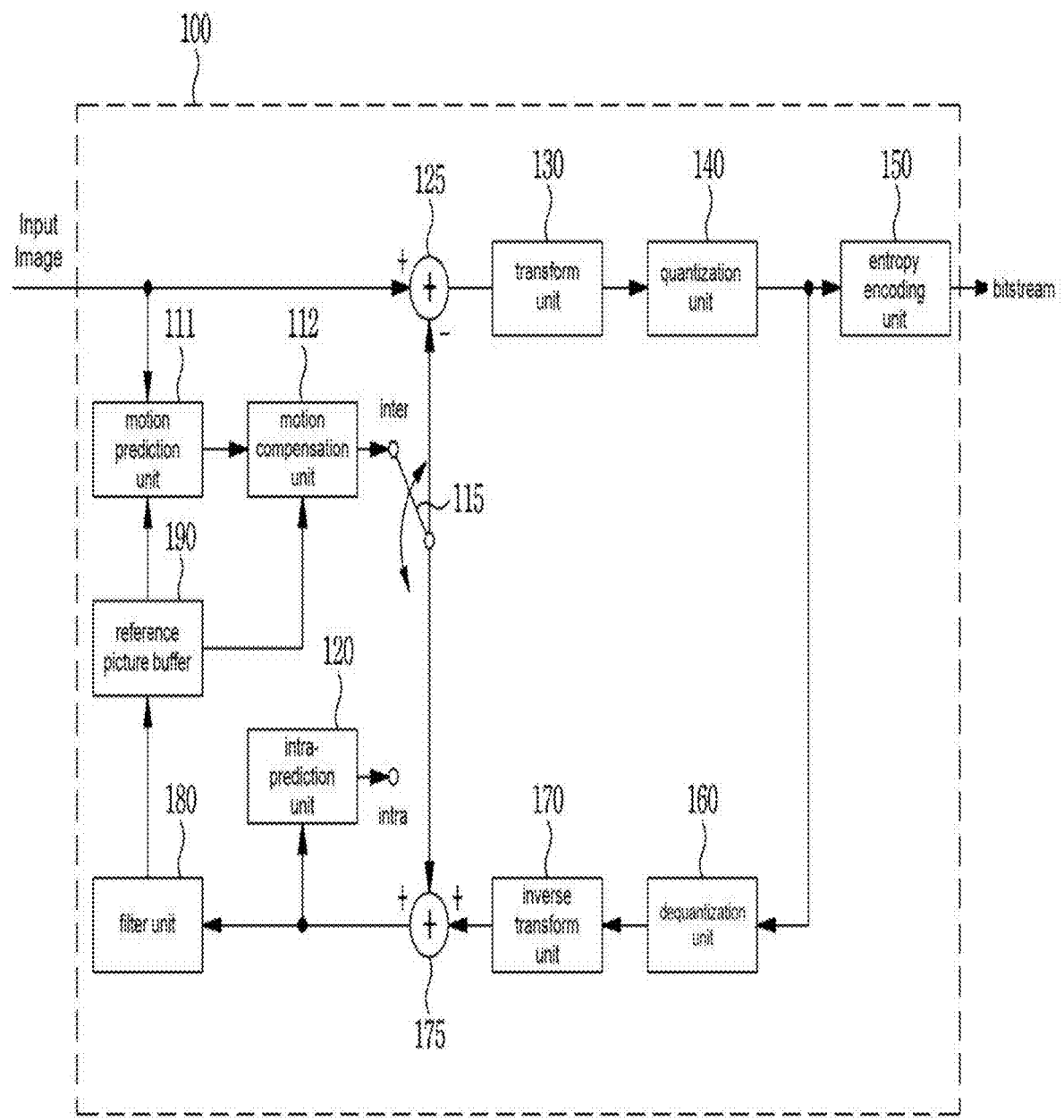
FIG. 1 is a block diagram illustrating a configuration of an encoding apparatus to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

DESCRIPTION OF TERMS

Encoder: means an apparatus performing encoding. That is, means an encoding apparatus.

Decoder: means an apparatus performing decoding. That is, means an decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to 2 Bd-1 according to a bit depth (Bd). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quaternary-tree.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node(Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, a inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a residual of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level(quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode(intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary(first) transform is used, information of whether or not a secondary transform is used, a primary transform index, a secondary transform index, information of whether or not a residual signal is present, a coded block pattern, a coded block flag(CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
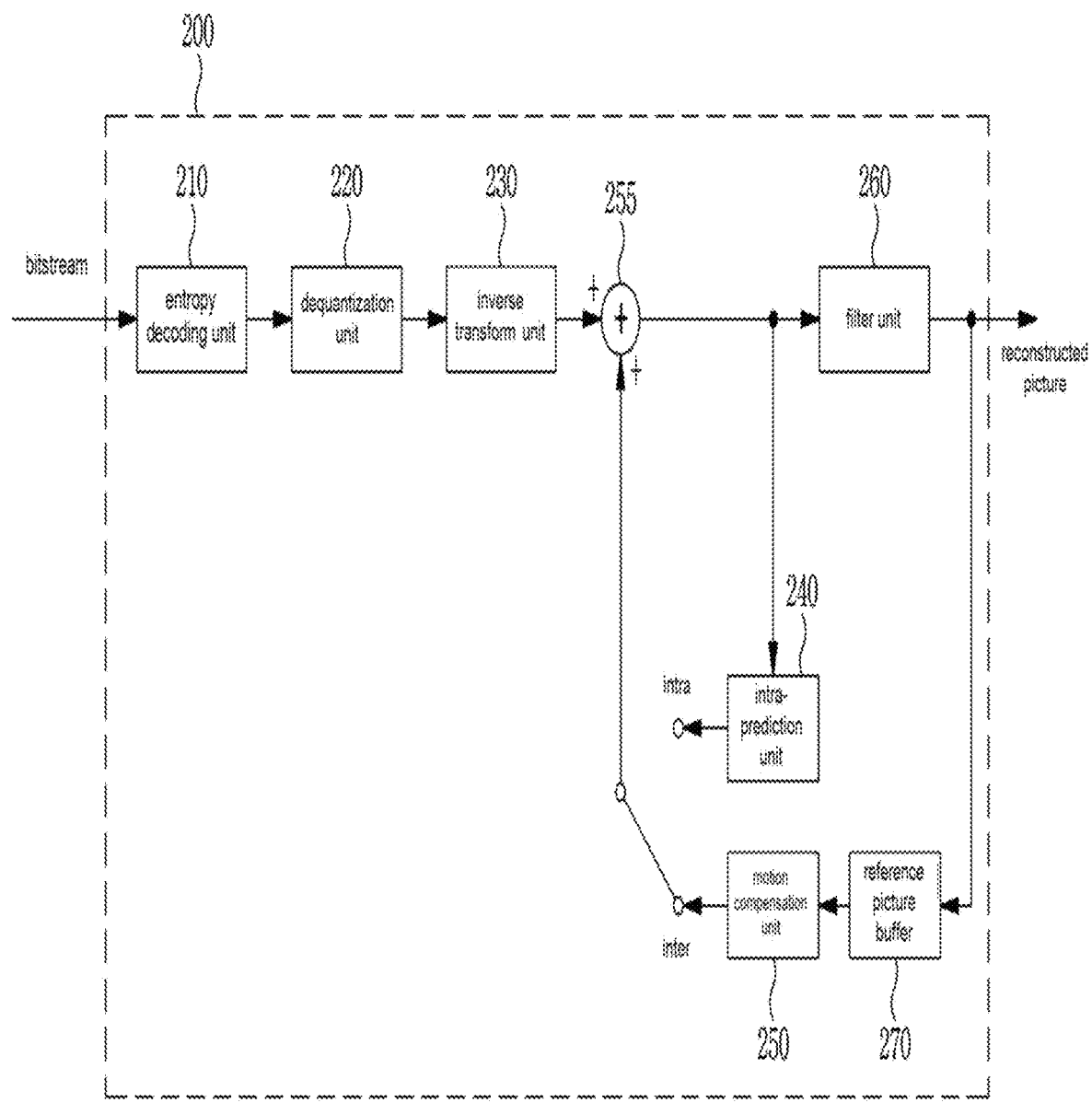
FIG. 2 is a block diagram illustrating a configuration of a decoding apparatus to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, a inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be a inverse-process of the entropy encoding method described above.

In order to decode a transform coefficient level(quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
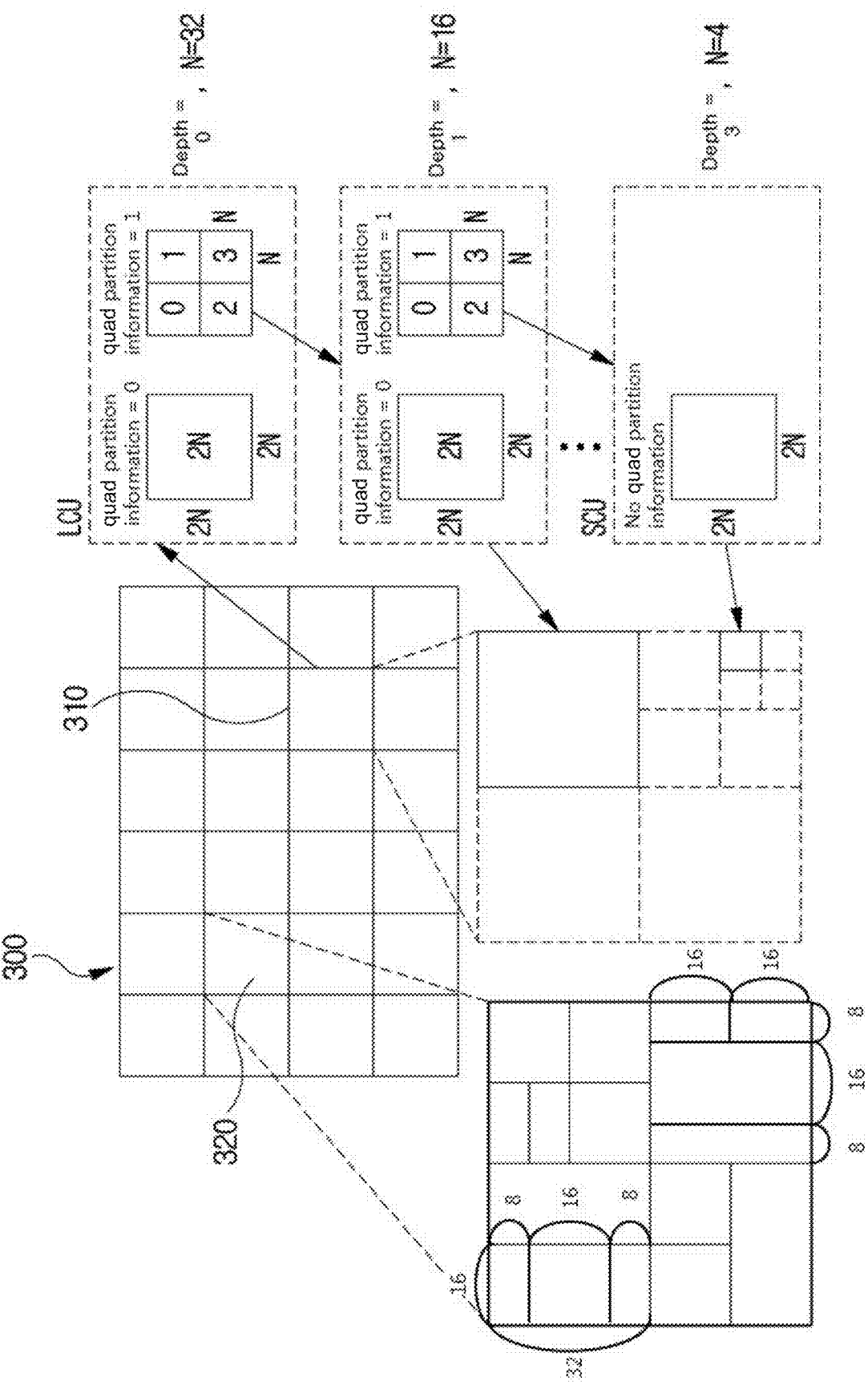
FIG. 3 is a diagram schematically illustrating a partition structure of a video when encoding and decoding a video.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
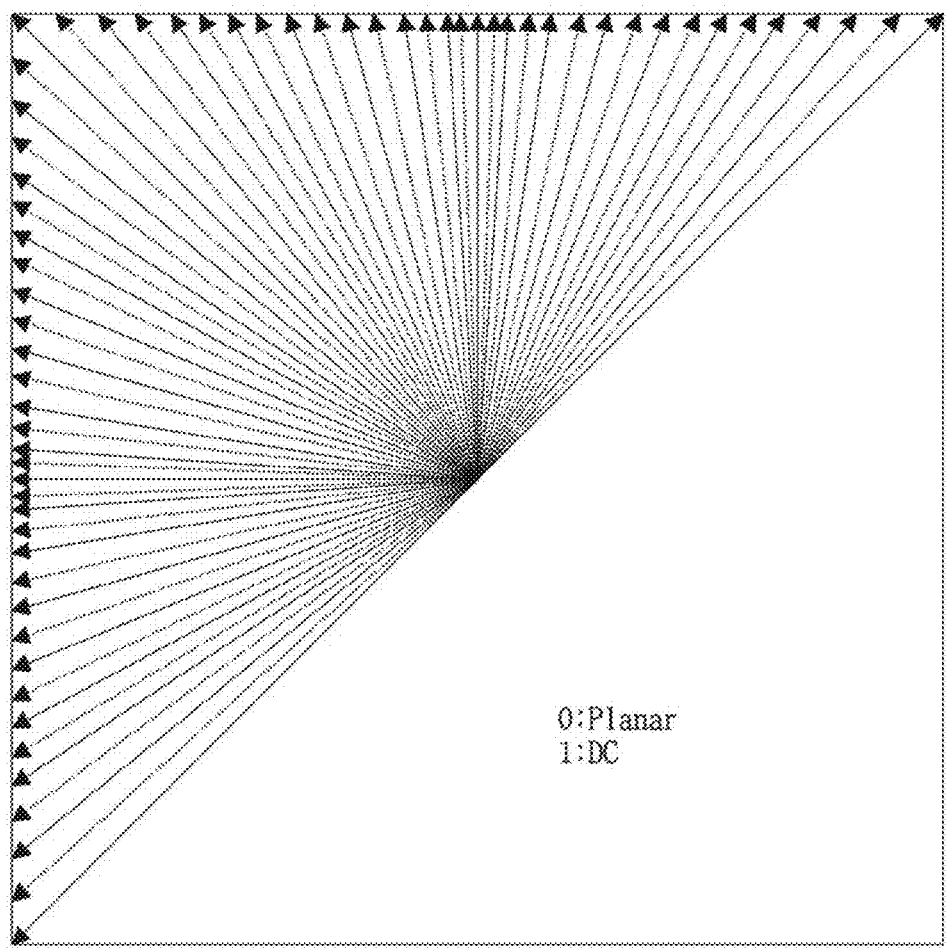
FIG. 4 is a diagram illustrating an embodiment of an intra prediction process.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode.

In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
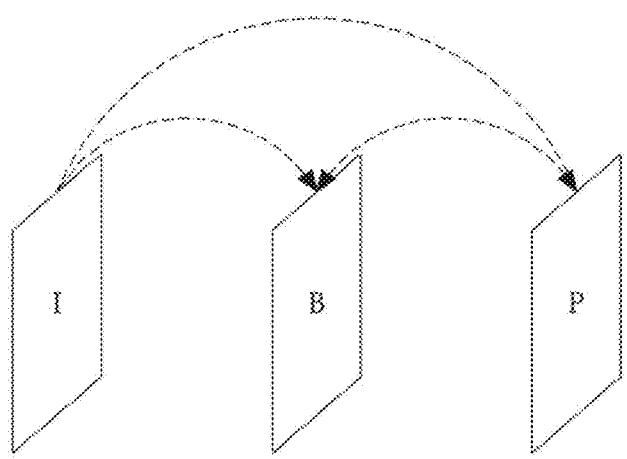
FIG. 5 is a diagram illustrating an embodiment of an inter prediction process.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

A method of deriving the motion information of the current block may vary depending on a prediction mode of the current block. For example, as prediction modes for inter-picture prediction, there may be an AMVP mode, a merge mode, a skip mode, a current picture reference mode, etc. The merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least either one of the zero merge candidate and new motion information that is a combination of the motion information (spatial merge candidate) of one neighboring block adjacent to the current block, the motion information (temporal merge candidate) of the collocated block of the current block, which is included within the reference picture, and the motion information exiting in the merge candidate list.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The current picture reference mode may mean a prediction mode in which a previously reconstructed region within a current picture to which the current block belongs is used for prediction. Here, a vector may be used to specify the previously-reconstructed region. Information indicating whether the current block is to be encoded in the current picture reference mode may be encoded by using the reference picture index of the current block. The flag or index indicating whether or not the current block is a block encoded in the current picture reference mode may be signaled, and may be deduced based on the reference picture index of the current block. In the case where the current block is encoded in the current picture reference mode, the current picture may be added to the reference picture list for the current block so as to be located at a fixed position or a random position in the reference picture list. The fixed position may be, for example, a position indicated by a reference picture index of 0, or the last position in the list. When the current picture is added to the reference picture list so as to be located at the random position, the reference picture index indicating the random position may be signaled.

Figure 6:
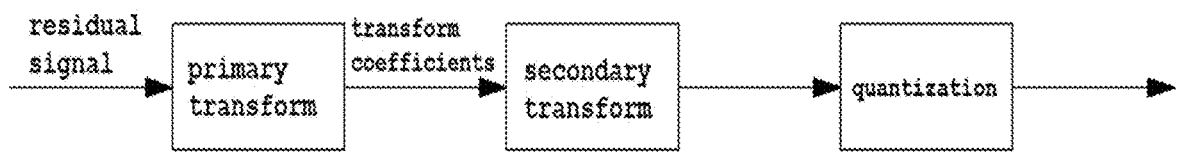
FIG. 6 is a diagram illustrating a process of transform and quantization.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loève transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, the transform scheme may be determined through signaling of transform information.

Since the residual signal is quantized through the primary transform and the secondary transform, a quantized-level signal (quantization coefficients) is generated. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block foil through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

In the prior art, a method of enhancing the coding efficiency of a video by removing intra or inter redundancy is used. Prediction through information with similarity is used to remove intra or inter redundancy. In the case of the inter prediction, the fact that the degree of similarity between the current picture and the reference picture is high is utilized. The reference picture can mean a picture reconstructed by completing encoding and then performing decoding back before the current picture. Information on encoding modes such as a pixel value of a current image, a motion vector, and a reference picture number is predicted from the reference picture through inter prediction, whereby only difference values between the reference pictures and the current picture performing encoding or decoding for the pixel value and encoding modes may be encoded. In this case, the smaller the difference between the reference information used for prediction and a video information value of the current decoded area, the higher the prediction accuracy and the coding efficiency.

An advanced motion vector prediction (AMVP) mode may be used to encode motion information of the current block using motion information of neighboring blocks. The AMVP mode is to use a difference between motion information of a candidate block and motion information of a current prediction unit (PU) (hereinafter, referred to as "PU"), and is a method of predicting the current block using the candidate block.

The merge mode may be used to encode motion information of a current block using motion information of neighboring blocks. The merge mode is to use the motion information of a candidate block as motion information of a current prediction unit (PU), and a method of predicting the current block using the candidate block.

Of the encoding modes, motion information occupies the largest proportion. The motion information includes information such as a motion vector, a reference image number, and a reference direction, and is transmitted in units of PU.

Figure 7:
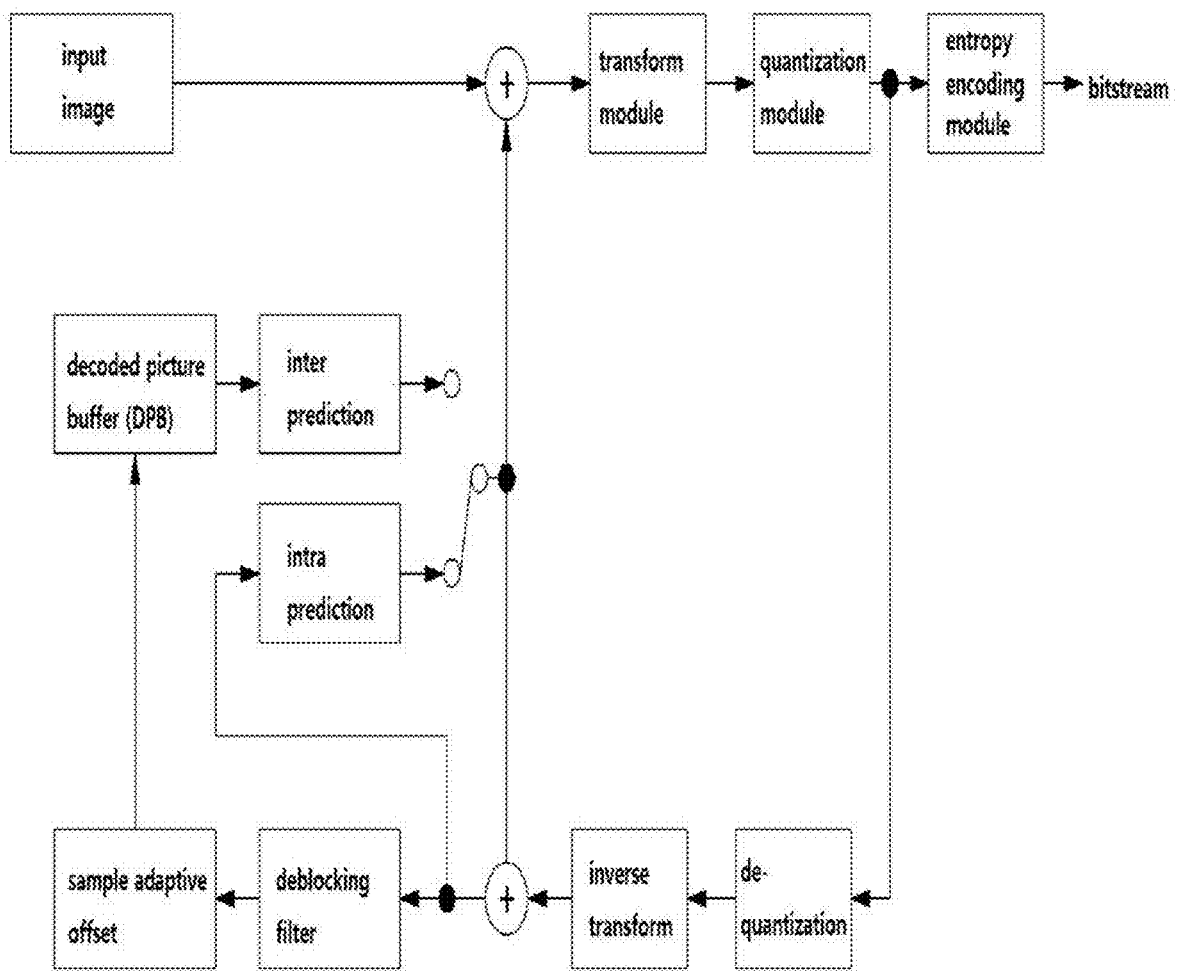
FIG. 7 is a diagram illustrating a system structure of an HEVC/H.265 encoder according to an embodiment of the present invention.

Generally, a video has information having a lot of redundancy in the screen, and in the case of moving picture, there is also a feature that there is a lot of redundancy between screens. Therefore, when the information of the image is expressed by any symbol that may be distinguished from each other, the occurrence frequency of the symbol may be biased. Entropy coding is one of techniques of moving picture coding using these characteristics. Entropy coding is an encoding method that considers the frequency of occurrence of information symbols, in which symbols with a high frequency of occurrence are expressed with a small size code and symbols with a low frequency of occurrence are expressed with a large size code, thereby increasing the coding efficiency. FIG. 7 is a diagram illustrating a system structure of an HEVC/H.265 encoder according to an embodiment of the present invention.

Hereinafter, a moving picture coding using global motion information will be described below.

Generally, a moving picture has a global movement and a local movement according to the flow of time in the moving picture. The global movement means motion with the same tendency throughout the whole image. The global movement may be caused by camera work or common movements throughout the shooting area.

FIGS. 8a to 8d are diagrams illustrating generation of global motion according to movement of a camera according to an embodiment of the present invention.

Figure 8A:
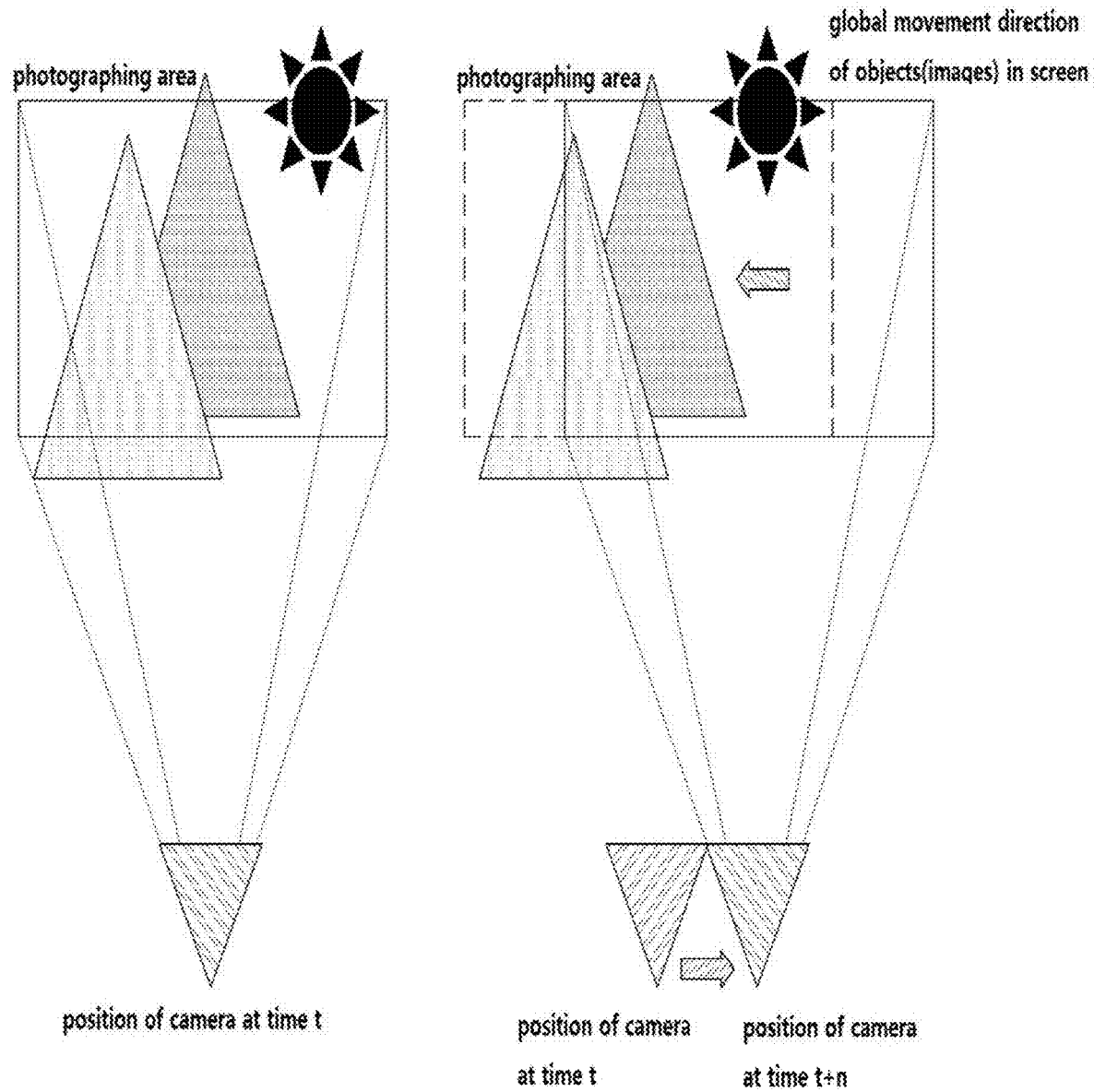
FIGS. 8A to 8D are diagrams illustrating generation of global motion according to movement of a camera according to an embodiment of the present invention.
Figure 8B:
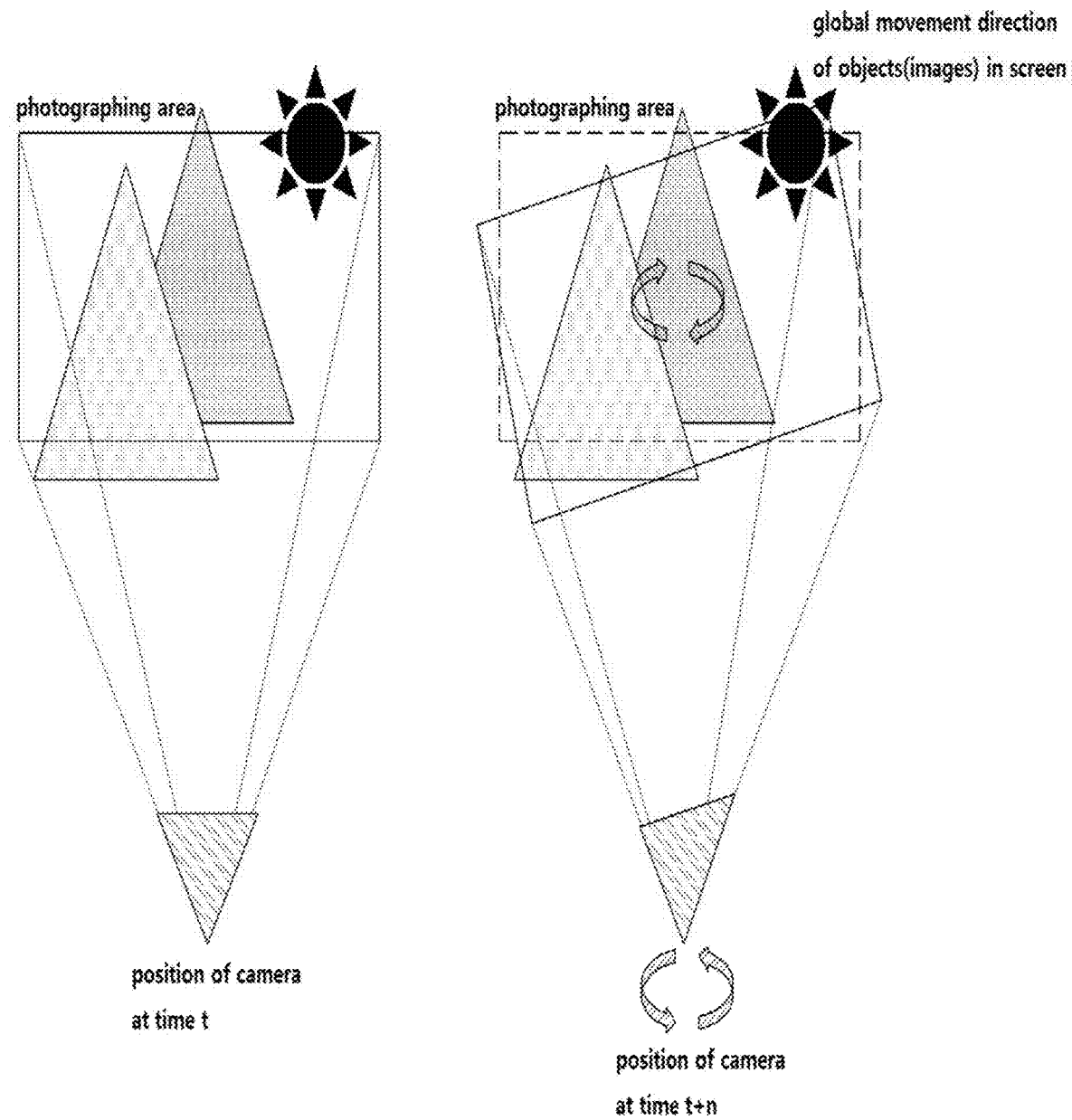
Figure 8C:
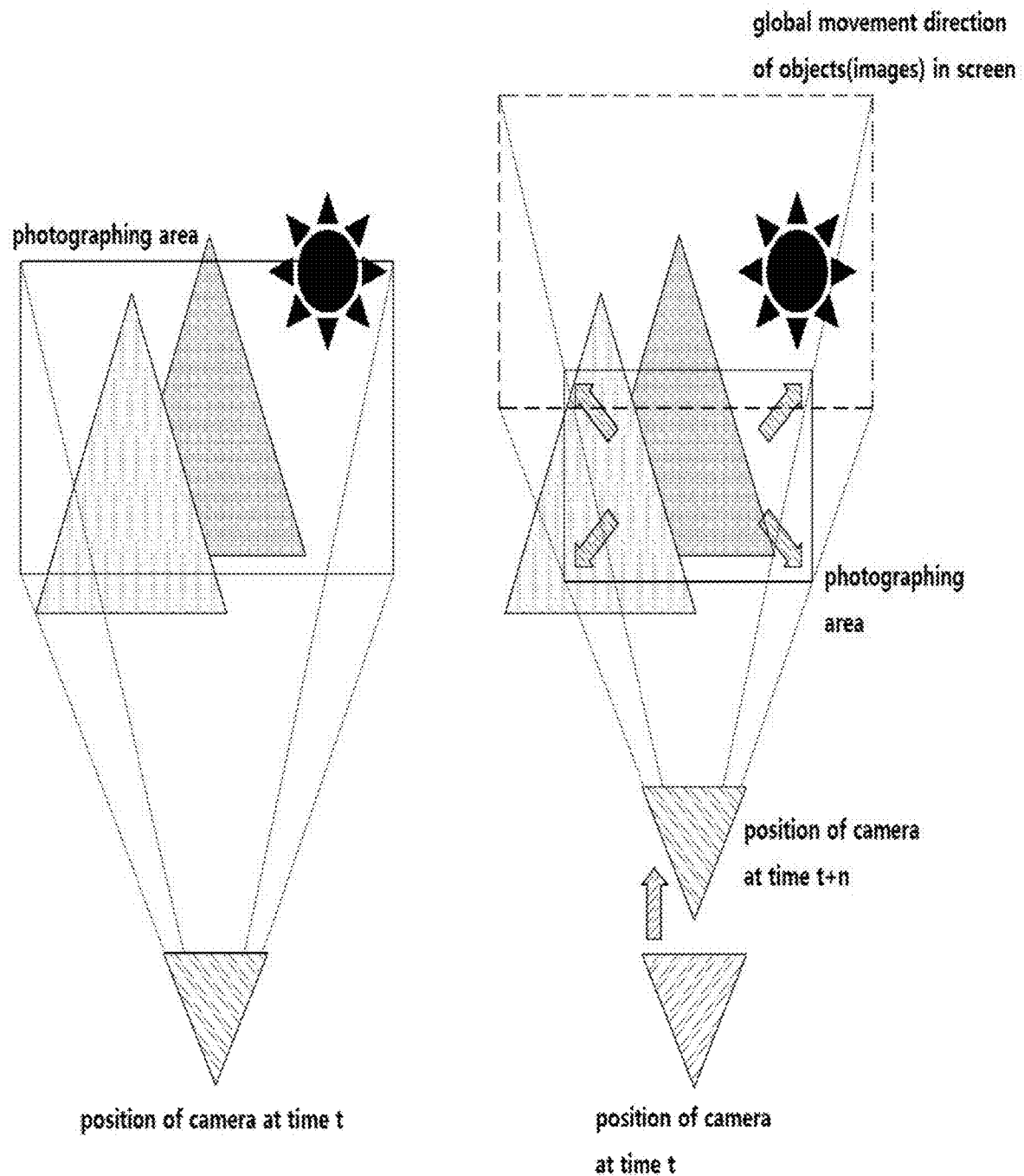
Figure 8D:
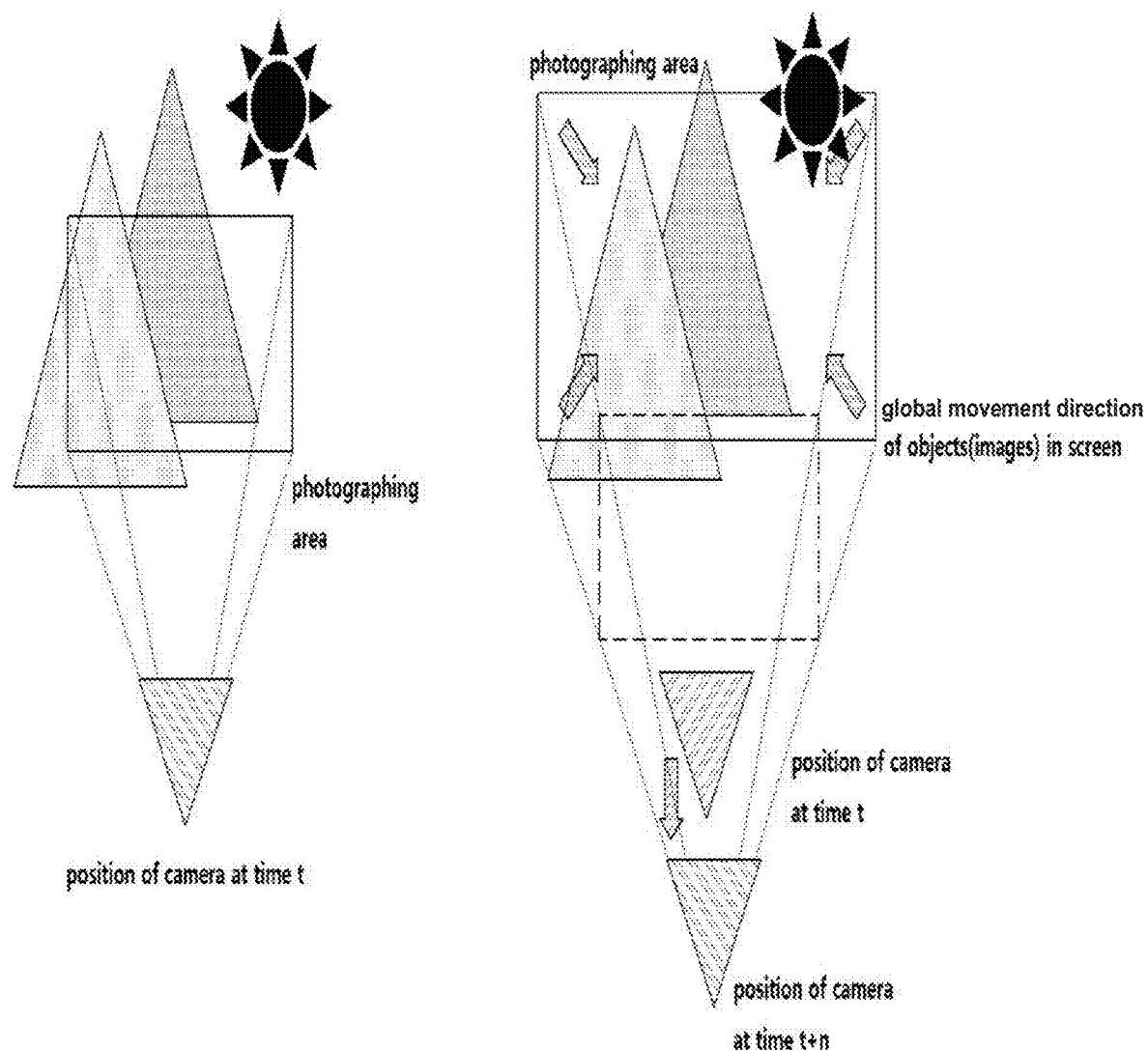

As in the example of FIG. 8a, when a camera work of parallel movement is used, most images in the video will have parallel motion in a specific direction. In addition, as in the example of FIG. 8b, when a camera work for rotating a photographing camera is used, most images in the video will have motions rotating in a specific direction. When a camera work for advancing the camera is used as in the example of FIG. 8c, the image in the video will have a motion of an enlarged type. In addition, as in the example of FIG. 8d, when a camera work for backing up a camera is used, the image in the video will have a motion of a reduced type.

Meanwhile, the local movement may mean movement different from the global movement in the video. In other words, images in the video may have additional movements, including the global movement, or may have movements completely separate from the global movement. For example, in a video to which a panning technique is applied, in the case that most objects in the video are moving in the left direction, when there are objects moving in the opposite direction, this object may have the local movement.

Figure 9:
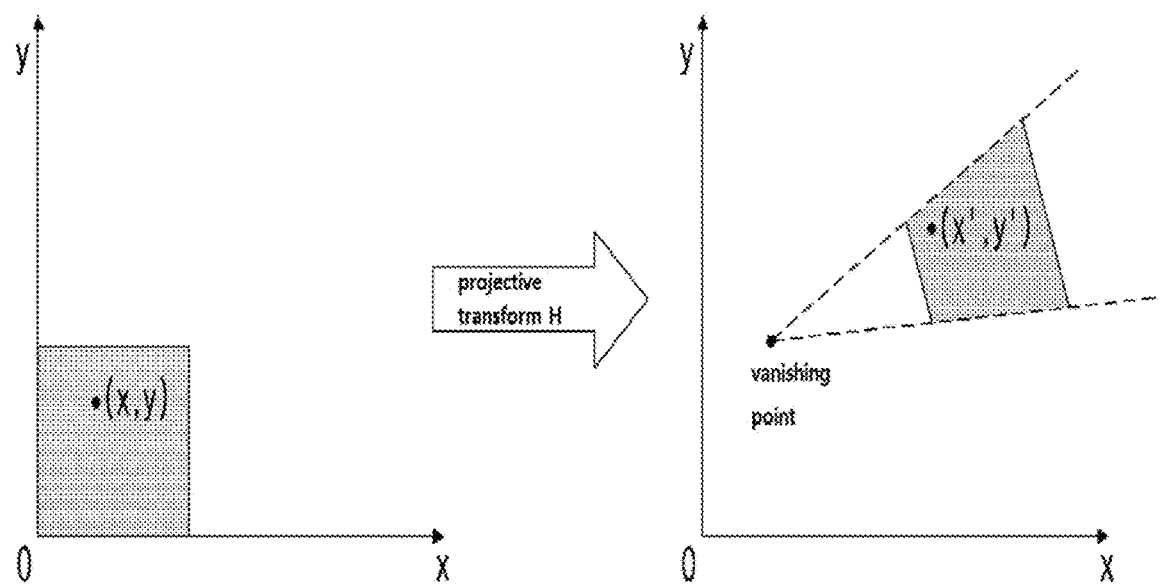
FIG. 9 is a diagram illustrating video transform by geometric transform according to an embodiment of the present invention.

A coding technique using video geometric transform exists as a moving picture coding technique reflecting the global movement. The video geometric transform indicates that the position of luminance information of the video is geometric transformed by reflecting geometric movements. The luminance information indicates the brightness, hue, saturation, etc. of each point of the video and may mean pixel value in digital video. The geometric transform indicates parallel movement, rotation, and size change of each point having luminance information in the video, and is used to express global movement information. FIG. 9 is a diagram illustrating video transformation by geometric transform according to an embodiment of the present invention, in which the geometric transform such as the translation, rotation, and size change may be reflected.

Moving picture coding using video geometric transform is a moving picture coding method that utilizes additional information generated through video geometric transform in an inter prediction technique using motion information. The additional information (or the geometric transform information) indicates all kinds of information that makes it possible to more advantageously perform the prediction between a referenced video and a part of the referenced video and a video that performs a prediction through the reference or a part of the video, such as, for example, a global motion vector, an affine transform matrix, a projective transform matrix, a warping matrix, and the like. In addition, the geometric transform information may include global movement information. By using the geometric transform information, it is possible to increase the coding efficiency for video including rotation, enlargement, reduction, and the like, while the coding efficiency is deteriorated in the related art. Geometric transforming a video in consideration of geometric movements such as parallel translation, rotation, enlargement, and reduction of the video is referred to as geometric transform of the video. The moving picture encoder using the geometric transform generates geometric transform information that geometric transforms the reference picture into a type close to the current picture by a relation inferred between a current picture and a reference picture, thereby generating thereby generating an additional reference picture (a geometric transform reference picture). Alternatively, geometric transform information for geometric transforming the current picture into a type close to the reference picture may be generated.

In the inter prediction process of a moving picture encoder using geometric transform, it is possible to find a case in which optimal coding efficiency may be obtained using a geometric transform reference picture and/or an original reference picture generated through a geometric transform process.

Figure 10:
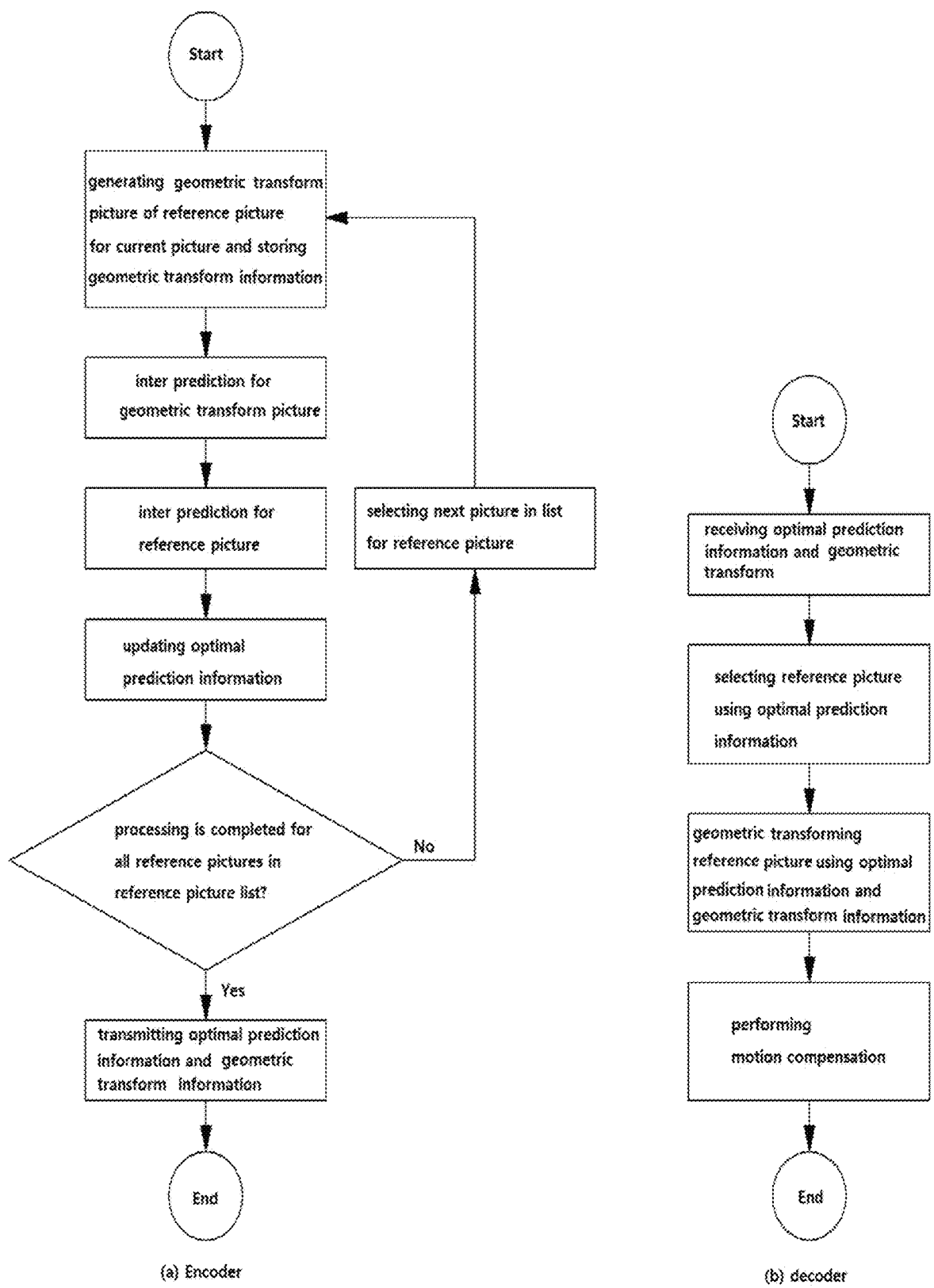
FIG. 10 is a flowchart illustrating a moving picture coding process using geometric transform according to an embodiment of the present invention.

FIG. 10 is a flowchart illustrating a moving picture coding process using geometric transform according to an embodiment of the present invention.

The encoder may perform inter prediction for all reference pictures and geometric transform pictures. In this case, the reference picture refers to a general reference picture to which the geometric transform is not applied. In addition, the geometric transform picture may refer to a geometric transformed reference picture to which a geometric transform is applied.

As shown in FIG. 10(a), the encoder may geometric transform each reference picture into a type similar to a current picture through geometric transform to generate a geometric transform picture. Inter prediction for the generated geometric transform picture and inter prediction for the reference picture may be performed, respectively. Based on each inter prediction result, it is possible to find and update the optimal prediction information that may achieve high coding efficiency. After performing inter prediction for all reference pictures and geometric transform pictures, the final updated optimal prediction information may be encoded and then transmitted to the decoder.

As shown in FIG. 10(b), the decoder receives and decodes the optimal prediction information from the encoder, and performs inter prediction through motion correction based on the decoding. The optimal prediction information may include information necessary for the decoder to perform a case having the optimum prediction efficiency selected in the encoder.

The optimal prediction information may include information that indicates which reference picture or geometric transform picture is used as the reference picture used for inter prediction. In addition, the optimal prediction information may include geometric transform information, in which the geometric transform information may indicate information that geometric transforms a reference picture into a geometric transform picture. In addition, the optimal prediction information may include information required for motion compensation.

Figure 11:
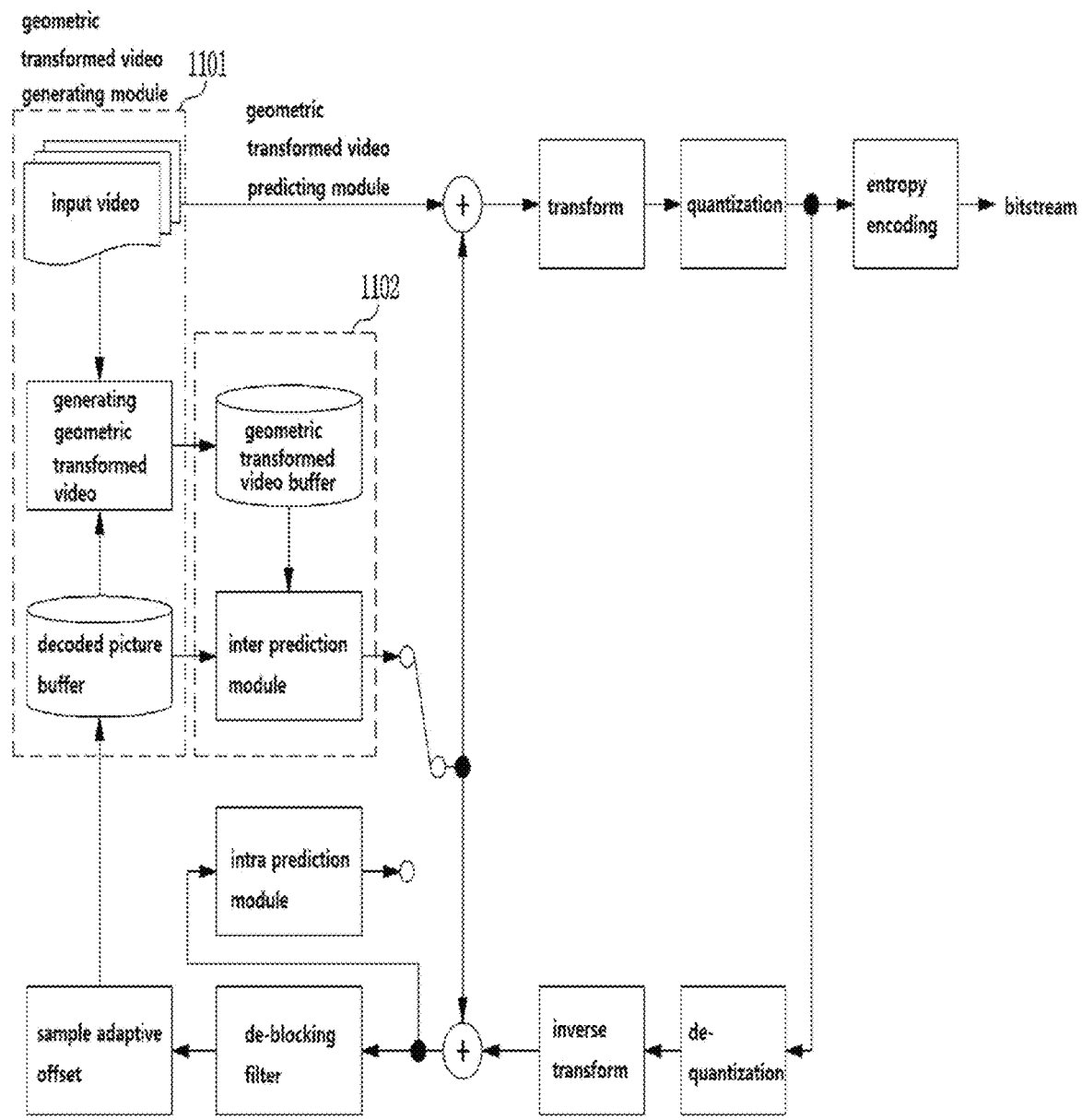
FIG. 11 is a block diagram illustrating a configuration of a moving picture coding apparatus using geometric transform according to an embodiment of the present invention.

FIG. 11 is a block diagram illustrating a configuration of a moving picture coding apparatus using geometric transform according to an embodiment of the present invention.

The geometric transformed video generating module 1101 may generate a geometric transformed video using the videos currently stored in the input video and/or the reconstructed video buffer. The geometric transformed video means a geometric transform picture, and the geometric transformed video generating module 1101 may generate a geometric transform picture. Input video indicates a current picture and the reconstructed video indicates a general reference picture. The geometric transformed video predicting module 1102 stores the generated geometric transformed video in a transformed video buffer and manages the same. In addition, the geometric transformed video predicting module 1102 may use both the reconstructed video stored in the reconstructed video buffer and the geometric transformed video stored in the geometric transformed video buffer to perform inter prediction. The process other than inter prediction may be the same as the existing encoding/decoding process.

As a result of the encoding, motion information and information about the selected reference picture may be generated. The information about the selected reference picture may include an index value for identifying the selected reference picture among the plurality of reference pictures and/or a value indicating whether the selected reference picture is a geometric transformed reference picture. The information may be transmitted in units of various scales. For example, when applied to a prediction structure on a per block basis, the intonation may be transmitted on a per-coding unit (CU) or PU basis.

According to an embodiment of the present invention, the above-described method and/or apparatus may be applied to various moving picture coding methods and/or apparatuses, each proposed detailed process may be performed in various forms, and a new detailed procedure may be added if necessary. Further, the above-described methods and/or apparatuses may be all used, and may be partially used if necessary.

Inter prediction occurring in a general moving picture encoding and decoding process is performed considering that an object or a background in each picture of a moving picture moves with time. Here, the inter prediction is performed on a per-unit basis with being partitioned into CU units or PU units. Each unit may search for an area having a similar pixel value in pictures of different time zones, taking into consideration the motion of the object. Inter prediction may represent the found area as motion information.

In moving picture coding using geometric transform, a reference picture may be divided into a general reference picture and a warped reference picture (WRP). In the moving picture coding using geometric transform, information indicating whether the reference picture used in addition to the motion information in inter prediction is a general reference picture or a warped reference picture is required, and such information is called a WRP Flag.

According to an embodiment of the present invention, when using the AMVP mode, which is one of the inter prediction methods, it is possible to improve the prediction accuracy and the coding efficiency of a prediction technique used in the video encoder/decoder by considering the WRP Flag.

In addition, when inter prediction is performed in a video encoder/decoder using the WRP, the coding efficiency may be improved by improving the AMVP candidate constructing method.

According to an embodiment of the present invention, a video encoder/decoder using the WRP may use a signal indicating whether the WRP is referred to on a block-by-block basis. Here, the block may be any type of unit used as a unit for encoding in a typical encoder/decoder, such as, for example, a macroblock, a CU unit, a PU unit, or the like. In this case, the reference picture refers to all types of video information that may be referred to in the prediction process for encoding and decoding the video. For example, the reference picture may include not only actual video information but also virtual video information that is derived through a positional coordinate or other signs.

On the other hand, a signal indicating whether or not to refer to WRP on a block-by-block basis may be referred to as a WRP Flag. The WRP Flag may refer to any kind of signal including whether or not to refer to WRP. For example, only whether the type of the reference picture is a WRP may be represented by a WRP Flag and other information of the reference picture may be represented separately. Alternatively, in the case that the sequence numbers are assigned without having signals classifying types of the reference pictures, when the WRP and pictures other than the WRP are mixed in the reference picture represented by the sequence numbers, the sequence numbers may be regarded as a kind of a WRP Flag.

Figure 12:
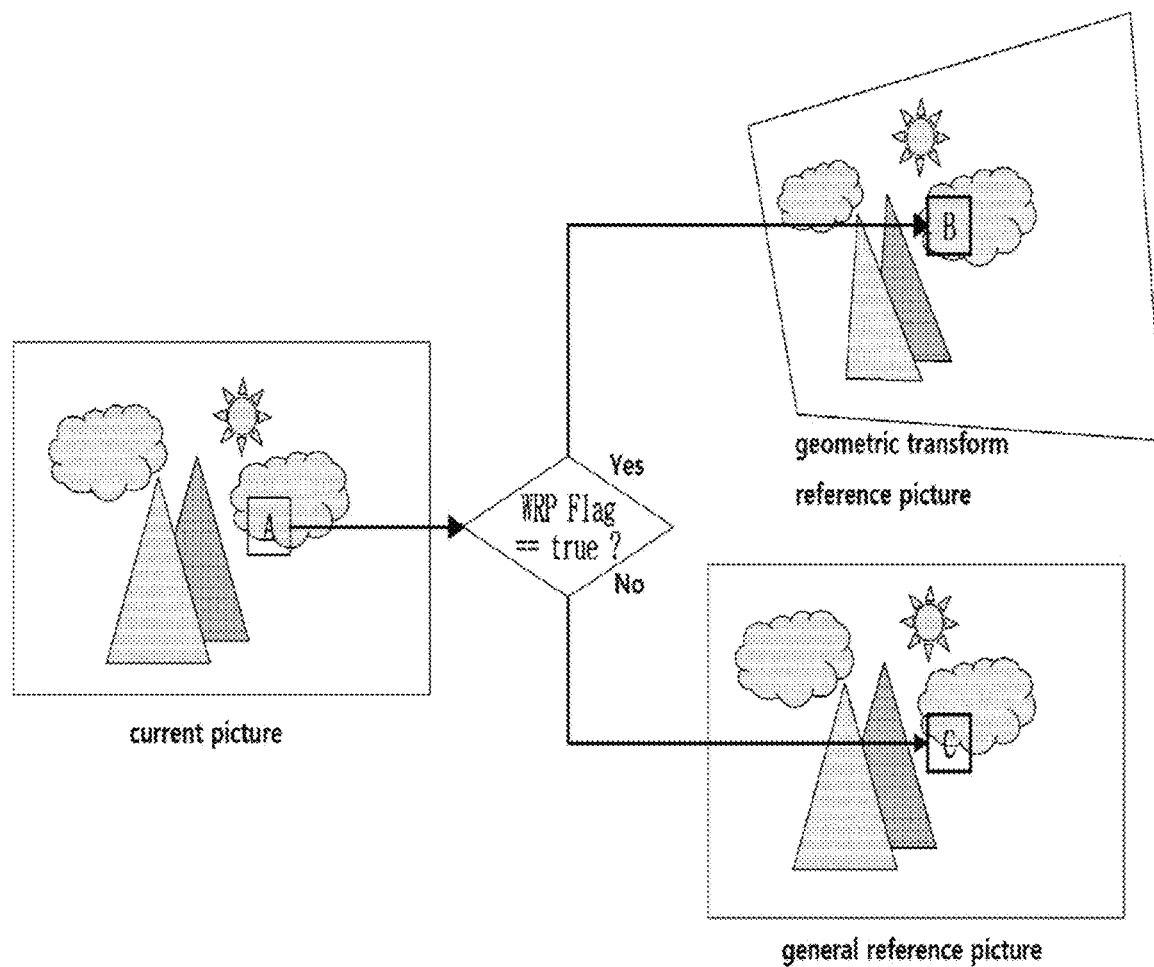
FIG. 12 is a diagram illustrating an example in which a reference picture varies according to a WRP Flag value according to an embodiment of the present invention.

FIG. 12 is a diagram illustrating an example in which a reference picture varies according to a WRP Flag value according to an embodiment of the present invention.

Referring to FIG. 12, the WRP Flag may be represented as True and False, in which when the WRP Flag is True, the WRP Flag is referred to, and when the WRP Flag is False, the general reference picture is referred to. Even when the motion information of the A block of the current picture is the same, when the information of the WRP Flag is different, the referencing picture is different according to the WRP or the general reference picture, whereby an area of the referencing video to may be different. For example, "A" of the current picture refers to "B" of the WRP in the case of WRP Flag=True, and "C" of the general reference picture in the case of WRP Flag=False, in FIG. 12.

Inter prediction searches for an area similar to the current block from the reference picture in order to compress the current block more efficiently. It is possible to perform reconstruction of the same motion during encoding and decoding through the information indicating the found similar area. Here, the information indicating the found similar area is referred to as motion information. The encoder encodes the motion information signal, and the decoder decodes the encoded motion information signal.

In order to more efficiently encode the motion information signal, a process of predicting the motion information itself may be performed. AMVP is one of methods performing processes for predicting motion information, and may select, as a candidate, motion information of blocks temporally and spatially adjacent to the current block and predict current motion information by referring to the candidate.

According to an embodiment of the present invention, the WRP Flag is included in the information of the candidate when generating the candidate for use in the AMVP mode, so that the accuracy and efficiency of candidate generation may be increased.

Figure 13:
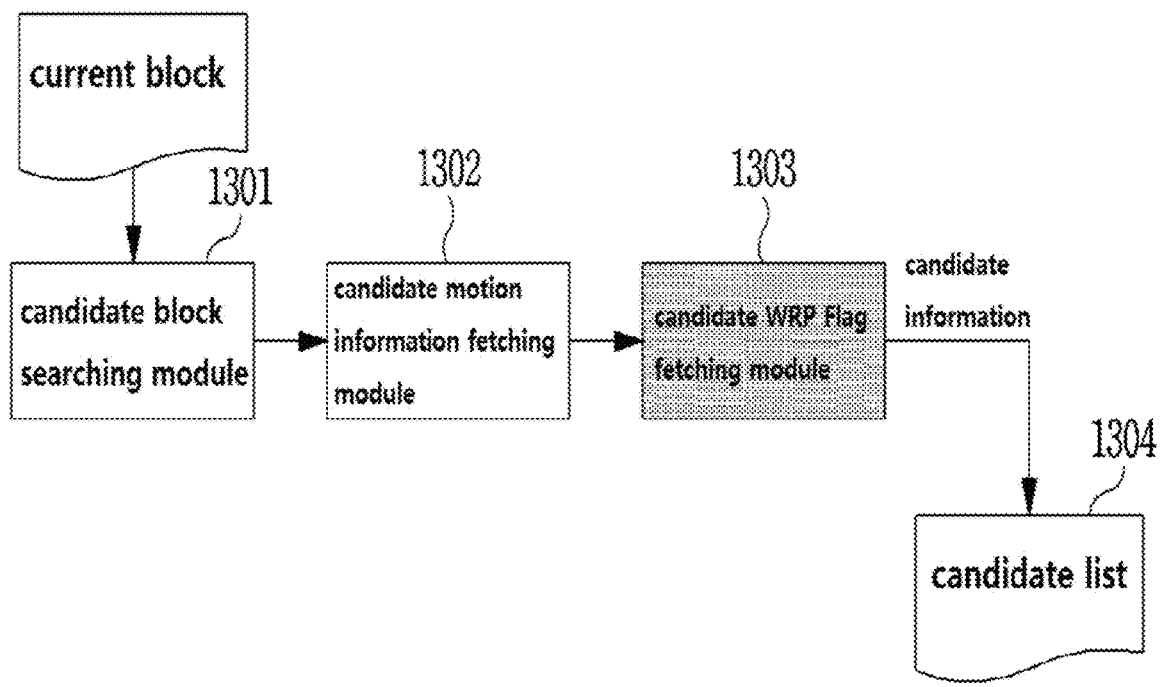
FIG. 13 is a block diagram illustrating a configuration of an encoder/decoder using a WRP Flag in an AMVP mode according to an embodiment of the present invention.

FIG. 13 is a block diagram illustrating a configuration of an encoder/decoder using a WRP Flag in an AMVP mode according to an embodiment of the present invention.

A candidate block searching module 1301 may search whether there is a candidate block temporally/spatially adjacent to the current block. The temporally/spatially adjacent candidates may not exist in some cases. For example, when the temporally/spatially adjacent candidate is encoded in intra prediction, the candidate block does not have inter prediction information and thus may not function as a candidate block. As another example, when the current block is located at the boundary of a picture, the out-of-boundary area does not have inter prediction information and thus may not function as a candidate block. The candidate block searching module 1301 may select only available candidates and determine candidates to be added to the candidate list from the available candidates.

A candidate motion information fetching module 1302 may fetch motion information of a candidate block when a candidate block exists. The AMVP mode fetches motion information from candidates and uses the same. Therefore, the motion information of the determined candidate is fetched to form a candidate list. The candidate motion information fetching module 1302 may fetch motion information from a predetermined temporally/spatially adjacent candidate to construct a candidate list.

The candidate WRP Flag fetching module 1303 may fetch the WRP Flag information of a candidate block when a candidate block exists. According to an embodiment of the present invention, the AMVP mode may fetch WRP Flag information as well as motion information from a candidate and use the same. Therefore, the candidate list may be constructed by fetching the WRP Flag information of the candidate determined when constructing the candidate list. The candidate WRP Flag fetching module 1303 may fetch the WRP Flag information from the predetermined temporally/spatially adjacent candidates to construct the candidate list.

The candidate information may indicate information fetched from the candidate motion information fetching module 1302 and/or the candidate WRP Flag fetching module 1303. The candidate information is stored in the candidate list 1304 and used in an encoding/decoding process.

The above operation is not limited to this example, but each detailed process may be performed in various orders, and new detailed processes may be added if necessary. Further, the methods listed above may be all used or may be partially used as needed.

Figure 14:
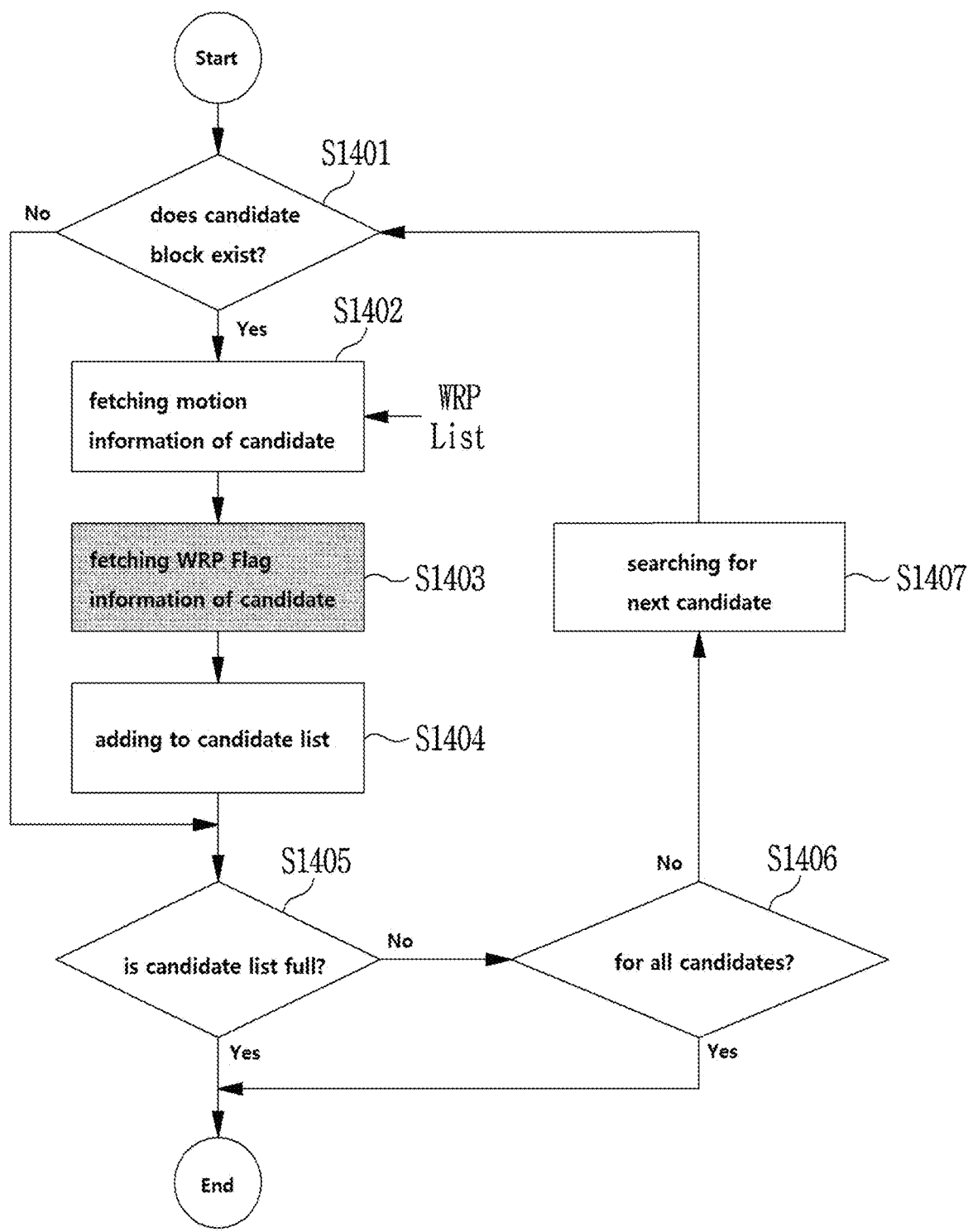
FIG. 14 is a flowchart illustrating an operation of an encoder/decoder using a WRP Flag in an AMVP mode according to an embodiment of the present invention.

FIG. 14 is a flowchart illustrating an operation of an encoder/decoder using a WRP Flag in an AMVP mode according to an embodiment of the present invention.

Referring to FIG. 14, motion information and WRP Flag information of the candidate block may be fetched from the existing candidate block and added to the candidate list. The series of processes may be performed until the candidate list is full or processes for all candidates are completed (S1405 to S1407).

It is possible to search whether a temporally/spatially adjacent candidate block exists in the current block (condition sentence step of "does candidate block exist?", S1401). On the other hand, temporally/spatially adjacent candidates may not exist in some cases. For example, when the temporal/spatial candidate is encoded in intra prediction, the candidate block may not function as a candidate since it does not have inter prediction information. As another example, when the current block is located at the boundary of a picture, the out-of-boundary area may not function as a candidate since it does not have inter prediction information.

When the candidate block exists, the motion information of the candidate block may be fetched (step of "fetching information of candidate", S1402). The AMVP mode fetches motion information from the candidate and uses the same. Accordingly, the motion intonation of the candidate determined when constructing the candidate list is fetched, thereby constructing the candidate list.

When the candidate block exists, the WRP Flag information of the candidate block may be fetched (step of "fetching WRP Flag of candidate" S1403). According to an embodiment of the present invention, not only motion information but also WRP Flag information are fetched from the candidate in the AMVP mode and then used. Therefore, the WRP Flag information of the candidate determined when constructing the candidate list is fetched, thereby constructing the candidate list.

The information fetched in step S1402 and/or step S1403 may be stored in the candidate list (step of "adding to candidate list", S1404). On the other hand, the information fetched in step S1402 and/or step S1403 may be referred to as candidate information.

Figure 15:
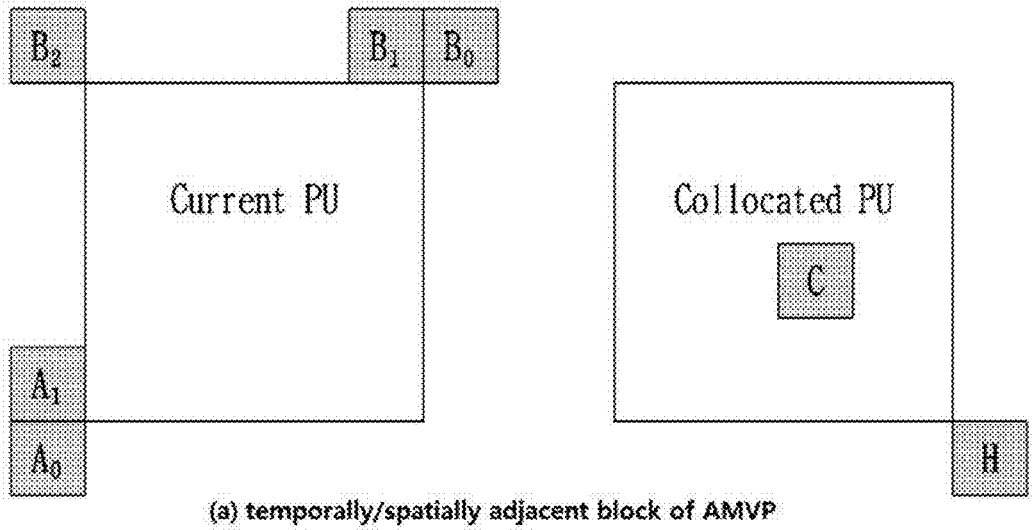
FIG. 15 is a diagram illustrating a process of fetching information when a candidate list is constructed from temporal/spatial adjacent block candidates according to an embodiment of the present invention.
Figure 15:
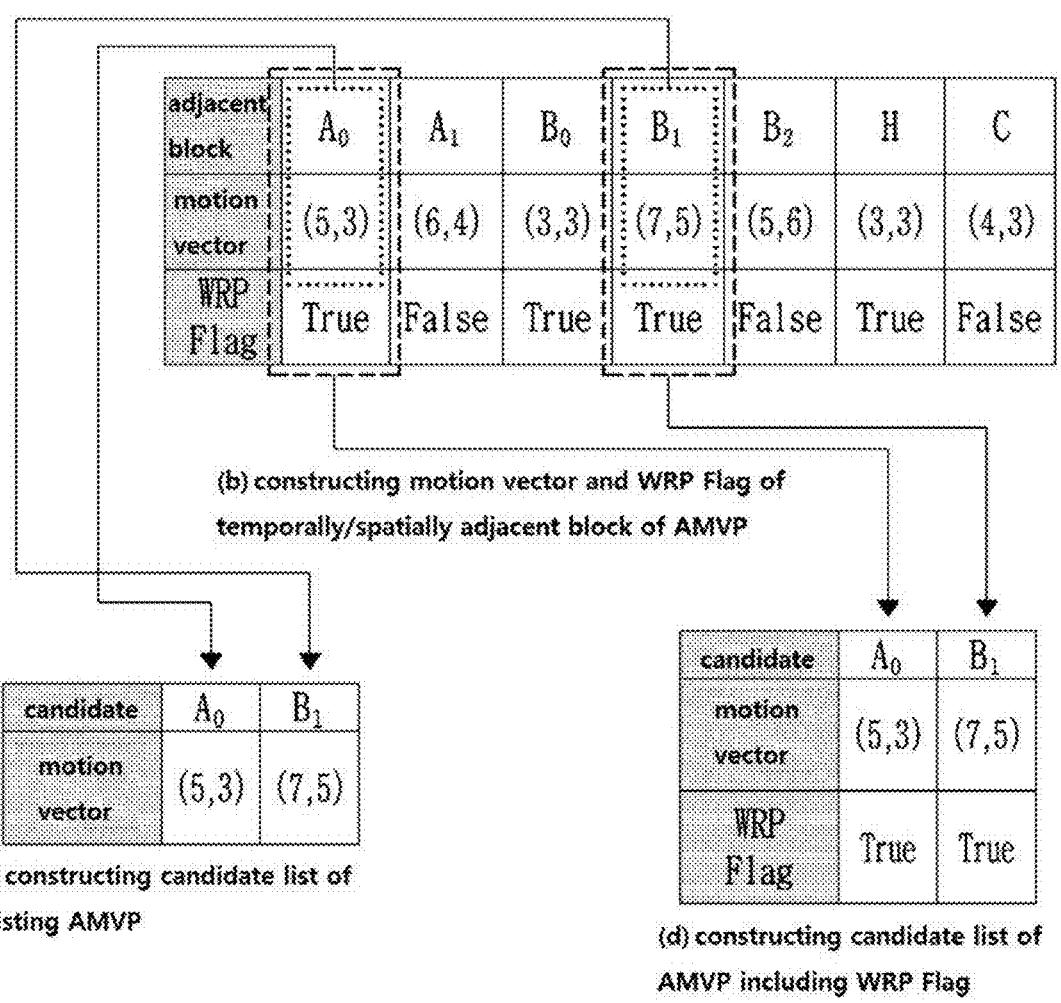

FIG. 15 is a diagram illustrating a process of fetching information when a candidate list is constructed from temporal/spatial adjacent block candidates according to an embodiment of the present invention.

The adjacent block may refer to a temporal/spatial candidate, and each candidate may include various information used in decoding a candidate block. The information may include motion information and/or WRP Flag information.

The AMVP mode may or may not use both temporal/spatial adjacent candidates. Actually used candidates are added to the candidate list by a predetermined method, in which the candidate list is constructed by fetching motion information from the candidate. FIG. 15(a) shows an example of a temporal/spatial adjacent block of AMVP. FIG. 15(b) shows an example of motion information and WRP Flag information of the temporal/spatial adjacent block of FIG. 15(a).

FIG. 15(c) is an example of an existing AMVP candidate constructing method, in which the candidate list may be constructed by fetching some of the motion information of the temporal/spatial adjacent blocks of FIG. 15(b). FIG. 15(c) may be a process corresponding to the candidate motion information fetching module 1302 of FIG. 13 and the step of "fetching motion information of candidate" (S1402) of FIG. 14.

FIG. 15(d) shows an example of a method of constructing an AMVP candidate according to an embodiment of the present invention, in which a part of the motion information and the WRP Flag information of the temporal/spatial adjacent block of FIG. 15(b) are fetched to construct the candidate list. FIG. 15(d) shows a process corresponding to the candidate motion information fetching module 1302 and the candidate WRP Flag fetching module 1303 shown in FIG. 13, and the step of "fetching motion information of candidate" (S1402) and the step of "fetching WRP Flag information of candidate" (1403) shown in FIG. 14.

The candidate list of FIG. 15(d) is constructed in such a manner that each candidate fetches motion information and WRP Flag information from adjacent blocks. The process of fetching the motion information corresponds to the candidate motion information fetching module 1302 and/or the step of "fetching motion information of candidate" (S1402) in FIG. 14. In addition, the process of fetching the WRP Flag information from the adjacent block correspond to the candidate WRP Flag fetching module 1303 in FIG. 13 or the step of "fetching WRP Flag information of candidate" (S1403) in FIG. 14.

Hereinafter, a method of generating an AMVP candidate including a WRP Flag will be described below.

Each block which is a candidate of AMVP has motion information used when performing inter prediction on the corresponding block. Here, the block may be any type of unit used as a unit for encoding in a typical encoder/decoder, such as, for example, a macroblock, a CU unit, a PU unit, a Sub PU unit, or the like. A candidate block of AMVP may mean a neighboring block temporally/spatially adjacent to the current block to perform AMVP. All blocks temporally/spatially adjacent may be used, but only some of them may be selected and used. Here, units of adjacent blocks temporally and spatially adjacent to the current block may be different from each other. For example, while the current block is a PU, the candidate block may be a Sub PU.

Also, each block that is a candidate for AMVP includes WRP Flag information used when performing inter prediction on the block. In the exiting encoding/decoding method, when performing AMVP, the WRP Flag information does not exist and only the motion information is fetched from the candidate block. However, according to an embodiment of the present invention, the WRP Flag information may be fetched together with the motion information, thereby improving the precision of inter prediction and the coding efficiency.

When generating an AMVP candidate, the encoder/decoder checks whether a block exists at a temporally/spatially adjacent position defined in advance and assigns priority to each position with respect to each existing block, whereby the predetermined number of candidates may be generated in order of higher priority. Then, the motion information of the current block may be predicted by referring to the motion information from the candidate.

Figure 16:
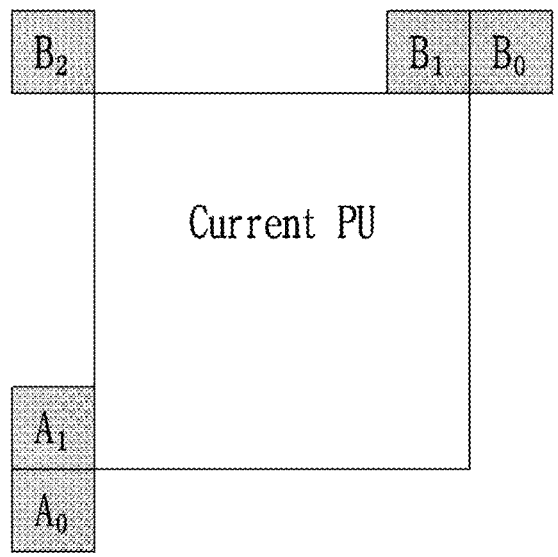
FIG. 16 is a diagram illustrating a candidate list of an AMVP mode according to an embodiment of the present invention.
Figure 16:
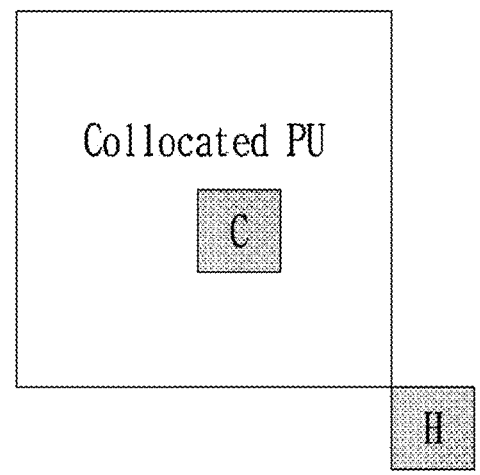

FIG. 16 is a diagram illustrating a candidate list of an AMVP mode according to an embodiment of the present invention.

FIG. 16(a) shows an example of spatial candidates of the AMVP mode in the existing encoding method, and FIG. 16(b) shows an example of temporal candidates of the AMVP mode in the existing encoding method.

FIG. 16(c) shows an example of generating a candidate list by selecting two candidates from the candidates of FIG. 16(a) and FIG. 6(b). Referring FIG. 16(c), a case is shown in which AMVP candidates fetch motion information in the existing encoding method, in which each candidate has motion information and the motion information has a motion vector.

According to an embodiment of the present invention, when generating an AMVP candidate, a WRP Flag as well as motion information may be referenced from a corresponding candidate block. The WRP Flag as well as the motion information may be stored and/or referenced by predicting the WRP Flag as well as the motion information of the current block. FIG. 16(d) shows an AMVP candidate list according to an embodiment of the present invention. In comparison with FIG. 16(c), it may be appreciated that each candidate in FIG. 16(d) has not only motion information but also WRP Flag information.

Hereinafter, a method of comparing the WRP Flag information when comparing redundant AMVP candidates will be described below.

When constructing the AMVP mode candidate, the candidate having the redundant motion information may be excluded from the candidates. The existing spatial AMVP candidate constructing method is as follows. In FIG. 16(a), Current PU refers to a current block, and A0, A1, B0, B1, and B2 refer to neighboring blocks spatially adjacent to the current block. In FIG. 16(a), one candidate is selected from one candidate of A0, A1, Scaled A0, and Scaled A1, and one candidate is selected from B0, B1, B2, Scaled B0, Scaled B1, and Scaled B2. Here, "Scaled" may mean a case that is changed by multiplying the magnitude of the motion information of the candidate by a weight. A motion vector MV is referenced from two selected candidates, and the motion vectors MV of the two candidates are compared, so that one of two candidates may be excluded from the candidate in the case that the two motion vectors are the same. When the number of candidates is insufficient, the process proceeds to search for temporal candidates and other candidates. Here, the motion vector is a kind of motion information. The motion information may be a motion vector, or may be information including the motion vector.

The AMVP candidate according to an embodiment of the present invention may include WRP Flag information. Therefore, when the motion vector MV is the same, but the WRP Flag information is different, it means the reference area is different. Therefore, when comparing motion information, the WRP Flag information should also be compared.

In FIG. 16(a), Current PU refers to a current block, and A0, A1, B0, B1, and B2 refer to neighboring blocks spatially adjacent to the current block. In FIG. 16(a), one candidate is selected from one candidate of A0, A1, Scaled A0, and Scaled A1, and one candidate is selected from B0, B1, B2, Scaled B0, Scaled B1, and Scaled B2. The motion vector (MV) and the WRP Flag are referenced from the two selected candidates, and the motion vector (MV) and the WRP Flag of both candidates are compared, so that one of two candidates may be excluded from the candidate in the case that the motion vector and WRP Flag are the same. When the number of candidates is insufficient, the process proceeds to a step of searching for temporal candidates and other candidates.

FIG. 17 is a diagram illustrating an example in which candidates are not removed from a candidate list through comparison of WRP Flags according to an embodiment of the present invention.

FIG. 17(a) shows an example of constructing the AMVP candidates in the related art, in which since the motion vectors of two spatial candidates are the same, a B1 candidate may be removed. However, according to an embodiment of the present invention, since the motion vector is the same but the WRP Flag is different as in an example of in FIG. 17(b), the B1 candidate may not be removed from the candidate list.

Hereinafter, a method of expanding AMVP candidates will be described below.

In the AMVP mode, a predetermined number of candidates may be generated. The priority may be determined by a predetermined method when generating candidates. It is possible to check whether or not a candidate exists according to the priority and to add the existing candidate to the candidate list with priority. Here, there may occur a case where no candidate exists. When there are many such cases, the predetermined number of candidates may not be secured.

For example, in the case of the existing AMVP candidate configuration, spatial AMVP candidates may be configured preferentially. In FIG. 16(a), Current PU refers to a current block, and A0, A1, B0, B1, and B2 refer to neighboring blocks spatially adjacent to the current block, respectively. In FIG. 16(a), one candidate is selected from one candidate of A0, A1, Scaled A0, and Scaled A1, and one candidate is selected from B0, B1, B2, Scaled B0, Scaled B1, and Scaled B2. A motion vector MV is referenced from two selected candidates, and the motion vectors MV of the two candidates are compared, so that one of two candidates may be excluded from the candidate in the case that the two motion vectors are the same. When the number of candidates is insufficient, the process proceeds to search for temporal candidates. As the temporal candidate, in FIG. 16(b), one of H and C is selected, and the priority may be in order of H and C. When the number of candidates is insufficient after all the processes of searching for the candidate are completed, as many zero vector candidates as the insufficient number are added. Here, the zero vector means a motion vector representing "no motion".

According to an embodiment of the present invention, additional virtual candidates may be generated by arbitrarily changing the information of the WRP Flag. As an example, a new candidate may be generated by copying the selected candidate and changing a WRP Flag of the copied candidate. As another example, even when adding zero vector candidates to fill the insufficient number of candidates, by the diversity of the candidate is increased by adjusting the WRP Flag value of the zero vector candidate, thereby improving the coding efficiency.

FIG. 18 is a diagram illustrating a candidate expansion process by setting a WRP Flag according to an embodiment of the present invention.

Referring to FIG. 18, according to an embodiment of the present invention, the number of candidates capable of being generated when generating AMVP candidates may be increased. Referring to FIG. 18, a total of five candidates are filled in the candidate list, and the hatched area in the candidate list refers to an area of the candidate list that is not filled after the process of searching for the temporal/spatial candidate is completed. FIG. 18(a) shows a case of filling a candidate list that is not filled in the existing AMVP candidate generation method. (0, 0) means a zero vector, and it may be seen that all the unfilled candidate lists are filled with the zero vector. According to an embodiment of the present invention, referring to FIG. 18(b), a new candidate may be generated by copying a candidate included in the candidate list and inverting the WRP Flag value. For example, A0' means a candidate obtained by copying the A0 candidate and then inverting the WRP Flag, and B1' means a candidate by copying the B1 candidate and inverting the WRP Flag. In this case, inversion of the WRP Flag is a type of changing the WRP Flag, and means that the WRP Flag is changed to another value other than the current value, for example, when the WRP Flag has two values such as True and False. In FIG. 18(c), the zero vector candidate is filled in the unfilled region of the candidate list as shown in (a) of FIG. 18, but different candidates may be generated by setting WRP Flags of the respective zero vector candidates to be different. The above-described processes in FIG. 18(b) and FIG. 18(c) may be used together.

Hereinafter, a method of applying motion information scaling of candidates according to the WRP Flag will be described below.

Inter prediction predicts a current picture from a temporally adjacent reference picture or a reference picture. The current picture and the reference picture are located at different positions on the time axis. When inter prediction is performed, motion of an object or a background in a video due to a temporal difference between a current picture and a reference picture is considered and may be expressed as motion information. In AMVP mode, motion information is predicted from blocks temporally/spatially adjacent to the current block, in which the reference picture referenced by the current block and the reference picture referenced by the candidate block may be different from each other. That the reference pictures are different from each other may mean that the positions of the reference pictures on the time axis is different from each other. Since the positions of the reference pictures on the time axis are different from each other, the motion information may be different when referring to different reference pictures. In AMVP mode, motion information may be corrected by considering the temporal distance between pictures of the referencing block and the referenced block. The temporal distance between the picture to which the current block belongs and the picture to which the current block refers and the temporal distance between the picture to which the candidate block belongs and the picture to which the candidate block refers are compared, so that the motion information of the candidate block is predicted to be more similar to the motion information of the current block, which is called motion information scaling. Motion information scaling may be used for inter prediction techniques using candidates, such as merge mode in addition to AMVP mode.

Figure 19:
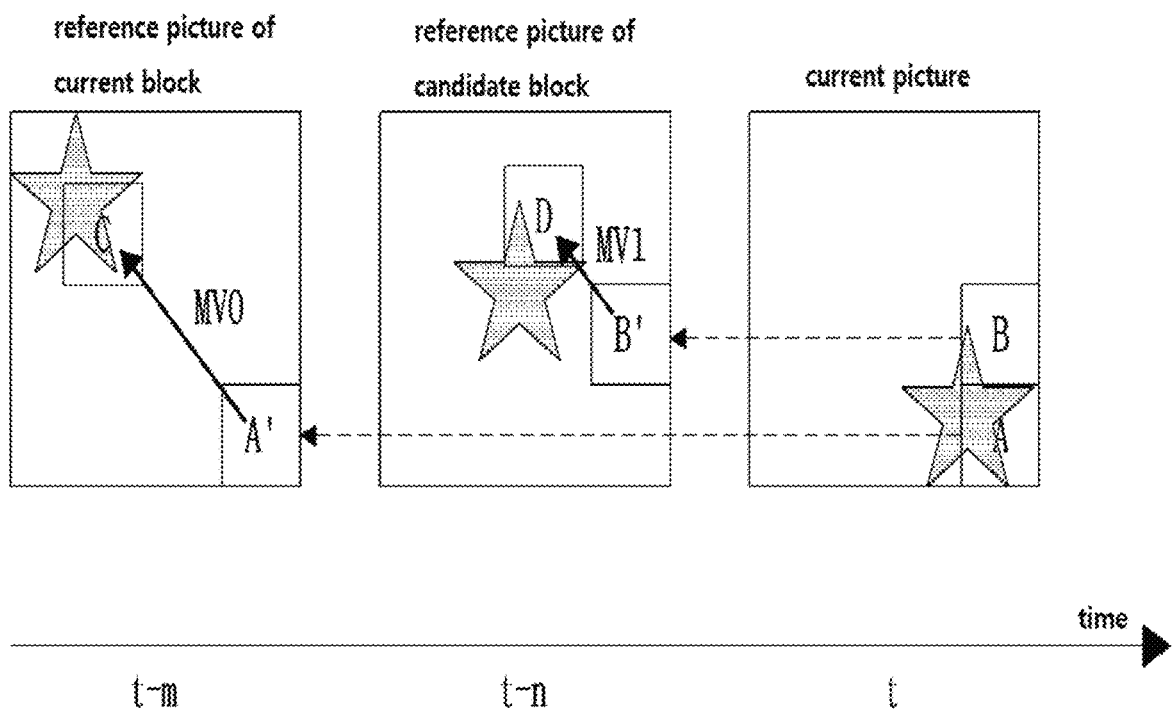
FIG. 19 is a diagram illustrating an example of motion information scaling according to an embodiment of the present invention.

FIG. 19 is a diagram illustrating an example of motion information scaling according to an embodiment of the present invention.

Referring to FIG. 19, t indicates a position of a current picture on a time axis, and t-n indicates a position of a reference picture of a candidate block on a time axis. t-m indicates the position of the reference picture of the current block on the time axis. The motion of the video in the picture may be known as the position on the time axis of each picture changes. A indicates the current block, and B indicates a candidate block. A' indicates the position in the reference picture of the current block with the same spatial position as the current block A. B' indicates the position in the reference picture of the candidate block that has the same spatial position as the candidate block B. In this case, since the candidate block B performs inter prediction from the reference picture of the candidate block, the position of the block D is found as a result of the inter prediction, and this position may be expressed by the motion vector MV1. Since the current block A performs inter prediction from the reference picture of the current block, the position of the block C is found, and this position may be expressed as a motion vector MV0. In this case, when MV0 is predicted as MV1, the coding efficiency may not be good because the difference between MV0 and MV1 is large. Here, the motion information scaling may be applied using the distance between the current picture and the reference picture of the candidate block on the time axis and the distance between the current picture and the reference picture of the current block on the time axis. When the motion vector scaling is applied to MV1, a motion vector that is changed closer to MV0 may be obtained, and the coding efficiency may be improved by predicting MV0 using the motion vector.

According to an embodiment of the present invention, when scaling of the motion information occurs, a WRP Flag may be considered. The WRP is generated considering the global movement between the current picture and the reference picture, and the motion information may be reflected in the WRP. Since the WRP is a picture that is geometric transformed (warped) to be more similar to the current picture, the WRP considers the difference between pictures on the temporal axis in the geometric transform process. Thus, for example, when both the candidate block and the current block are set so that the WRP Flag means "referring to WRP", the motion information scaling may not be required. As another example, when the candidate block does not refer to the WRP and the current block refer to the WRP, the motion information of the candidate block may be scaled to display a smaller motion regardless of the temporal distance of the reference picture. As another example, when the WRP Flag of the candidate block is different from that of the current block, the motion information scaling may be performed considering the global motion information regardless of the temporal distance of the reference picture.

According to an embodiment of the present invention, it is possible to determine whether to perform the motion information scaling according to the WRP Flag setting, or to perform the motion information scaling according to whether to use the WRP Flag or global motion information, other than the temporal distance of the reference picture. Accordingly, according to the present invention, the coding efficiency may be improved by omitting the unnecessary motion information scaling process or performing a proper motion information scaling process according to the WRP Flag.

Hereinafter, a method of constructing a candidate in consideration of a WRP Flag of a current block will be described below.

For example, the priority of the candidate configuration may be changed according to the WRP Flag of the current block.

The current block may find the optimal motion information through motion prediction before generating the AMVP candidate. In order to encode the found motion information to have higher coding efficiency, the motion information is predicted using the AMVP candidate. The current block with motion information before generating the AMVP candidate, like the motion information, has the WRP Flag information before generating the AMVP candidate. Therefore, when generating the AMVP candidate, the WRP Flag information of the current block may be known in advance. Since the characteristics of the motion information may vary depending on whether to use the WRP, the motion information of the current block may be more accurately predicted when the WRP Flag information is the same or similar. Therefore, the coding efficiency of the motion information may be improved through AMVP by preferentially generating and assigning candidates having WRP Flag information such as WRP Flag information of the current block.

As another example, the AMVP candidate list may be regenerated according to the WRP Flag of the current block.

There may be a case where an AMVP candidate is generated before motion prediction is performed. When the motion information of the candidates is used as the motion information of the current block, the calculation complexity of the motion prediction may be reduced by comparing the efficiency of the motion prediction and performing the motion prediction based on the optimal candidate. In this case, since the AMVP candidate is needed to perform the motion prediction, it must be generated before performing the motion prediction. However, the AMVP candidate generated before the motion prediction may not be suitable for finally encoding the motion information determined through the motion prediction. Here, the AMVP candidate list may be regenerated considering the motion information of the current block and the WRP Flag. The method of regenerating the AMVP candidate may be performed in the same manner as the process of changing the priority of the candidate configuration according to the WRP Flag of the current block.

Figure 20A:
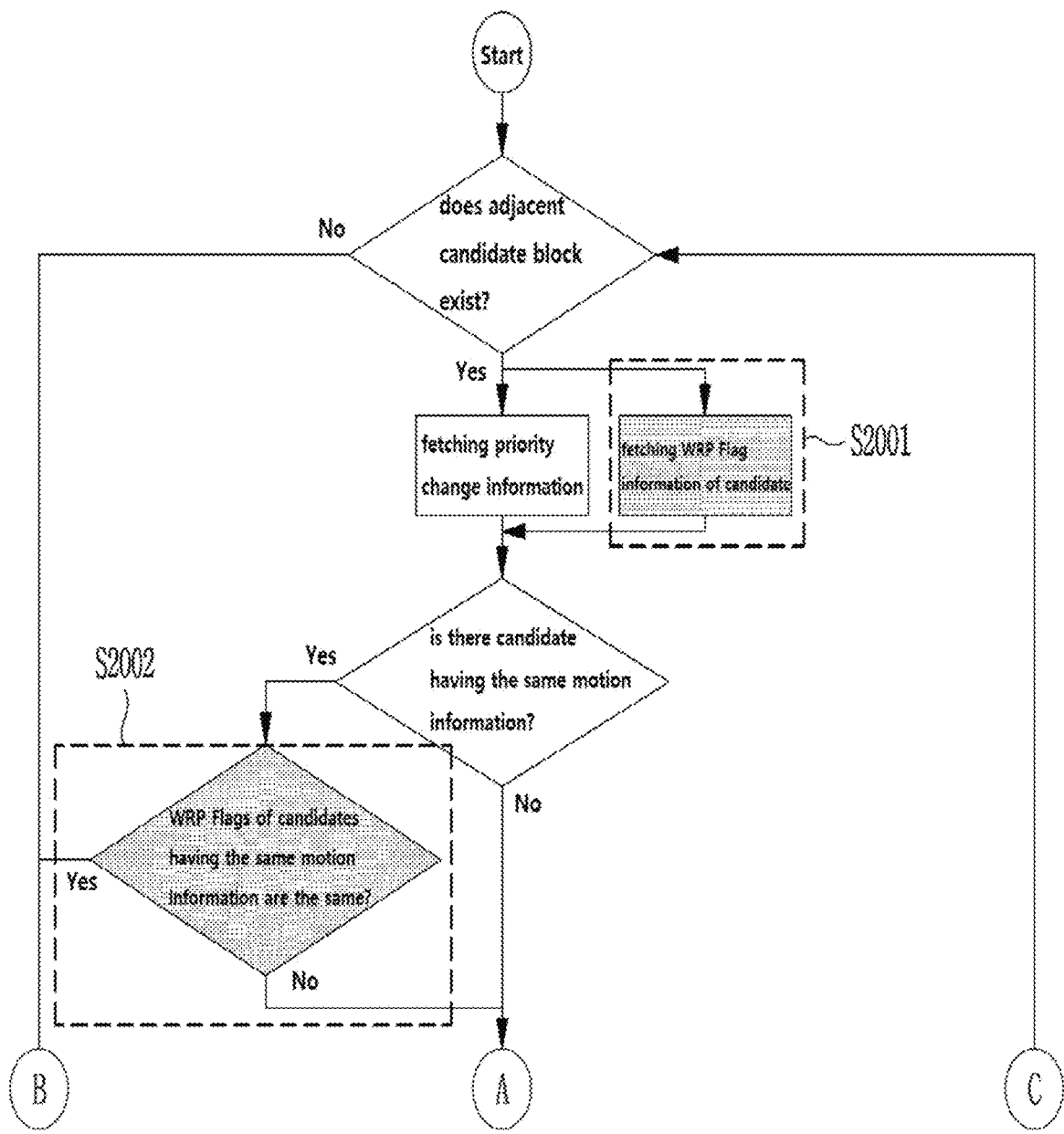
FIGS. 20A to 20C are flowcharts illustrating an operation of an encoder/decoder to which methods of using a WRP Flag are applied in a combination manner in an AMVP candidate generation process according to an embodiment of the present invention.
Figure 20B:
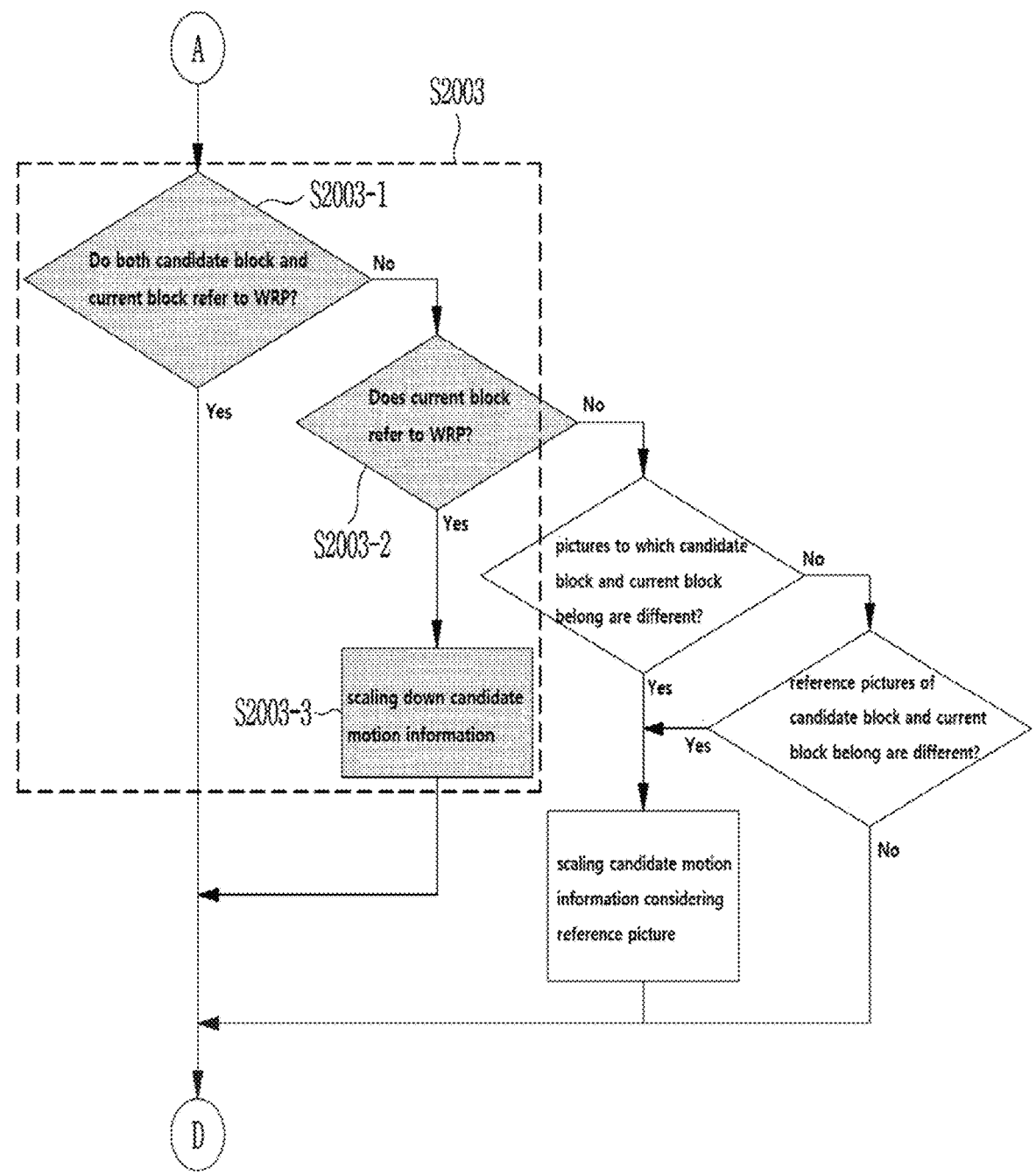
Figure 20C:
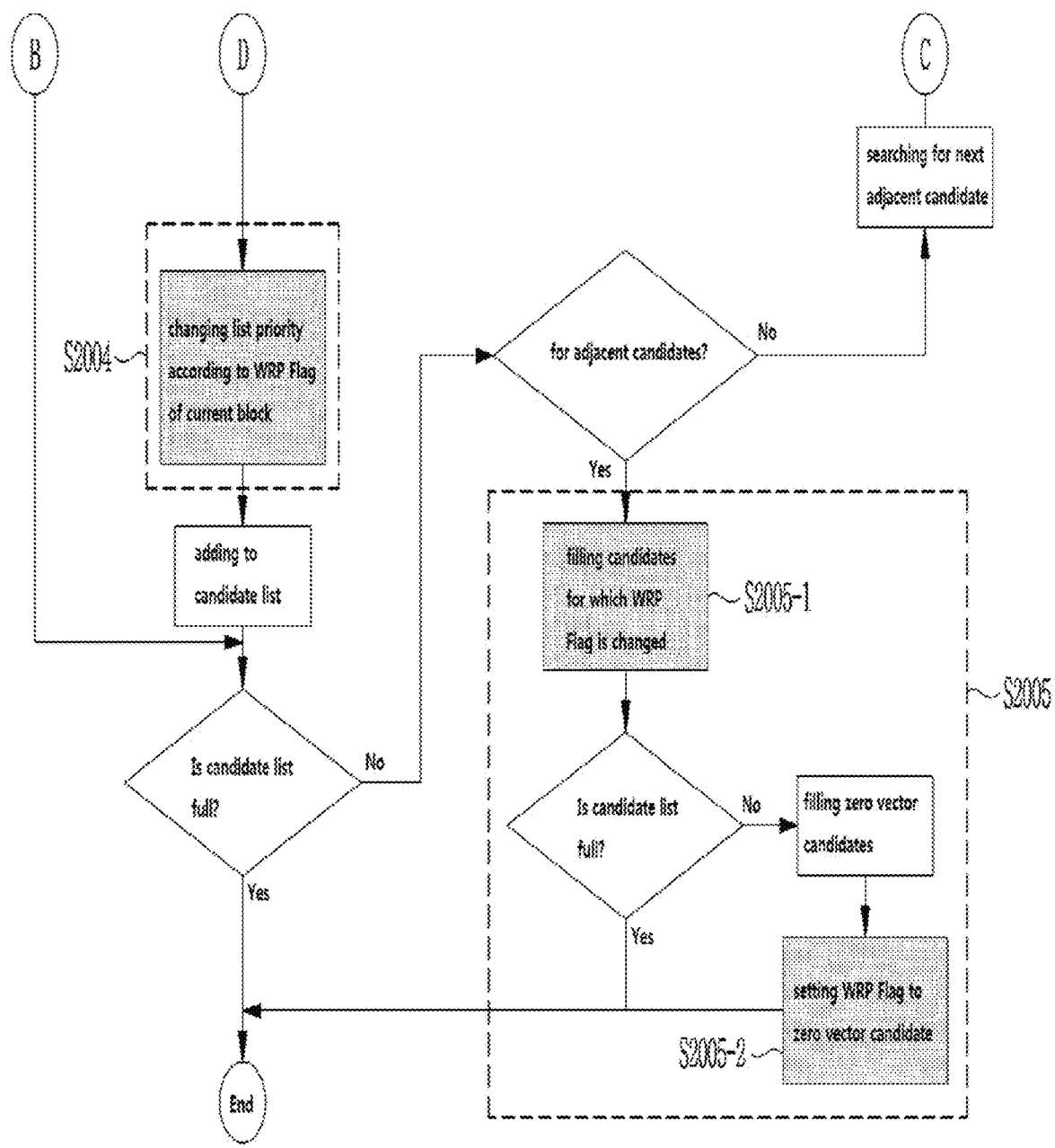

FIGS. 20a to 20c are flowcharts illustrating an operation of an encoder/decoder to which methods of using a WRP Flag are applied in a combination manner in an AMVP candidate generation process according to an embodiment of the present invention.

The overall operation is to check the existence of temporally/spatially adjacent candidate blocks, fetch information of the existing candidates and correct the information to improve the inter prediction efficiency, add the candidate blocks to the candidate list, and generate a virtual candidate when the candidate is insufficient, thereby completing the candidate list.

Information on the temporally/spatially adjacent candidate block may be fetched (step of "fetching WRP Flag information of candidate, S2001). The above process may correspond to the processes described above in FIGS. 13 to 16 and/or related embodiments. The existing encoding/decoding method is provided to fetch only the motion information of the candidate, while the WRP Flag information of the candidate may also be fetched according to the embodiment of the present invention.

WRP Flags of candidates having the same motion information may be compared (condition sentence step of "WRP Flags of the candidates having the same motion information are the same?", S2002). This process may correspond to the process described above in FIG. 17 and/or the related embodiments. Through the above process, reduction of the coding efficiency due to the presence of duplicate candidates in the candidate list may be prevented. The existing encoding/decoding method does not include candidates having the same motion information in the candidate list. However, according to an embodiment of the present invention, when the motion information is the same, but the WRP Flags are different, the candidate information may be included in the candidate list.

Whether the candidate block and the current block refer to the WRP may be determined (condition sentence step of "do both the candidate block and the current block refer to the WRP?", S2003-1). Whether the current block refers to a WRP may be determined (condition sentence step of "does the current block refer to WRP?", S2003-2). The candidate motion information may be scaled (step of "scaling down candidate motion information", S2003-3). The process of steps S2003-1 to S2003-3 (hereinafter referred to as "S2003") may correspond to the process described in FIG. 19 and/or the related embodiments. Through the step S2003, the motion information of the candidate may be corrected to increase the inter prediction efficiency.

Specifically, in step S2003-1, whether the candidate block and the current block refer to WRP is checked through the WRP Flag, and when both refer to the WRP, scaling is not performed. In the case that the WRP is used, since the motion intonation has little relation with the position of the reference picture on the time axis, the motion information scaling may not be necessary. Therefore, when both candidate block and current block refer to the WRP, the motion information scaling may not be performed.

In step S2003-2, it is determined that the candidate block does not refer to the WRP but the current block refers to the WRP. Referring to FIG. 20b, since whether both the candidate block and the current block refer to the WRP is determined first (S2003-1), whether the current block refers to the WRP is checked, and therefore whether or not the candidate block refers to the WRP may be checked together.

In step S2003-3, the candidate motion information may be scaled in consideration of the general characteristics of the motion information that refers to the WRP. Generally, the motion information that refers to the WRP has the characteristic of a small size. Therefore, when the candidate motion information does not refer to WRP but the current block refers to WRP, the coding efficiency may be increased by scaling down the motion information of the candidate block so as to be similar to the case of referring to WRP.

When both the current block and the candidate block do not refer to WRP, candidate motion information scaling considering a reference picture, which is the existing encoding/decoding method, may be performed, in which the difference between the current picture and the reference picture of the current block and the candidate block may be considered in order to perform the candidate motion information scaling considering the reference picture.

The priority of the list is changed according to the WRP Flag information of the current block (step of "changing list priority according to WRP Flag of current block", S2004). The above procedure corresponds to the above-mentioned contents in the method of constructing the candidate considering the WRP Flag of the current block. Through the above process, valid candidates are changed according to the WRP Flag information of the current block. Accordingly, the priority of each candidate added to the candidate list may be changed. In addition, the candidate list may be corrected by considering the priority added to the candidate list and the priority in the candidate list.

The candidates for which the WRP Flag is changed may be added to the candidate list (step of "filling candidates for which WRP Flag is changed", S2005-1). The WRP Flag may be set to a zero vector candidate (step of "setting WRP Flag to zero vector candidate", S2005-2). The process of S2005-1 to S2005-2 (hereinafter referred to as "S2005") corresponds to the process described in FIG. 18 and/or the related embodiment. On the other hand, in the existing encoding/decoding method, when the candidate list is not full even though the process of searching for the temporal/spatially adjacent candidates is completed, the zero vector candidates may be filled in the candidate list. Meanwhile, according to an embodiment of the present invention, the coding efficiency may be improved by filling more various candidates through the process of step S2005.

In step S2005-1, new candidates may be generated by copying the motion information of the candidates added to the existing candidate list and by changing the value of the WRP Flag. In the above step, the step of "scaling motion information of candidate" described above in FIG. 19 and/or the related embodiments may be applied.

In step S2005-2, when there is a zero vector candidate added to the candidate list, the WRP Flag value of the zero vector candidate is changed, or when there are several zero vector candidates, the WRP Flag values of the respective zero vector candidates are set to be different from each other. Through this process, the diversity of zero vector candidates may be ensured.

Each of the steps described above in FIGS. 20a to 20c may be changed in order, and only a part of steps may be used, and a process different from the process described in FIGS. 20a to 20c may be derived.

Figure 21:
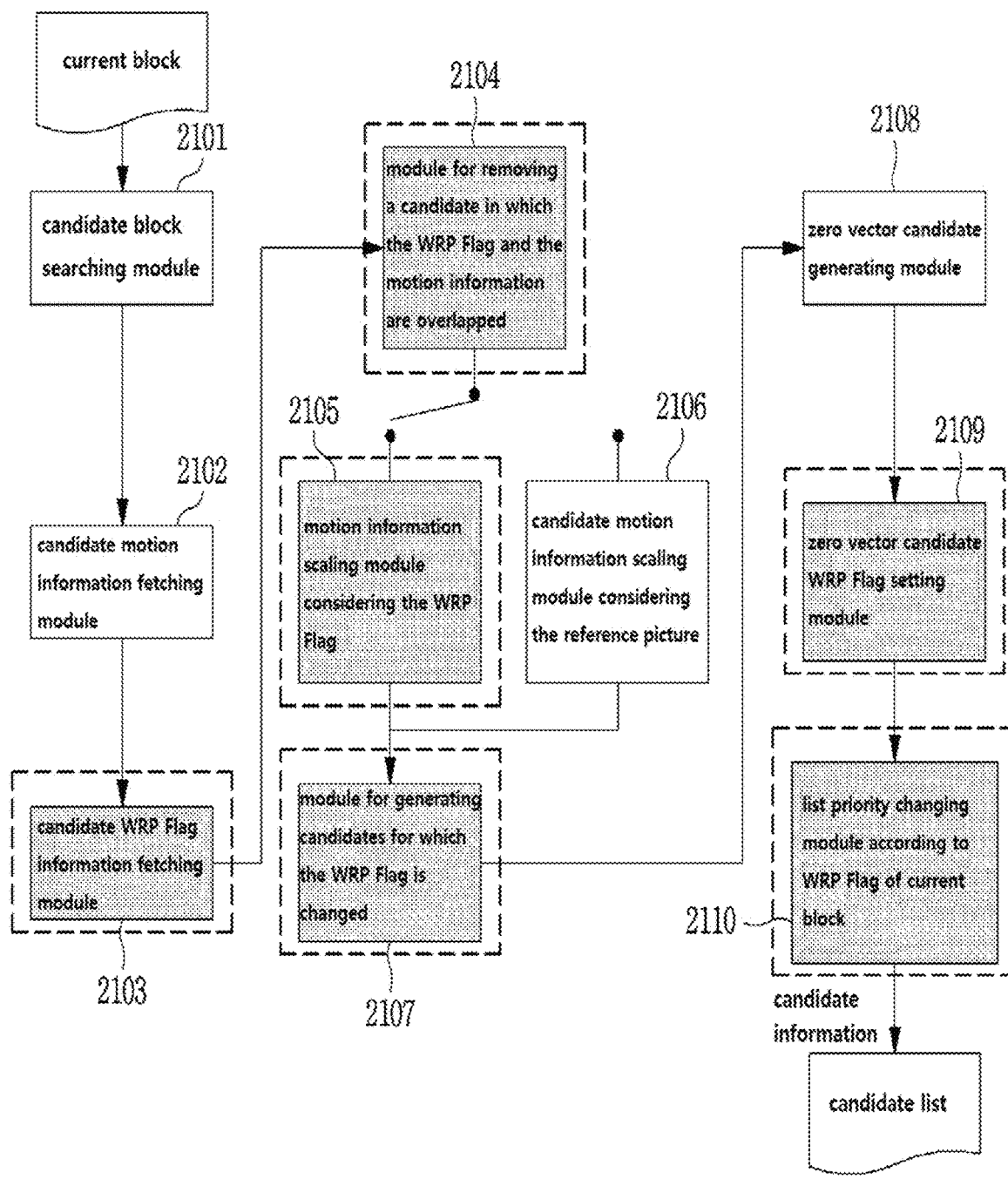
FIG. 21 is a block diagram illustrating a configuration of an encoder/decoder to which methods of using a WRP Flag are applied in a combinational manner in an AMVP candidate generation process according to an embodiment of the present invention.

FIG. 21 is a block diagram illustrating a configuration of an encoder/decoder to which methods of using a WRP Flag are applied in a combinational manner in an AMVP candidate generation process according to an embodiment of the present invention.

The overall operation is to check the existence of temporally/spatially adjacent candidate blocks, fetch information of the existing candidates and correct the information to improve the inter prediction efficiency, add the candidate blocks to the candidate list, and generate a virtual candidate when the candidate is insufficient, thereby completing the candidate list.

The candidate WRP Flag information fetching module 2103 may fetch information of the temporally/spatially adjacent candidate block. The above process may correspond to the processes described above in FIGS. 13 to 16 and/or related embodiments. The existing encoding/decoding method is provided to fetch only the motion information of the candidate, while the WRP Flag information of the candidate may also be fetched according to the embodiment of the present invention.

A module 2104 for removing a candidate in which the WRP Flag and the motion information are overlapped determines whether the motion information and/or the WRP Flag are the same. This process may correspond to the process described above in FIG. 17 and/or the related embodiments. Through the above process, reduction of the coding efficiency due to the presence of redundancy candidates in the candidate list may be prevented. The existing encoding/decoding method does not include candidates having the same motion information in the candidate list. However, according to an embodiment of the present invention, when the motion information is the same, but the WRP Flag is different, the candidate information may be included in the candidate list.

The motion information scaling module 2105 considering the WRP Flag may determine whether the candidate block and the current block refer to the WRP, determine whether the current block refers to the WRP, and scale the candidate motion information. This process may correspond to the process described above in FIG. 19 and/or the related embodiments. The motion information of the candidate may be corrected to increase the inter prediction efficiency through the above process.

Specifically, whether the candidate block and the current block refer to the WRP is checked through the WRP Flag, and when both refer to the WRP, scaling may not be performed. In the case that the WRP is used, since the motion information has little relation with the position of the reference picture on the time axis, the motion information scaling may not be necessary. Therefore, when both candidate block and current block refer to the WRP, the motion information scaling may not be performed.

In addition, since it is determined that the candidate block does not refer to the WRP but the current block refers to the WRP, the scaling may be performed when only the candidate block refers to the WRP.

In addition, the candidate motion information may be scaled considering the general characteristics of the motion information referring to the WRP. Generally, the motion information that refers to the WRP has the characteristic of a small size. Therefore, when the candidate motion information does not refer to the WRP but the current block refers to the WRP, the coding efficiency may be increased by scaling down the motion information of the candidate block so as to be similar to the case of referring to WRP.

The candidate motion information scaling module 2106 considering the reference picture considers the difference between the current picture and the reference picture of the current block and the candidate block when both the current block and the candidate block do not refer to the WRP, the candidate motion information considering the reference picture may be scaled.

A generating module 2107 of candidates for which the WRP Flag is changed may add the candidate for which the WRP Flag is changed to the candidate list. A zero vector candidate WRP Flag setting module 2019 sets the WRP Flag to the zero vector candidate. The process in the candidate generating module 2107 and/or the zero vector candidate WRP Flag setting module 2019 in which the WRP Flag is changed may correspond to the process above-described in FIG. 18 and/or the related embodiment. On the other hand, in the existing encoding/decoding method, when the candidate list is not full even though the process of searching for the temporally/spatially adjacent candidate is completed, the zero vector candidates are filled in the candidate list. On the other hand, according to an embodiment of the present invention, the coding efficiency may be improved by filling the various candidates through the above process.

The generating module 2107 of candidates for which the WRP Flag is changed copies the motion information of candidates added to the candidate list as it is, and changes the value of the WRP Flag, thereby generating a new candidate. In the above process, the step of "scaling candidate motion information" described above in FIG. 19 and/or the related embodiments may be applied.

The zero vector candidate WRP Flag setting module 2019 changes the WRP Flag value of the zero vector candidate when there is a zero vector candidate added to the candidate list or set the WRP Flag value of each zero vector candidate to be different from each other when there are several zero vector candidates. Through this process, the diversity of zero vector candidates may be ensured.

The list priority changing module 2110 according to the WRP Flag of the current block changes the priority of the list according to the WRP Flag information of the current block. The above procedure may correspond to the above-mentioned contents in the method of constructing the candidate considering the WRP Flag of the current block. Through the above process, valid candidates may be varied according to the WRP Flag information of the current block. Therefore, the priority of each candidate added to the candidate list may be changed. In addition, the candidate list may be corrected by considering the priority added to the candidate list and the priority in the candidate list.

Each of the components described above in FIG. 21 may be changed in order, and only some of the components may be used, and a structure different from the structure described above in FIG. 21 may be derived.

According to an embodiment of the present invention, a WRP Flag may be used in an AMVP process of video encoding/decoding using a geometric transform reference picture.

In addition, the WRP Flag information may be fetched from the AMVP candidate. Also, the WRP Flag information of the AMVP candidates is compared. Also, the AMVP candidates may be generated by changing the WRP Flag. Also, the motion information scaling may be selectively performed according to the WRP Flag.

In addition, the WRP Flags of the current block and the candidate block may be compared. In addition, when the WRP Flag of the current block is the same as that of the candidate block, the motion information scaling may be omitted. In addition, when the WRP Flag of the current block indicates that WRP is used and the WRP Flag of the candidate block indicates that WRP is not used, scaling may be performed to reduce the size of motion information.

In addition, the configuration of the AMVP candidate may be changed according to the WRP Flag of the current block.

Also, the priority of AMVP candidates may be changed according to the WRP Flag of the current block.

Also, the AMVP candidate list may be regenerated according to the WRP Flag of the current block.

According to an embodiment of the present invention, when using a merge mode, which is one of the inter prediction methods, the WRP Flag is considered so that it is possible to improve the prediction accuracy and the coding efficiency of the prediction technique used in the encoder and decoder.

In the merge mode, motion information of neighboring blocks is used as it is in performing inter prediction. The merge mode is one of inter prediction techniques for improving the coding efficiency by enabling encoding and decoding with transmission and reception of motion information being omitted.

In the merge mode, a predetermined number of neighboring blocks are selected by a predetermined method, and the selected neighboring blocks are referred to as candidates or merge candidates. However, when a predetermined number of candidates are capable of being generated from the neighboring blocks, a combined list of candidates and zero vector candidates may be generated and used as the candidates.

The merge mode is one of methods for predicting the motion information, and to select, as a candidate, motion information of the temporally/spatially adjacent blocks of the current block and predict the current motion information by referring to the candidate.

In the merge mode, a predetermined number of candidates may be generated. The priority may be determined by a predetermined method when generating candidates. It is possible to check whether a candidate exists or not according to the priority, and to add the existing candidate to the candidate list with priority. Here, there may occur a case where no candidate exists. For example, the candidate may not exist when the neighboring block performs intra prediction or the neighboring block itself at the position to which is referred does not exist. When there are many cases in which there are no candidates, the predetermined number of candidates may not be ensured.

Figures 22, 23:
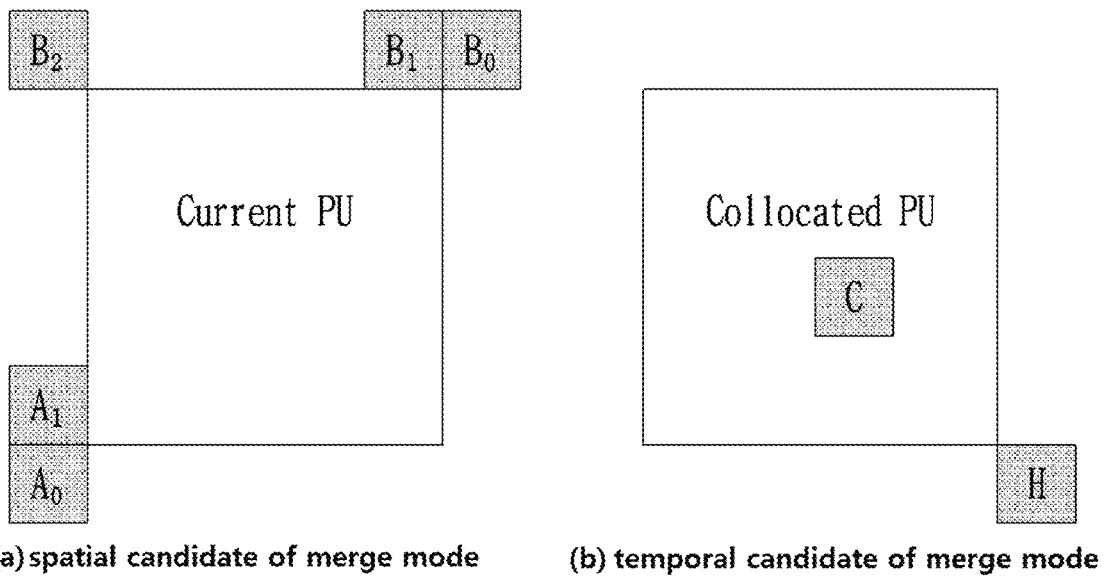
FIG. 22 is a diagram illustrating construction of a temporal/spatial candidate in a merge mode according to an embodiment of the present invention.
FIG. 23 is a diagram illustrating a combined list merge candidate generation process according to an embodiment of the present invention.

FIG. 22 is a diagram illustrating construction of a temporal/spatial candidate in a merge mode according to an embodiment of the present invention.

The merge mode may preferentially construct a spatial merge candidate. In FIG. 22(*a*), Current PU refers to a current block, and A0, A1, B0, B1, and B2 refer to neighboring blocks spatially adjacent to the current block. In FIG. 22(*a*), the candidates may be selected with priorities of A1, B1, B0, A0, and B2 (that is, A1→B1→B0→A0→B2). When the number of candidates is insufficient, the process proceeds to a step of searching for the temporal candidate. The temporal candidate may be selected from H and C in FIG. 22(*b*) and the priority may be an order of H and C (i.e., H→C).

There may be a case in which the number of candidates is insufficient even after completion of the temporal/spatial merge candidate search process. In the existing merge mode, the following method may be used to solve the above problem. As an example, a combined list (combined bi-predictive merge list) method may be used. The combined list is a method of generating a merge candidate for bi-directional prediction with a combination of the candidates to which earlier candidates are added. A new candidate may be generated by mixing an L0 merge candidate and an L1 merge candidate of each candidate added to the current candidate according to a predetermined order. Bidirectional prediction may mean performing inter prediction from two or more reference pictures and performing inter prediction by merging the respective results of the inter prediction via a weighted average method or the like, in performing the inter prediction. For example, bidirectional prediction that refers to two reference pictures may be performed, in which of the two used reference pictures, one is referred to as L0 reference picture, and the other is referred to as reference picture. The L0 list and the L1 list indicate lists for storing and managing reference pictures, respectively. One reference picture is selected from the L0 list, and one reference picture is selected from the L1 list, so that two reference pictures are used for bidirectional prediction. The L0 merge candidate refers to a merge candidate that refers to the L0 reference picture, which is a reference picture taken from the L0 list, and the L1 merge candidate refers to a merge candidate that refers to the L1 reference picture, which is a reference picture taken from the L1 list. Generally, when bidirectional prediction is performed, the merge candidate may be a sum of the L0 merge candidate and the L1 merge candidate. The combined list method may generate new candidates by mixing the L0 merge candidate and L1 merge candidate of each merge candidate.

FIG. 23 is a diagram illustrating a combined list merge candidate generation process according to an embodiment of the present invention.

Referring to FIG. 23, A and B represent candidates added to the candidate list. On the other hand, C1 and C2 represent candidates generated using the combined list method. C1 is generated using the L0 merge candidate of A and the L1 merge candidate of B, and C2 is generated using the L1 merge candidate of A and the L0 merge candidate of B.

When candidates are added using the combined list method but the number of candidates is insufficient, or when the candidate list is insufficient but the combined list method may be used, the number of zero vector candidates may be added by the insufficient number. The zero vector indicates a motion vector representing "no motion".

According to an embodiment of the present invention, additional virtual candidates may be generated by changing information of the WRP Flag.

In addition, a new candidate may be generated or the existing candidate may be substituted by copying the existing selected candidate and changing the WRP Flag of the copied candidate. Therefore, by changing the value of the WRP Flag of the candidate, the diversity of candidates may be increased and the improvement of the coding efficiency may be expected.

In addition, the combined list may be created by changing the WRP Flag value of the spatial candidate, by changing the WRP Flag value of the temporal candidate, by considering the WRP Flag, or the new candidates may be generated by generating the zero vector candidates considering the WRP Flag.

Figure 24:
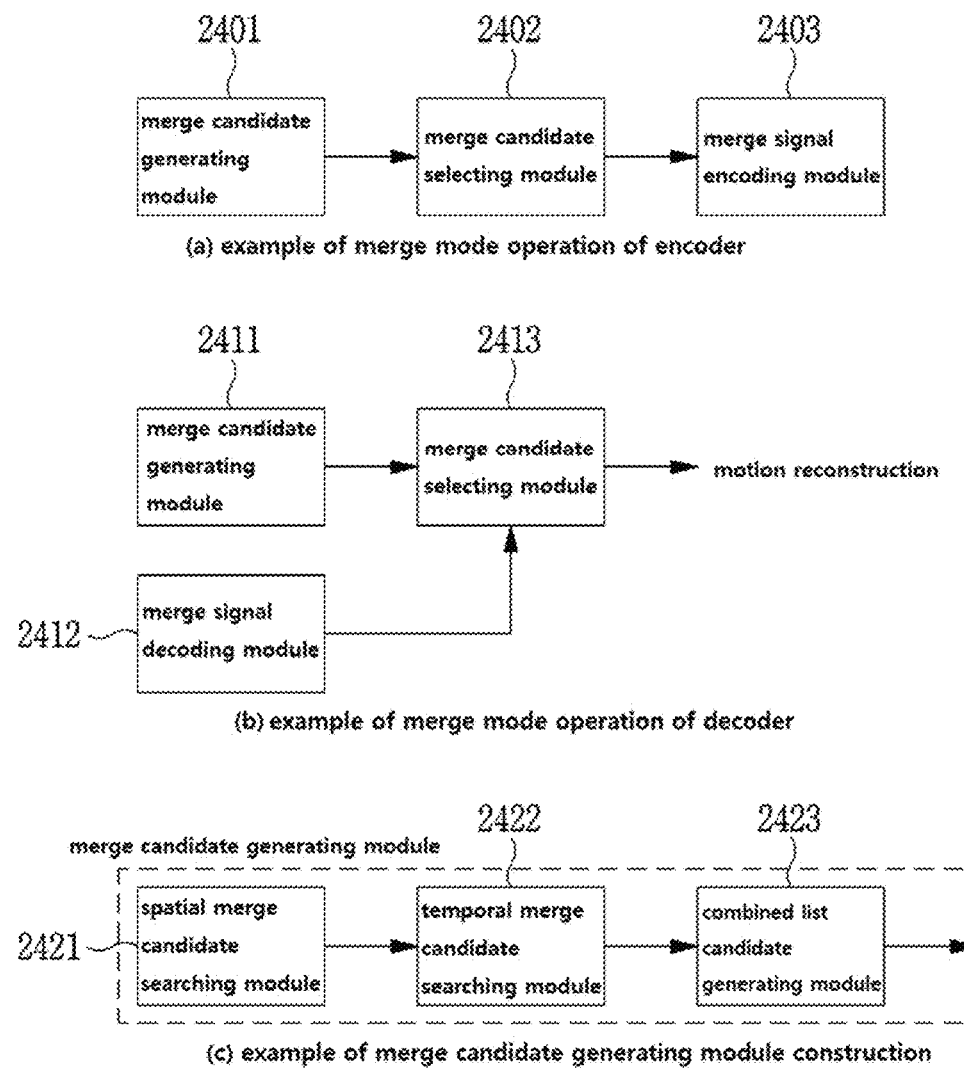
FIG. 24 is a block diagram illustrating a configuration of an existing encoder/decoder for operation of a merge mode according to an embodiment of the present invention.

FIG. 24 is a block diagram illustrating a configuration of an existing encoder/decoder for operation of a merge mode according to an embodiment of the present invention.

FIG. 24(a) is a block diagram showing a configuration of an existing encoder for a merge mode operation. The merge candidate generating module 2401 searches for or generates candidates capable of being used in the merge mode, and adds the same to the candidate list. The merge candidate selecting module 2402 may select candidates having high coding efficiency among the candidates generated by the merge candidate generating module 2401 and then added to the candidate list and generate a signal informing of the selected candidate. The merge signal encoding module 2403 encodes the signal generated by the merge candidate selecting module 2402.

FIG. 24(b) is a block diagram showing a configuration of an existing decoder for the merge mode operation. The merge candidate generating module 2411 may search for or generate candidates capable of being used in the merge mode, and add the same to the candidate list. The merge signal decoding module 2412 may decode a signal informing of the selected candidates which is encoded and transmitted by the encoder. The merge candidate selecting module 2413 may use the signal decoded by the merge signal decoding module 2412 to select the same merge candidate as the encoder among the candidates added to the candidate list. A motion reconstruction step of inter prediction may be performed using the selected merge candidate.

FIG. 24(c) is a block diagram showing a configuration of a merge candidate generating module shown in FIG. 24(a) and/or FIG. 24(b), in which candidates are searched for in a predetermined priority order and existing candidates are added to the candidate list. The connection order of each module in FIG. 24 (c) is determined according to the predetermined priority, and the order may be changed according to the priority. The spatial merge candidate searching module 2421 searches for spatial merge candidates from spatially adjacent blocks belonging to the same picture as the current block. The temporal merge candidate searching module 2422 searches for temporal merge candidates from temporally adjacent blocks belonging to the picture different from the current block. The combined list candidate generating module 2423 generates a combined list merging candidate from the candidates added to the candidate list. The zero vector candidate generating module 2424 may add zero vector candidates until the number of candidates in the candidate list reaches a predetermined number when the number of candidates in the candidate list is less than the predetermined number. Each module of FIG. 24(c) may omit performing the process according to a predetermined condition. For example, since it is not necessary to add candidates any more when the number of candidates in the candidate list reaches the predetermined number, the subsequent steps may be omitted.

FIGS. 25a to 25d are block diagrams illustrating a configuration of an encoder/decoder for operation of a merge mode using a WRP Flag according to an embodiment of the present invention.

Figure 25A:
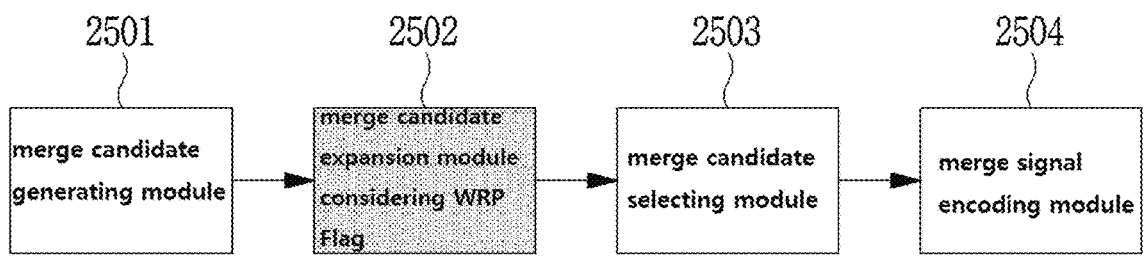
FIGS. 25A to 25D are block diagrams illustrating a configuration of an encoder/decoder for operation of a merge mode using a WRP Flag according to an embodiment of the present invention.

FIG. 25a is a block diagram illustrating a configuration of an encoder for a merge mode operation using a WRP Flag according to an embodiment of the present invention.

The merge candidate generating module 2501 may search for or generate candidates capable of being used in the merge mode and add the same to the candidate list.

The merge candidate expansion module 2502 considering the WRP Flag generates additional merge candidates and adds the same to the candidate list according to an embodiment of the present invention.

The merge candidate selecting module 2503 selects candidates having higher coding efficiency among candidates searched for or generated by the merge candidate generating module 2501 and the merge candidate expansion module 2502 and then added to the candidate list, and generate a signal informing of the selected candidates.

The merge signal encoding module 2504 encodes the signal generated by the merge candidate selecting module 2503.

Figure 25B:
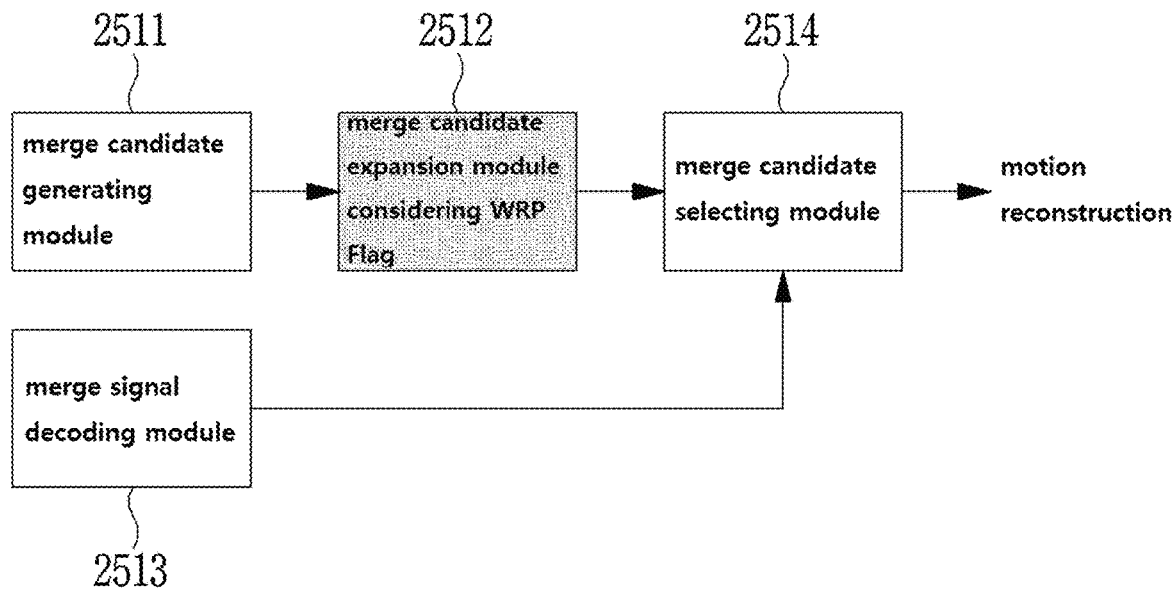

FIG. 25b is a block diagram illustrating a configuration of a decoder for merge mode operation using the WRP Flag according to an embodiment of the present invention.

The merge candidate generating module 2511 searches for or generates candidates capable of being used in the merge mode, and adds the candidates to the candidate list.

The merge candidate expansion module 2512 considering the WRP Flag generates additional merge candidates and adds the same to the candidate list according to an embodiment of the present invention.

The merge signal decoding module 2513 may decode a signal informing of the selected candidate, which is encoded and transmitted by the encoder.

The merge candidate selecting module 2514 may select the same merge candidate as the encoder among the candidates added to the candidate list by using the signal decoded by the merge signal decoding module 2513. Decoding through inter prediction using the selected merge candidate may be performed.

Figure 25C:
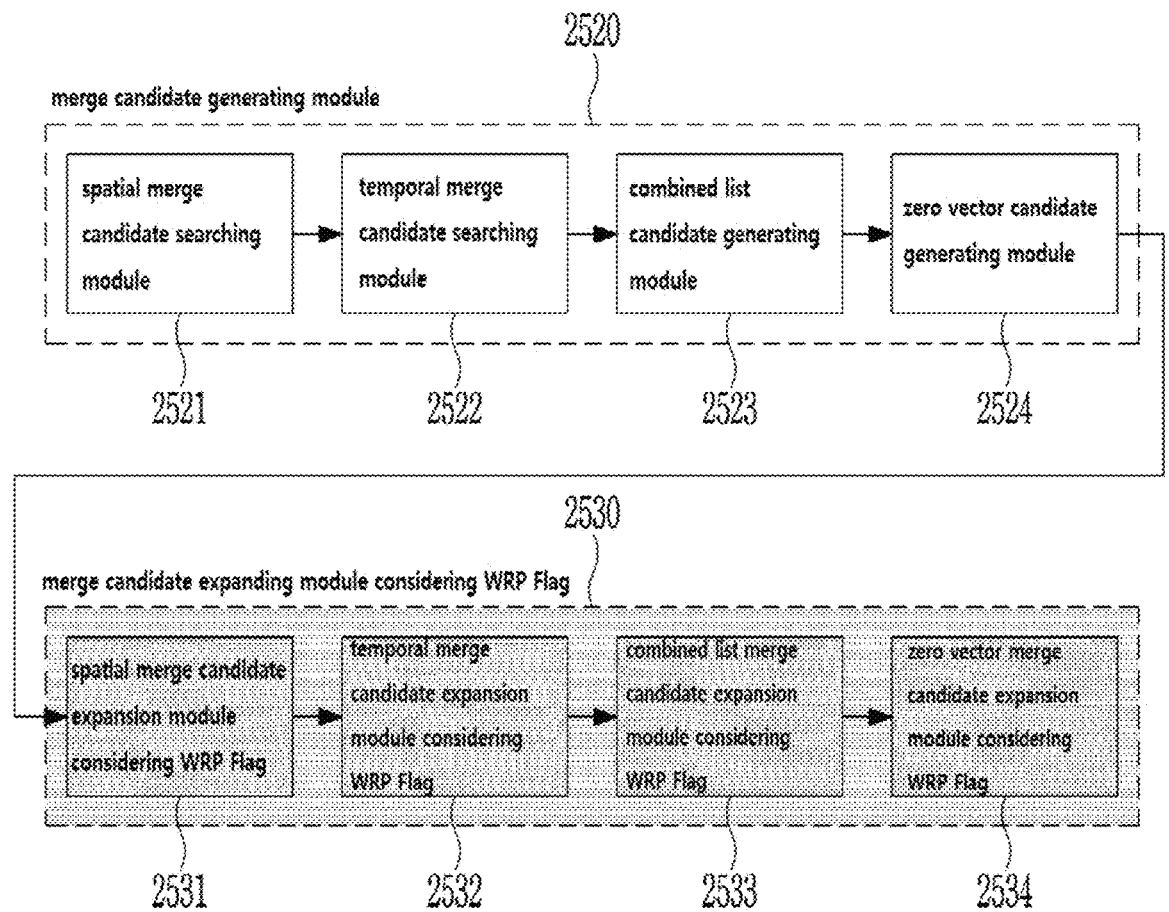

FIG. 25c is a block diagram illustrating operations of the merge candidate generating module and the merge candidate expansion module considering the WRP Flag above-described in FIG. 25a and/or FIG. 25b according to an embodiment of the present invention.

A merge candidate generating module 2520 searches for candidates according to a predetermined priority order, and add existing candidates to the candidate list. Specifically, the spatial merge candidate searching module 2521 may search for spatial merge candidates from spatially adjacent blocks belonging to the same picture as the current block. A temporal merge candidate searching module 2522 searches for temporal merge candidates from temporally adjacent blocks belonging to picture different from the current block. The combined list candidate generating module 2523 generates a combined list merging candidate from the candidates added to the candidate list. The zero vector candidate generating module 2524 adds zero vector candidates until the number of candidates in the candidate list reaches the predetermined number when the number of candidates in the candidate list is less than the predetermined number.

The spatial merge candidate expansion module 2531 considering the WRP Flag generates a new merge candidate by changing the WRP Flag value of the candidates found by the spatial merge candidate searching module 2521. The temporal merge candidate expansion module 2532 considering the WRP Flag generates a new merge candidate by changing the WRP Flag value of the candidates found by the temporal merge candidate searching module 2522. The combined list merge candidate expansion module 2533 considering the WRP Flag may generate a new merge candidate by changing the WRP Flag value of the candidates found by the combined list merging candidate search module 2523. The zero vector merge candidate expansion module 2534 considering the WRP Flag generates a new merge candidate by changing the WRP Flag value of the candidates found by the zero vector candidate ranking module 2524.

Each module of FIG. 25c omits performing the process according to a predetermined condition. For example, since it is not necessary to add candidates any more when the number of candidates in the candidate list reaches a predetermined number, the subsequent steps may be omitted. The connection order of each module in FIG. 25C is determined according to a predetermined priority and changed according to the priority. The order of each module may be changed between the merge candidate generating module 2520 and/or the merge candidate expansion module 2530 considering the WRP Flag.

Figure 25D:
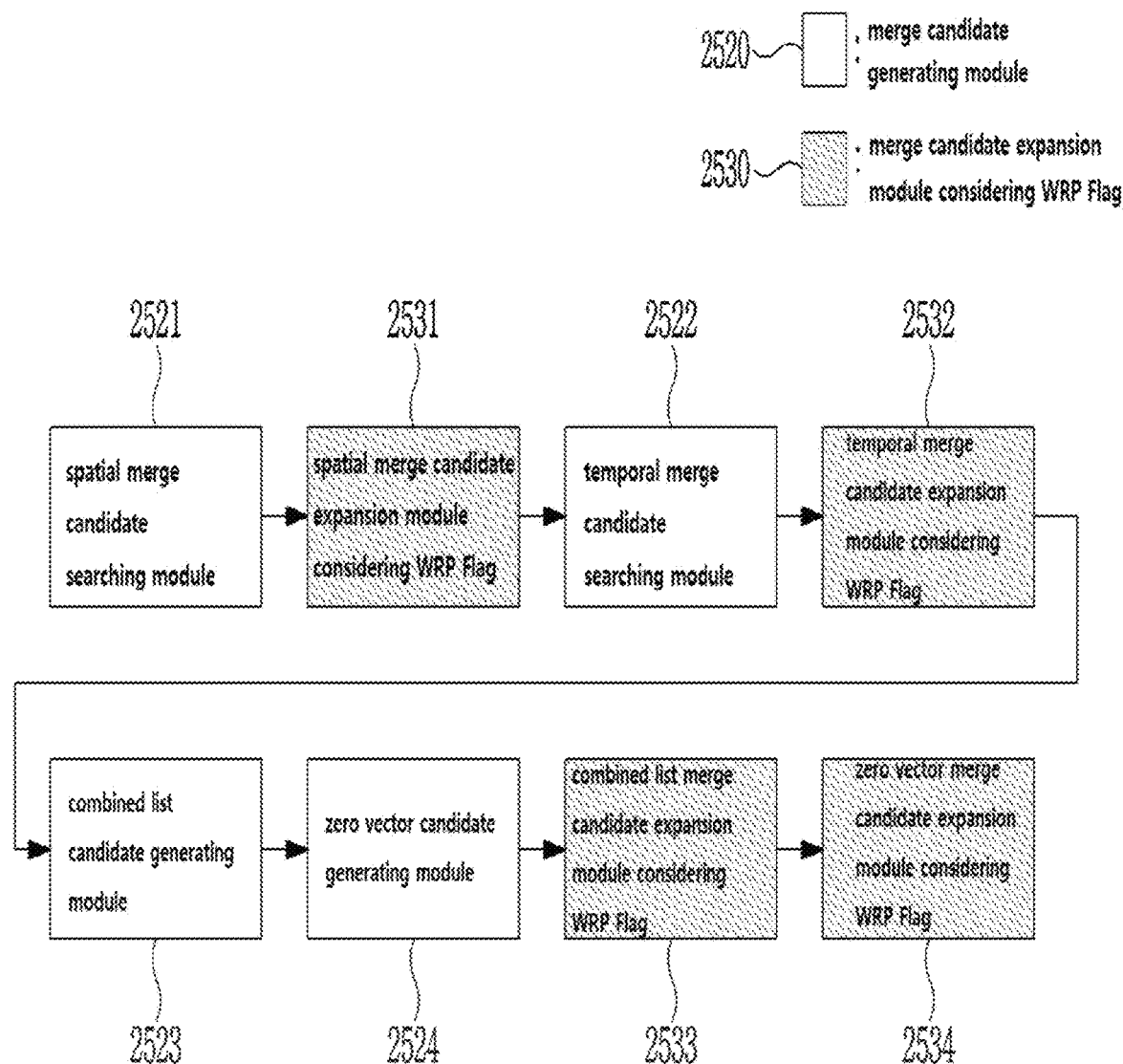

FIG. 25d is a diagram showing a case in which the order is changed by priority change between a merge candidate generating module and a merge candidate expansion module considering a WRP Flag according to an embodiment of the present invention.

Referring to FIG. 25c and FIG. 25d, the spatial merge candidate expansion module 2531 may be performed first considering the WRP Flag of the merge candidate expansion module 2530 considering the WRP Flag before the other module of the merge candidate generating module 2520 is performed after the spatial merge candidate searching module 2521. The temporal merge candidate expansion module 2532 is performed first considering the WRP Flag of the merge candidate expansion module 2530 considering the WRP Flag before the other module of the merge candidate generating module 2520 is performed after the temporal merge candidate searching module 2522. As described above, the merge candidate generating module 2520 and the merge candidate expansion module 2530 considering the WRP Flag may be merged to each other through a method such as an order change.

According to an embodiment of the present invention, each detailed process in the existing merge candidate generating module and merge candidate expansion module considering WRP Flag may be performed in various orders, and if necessary, new detailed processes are added. Further, the methods listed above may all be used, or may be partially used as needed.

Figure 26A:
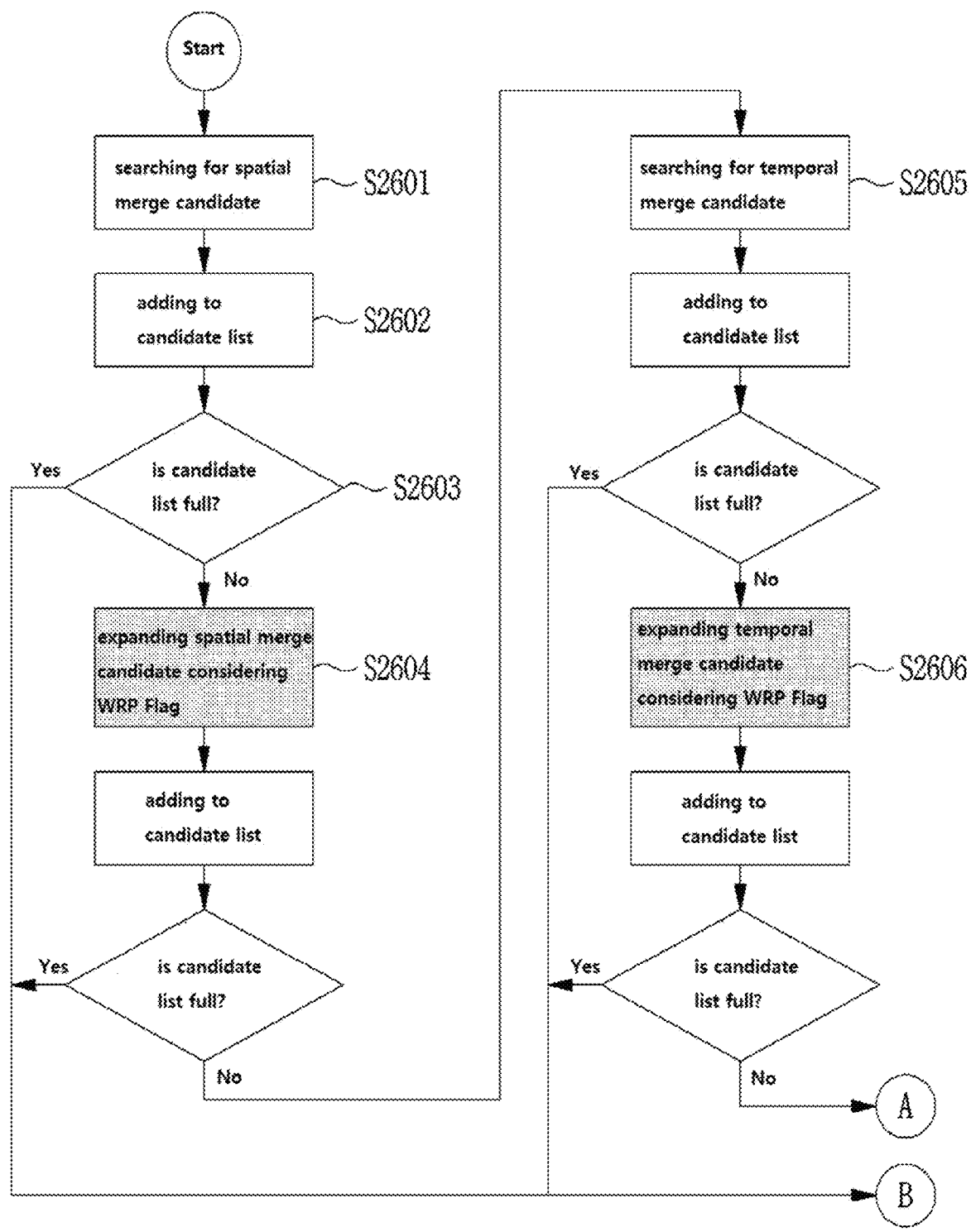
FIGS. 26A and 26B are flowcharts illustrating a merge mode operation in an encoder according to an embodiment of the present invention.
Figure 26B:
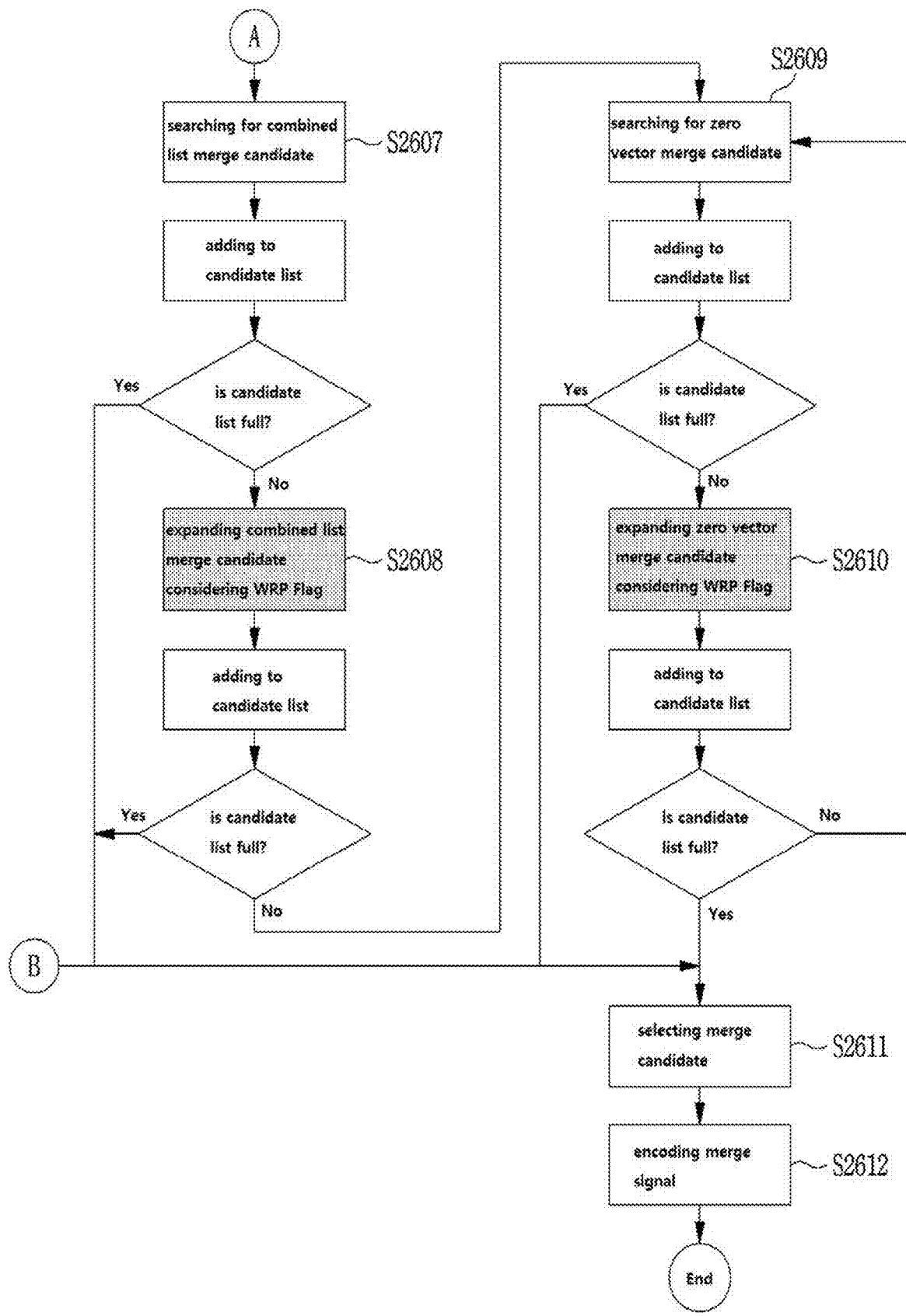

FIGS. 26a and 26b are flowcharts illustrating a merge mode operation in an encoder according to an embodiment of the present invention.

The candidates capable of being used in the merge mode may be searched for or generated (step of "searching for spatial merge candidate, S2601).

The candidate found or generated may be added to the candidate list (step of "adding to candidate list", S2602).

Whether there are a predetermined number of candidates included in the candidate list is determined (condition sentence step of "is candidate list full?", S2603).

When there are a predetermined number of candidates included in the candidate list, steps associated with searching for and generating merge candidates capable of being performed in the next step are omitted, and the process may proceed to a step of "selecting merge candidate" (S2611).

When there are not a predetermined number of candidate candidates in the candidate list, the process proceeds to next step of searching for and generating the merge candidate.

A new merge candidate may be generated by changing the WRP Flag value of the candidates found or generated in the step of "searching for spatial merge candidate" (S2601) (step of "expanding spatial merge candidate considering WRP Flag", S2604).

The temporal merge candidate is searched for from the temporally adjacent blocks belonging to picture different from the current block (step of "searching for merge candidate", S2605).

A new merge candidate may be generated by changing the WRP Flag value of the candidates found in the step of "searching for temporal merge candidate" (S2605) (step of "expanding temporal merge candidate considering WRP Flag", S2606).

The combined list merge candidate may be searched for and/or generated from the candidates added to the candidate list (step of "searching for combined list merge candidate", S2607).

The new merge candidate may be generated by changing the WRP Flag value of the candidates searched for in the step of "searching for combined list merge candidate" (S2607) (step of "expanding combined list merge candidate considering WRP Flag", S2608).

When the number of candidates in the candidate list is less than the predetermined number, zero vector candidates are generated and added until the number of candidates in the candidate list reaches the predetermined number (step of "generating zero vector candidates", S2609).

A new merge candidate is generated by changing the WRP Flag value of the candidates searched for in the step of "searching for zero vector merge candidate" (S2609) to replace the zero vector merge candidate (step of "expanding zero vector merge candidate considering WRP Flag", S2610).

A candidate having high coding efficiency is selected from the candidates added to the candidate list, and a signal indicating the selected candidate is generated (step of "selecting merge candidate", S2611).

The signal indicating the selected candidate generated in the step of "selecting merge candidate" (S2611) may be encoded (step of "encoding merge signal", S2612).

Figure 27A:
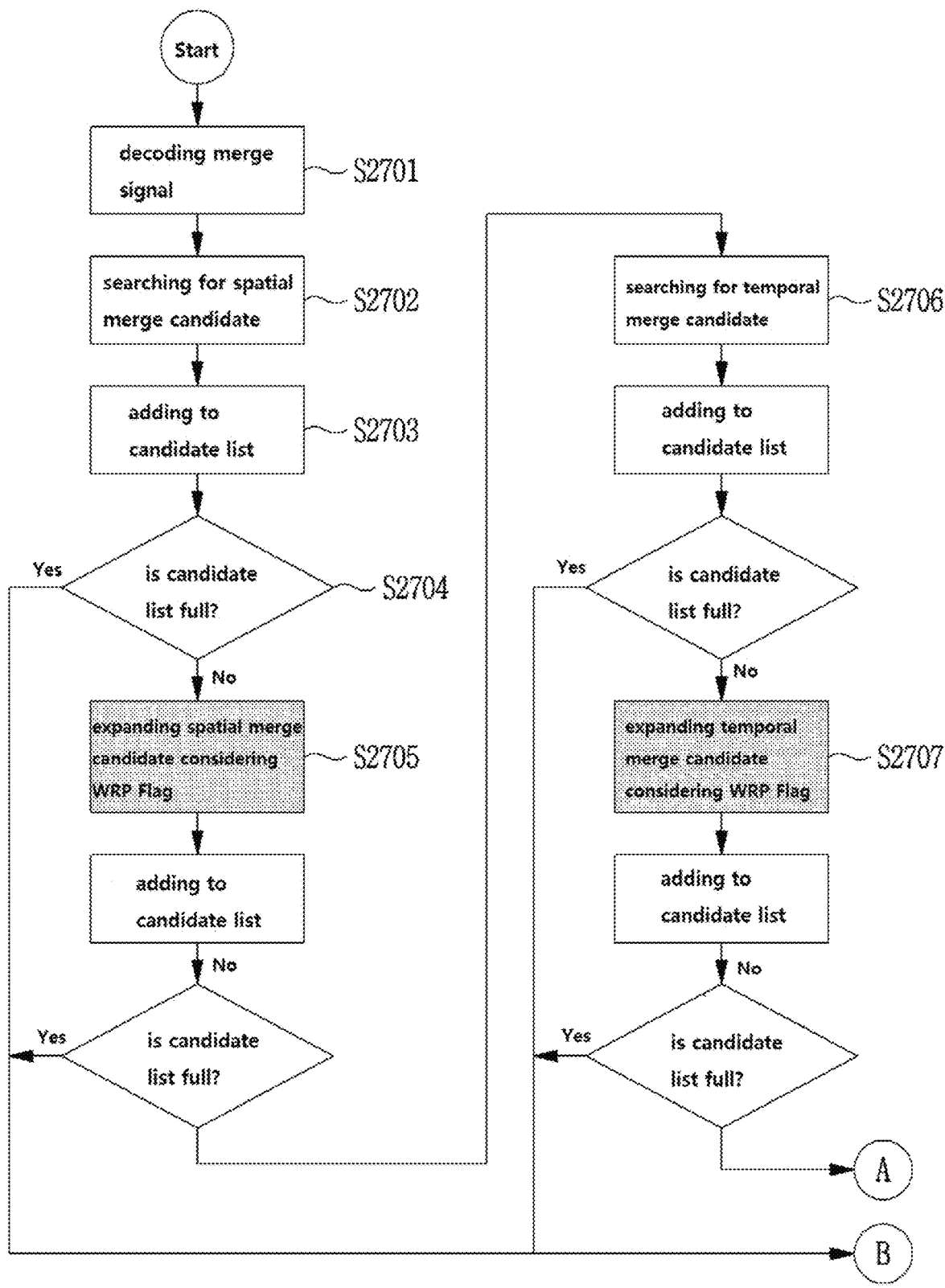
FIGS. 27A and 27B are flowcharts illustrating a merge mode operation in a decoder according to an embodiment of the present invention.
Figure 27B:
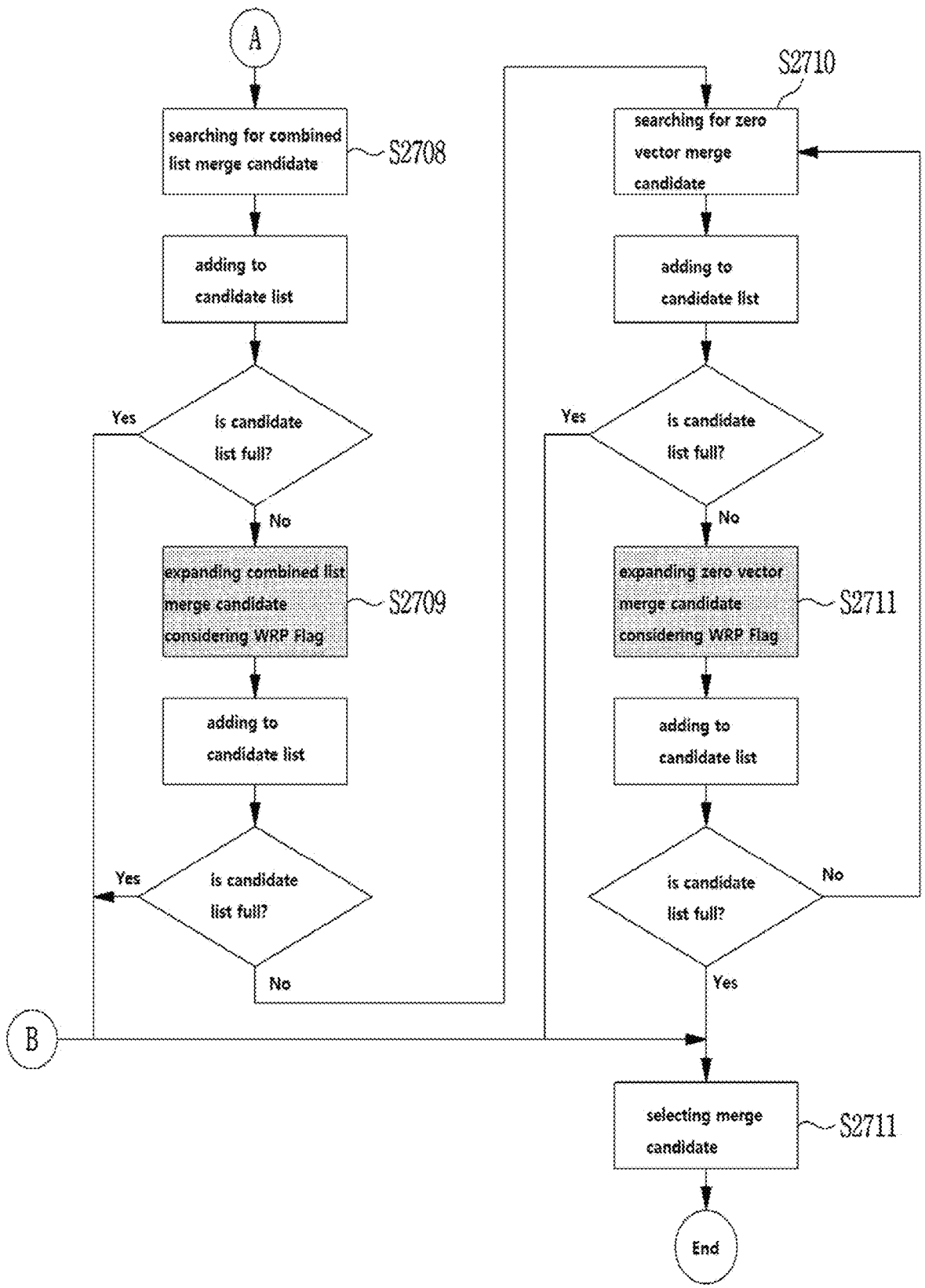

FIGS. 27a and 27b are flowcharts illustrating a merge mode operation in a decoder according to an embodiment of the present invention.

A signal indicating the selected candidates encoded by the encoder may be decoded (step of decoding merge signal", S2701). When the candidate is not the selected candidate in a step subsequent to step S2701 by using the signal informing of the selected candidates that are decoded, the process of searching for and generating the candidates may be simplified to know only whether there is a candidate.

The candidates capable of being used in the merge mode is searched for or generated (step of "searching for spatial merge candidate", S2702).

The candidate searched for or generated is added to the candidate list (step of "adding to candidate list", S2703).

For the candidate in the candidate list, it is possible to confirm whether the candidate indicated by the signal informing of the selected candidate decoded in the step of "decoding merge signal" (S2701) exists in the candidate list (condition sentence step of "is there selected candidate in candidate list?", S2704).

When there is a selected candidate among the candidates included in the candidate list, steps associated with searching for and generating merge candidates that may be performed in the next step may be omitted and the process may proceed to the step of "selecting merge candidate" (S2712).

When there is no selected candidate among the candidates included in the candidate list, the process proceeds to the next step of searching for and generating the merge candidate.

A new merge candidate may be generated by changing the WRP Flag value of the candidates searched for or generated in the step of "searching for spatial merge candidate" (S2702) (step of "expanding spatial merge candidate considering WRP Flag", S2705).

The temporal merge candidate may be searched for from the temporally adjacent blocks belonging to the current block and other pictures (step of "searching for temporal merge candidate", S2706).

A new merge candidate may be generated by changing the WRP Flag value of the candidates searched for in the step of "searching merge candidate" (S2706) (step of expanding temporal merge candidate considering WRP Flag", S2707).

The combined list merge candidate may be searched for and generated from the candidates added to the candidate list (step of "searching for combined list merge candidate", S2708).

A new merge candidate may be generated by changing the WRP Flag value of the candidates searched for in the step of "searching for combined list merge candidate" (S2708) (step of "expanding combined list merge candidate considering WRP Flag", S2709).

When the number of candidates in the candidate list is less than the predetermined number, zero vector candidates are generated and added until the number of candidates in the candidate list reaches the predetermined number (step of "searching for zero vector merge candidate", S2710).

A new merge candidate may be generated by changing the WRP Flag value of the candidates searched for in the step of "searching for zero vector merge candidate" (S2710), thereby replacing the zero vector merge candidate (step of "expanding zero vector merge candidate considering WRP Flag", S2711).

Through the signal decoded in the step of "decoding merge signal" (S2701), the same merge candidate as that of the encoder among the candidates added to the candidate list is selected (step of "selecting merge candidate", S2712).

Decoding through inter prediction may be performed using the selected merge candidate.

Hereinafter, a method of generating a candidate by changing the WRP Flag value of the spatial candidate will be described below.

According to an embodiment of the present invention, when constructing merge candidates in encoding and decoding using geometric transform, WRP Flag information may be fetched from a neighboring block. Here, the type of the reference picture is changed by changing the value of the WRP Flag. This enables obtaining the effect of referring to another reference picture with the same motion information. Therefore, a new merge candidate may be generated by changing the WRP Flag information of the spatial candidate.

Figure 28:
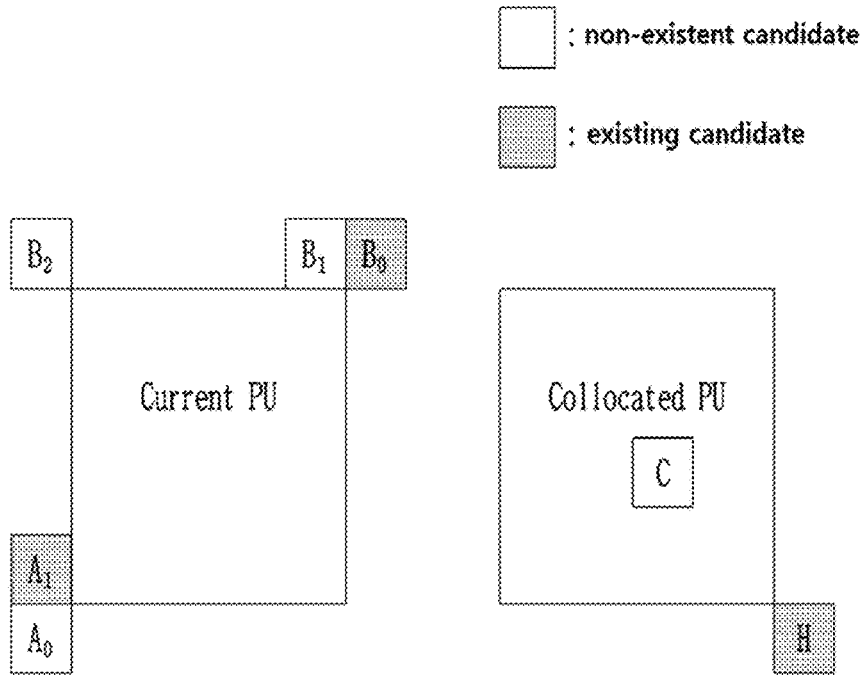
FIG. 28 is a diagram illustrating a process of generating a merge candidate by changing a WRP Flag of a spatial candidate according to an embodiment of the present invention.

FIG. 28 is a diagram illustrating a process of generating a merge candidate by changing a WRP Flag of a spatial candidate according to an embodiment of the present invention.

FIG. 28 is an example of a case in which a total of five merge candidates are generated. Referring to FIG. 28(a), two available spatial candidates A1 and B0 and one available temporal candidate H are obtained. Therefore, referring to FIG. 28(b), after the step of searching for the temporal/spatial merge candidate, the selected merge candidates selected are three of A1, B0, and H in total. The hatched area of the candidate list is an empty space in the candidate list, and the void space means the insufficient candidate (or the number of candidates) when the number of candidates is insufficient after the step of searching for temporal/spatial candidate is completed. Thus, a total of two candidates are insufficient.

Referring to FIG. 28(c), according to an embodiment of the present invention, new candidates A1' and B0' are generated by copying the spatial merge candidates A1 and B0, respectively, and then changing the WRP Flag information. For example, the WRP Flag may be expressed as True and False, and it may be seen that the A1' candidate is generated by changing the WRP Flag of the A1 candidate from True to False and the B0' candidate is generated by changing the WRP Flag of the B0 candidate from False to True.

In addition, according to an embodiment of the present invention, when the number of insufficient candidates is smaller than the number of candidates capable of being generated, it is possible to select and use the candidate by the required number, from among the number capable of being generated. For example, when the number of insufficient candidates in FIG. 28(c) is one, one of A1' and B0' may be selected and used.

FIGS. 29a to 29d are diagrams illustrating a process of generating a merge candidate having bidirectional motion information by changing a WRP Flag of a spatial candidate according to an embodiment of the present invention.

Figure 29A:
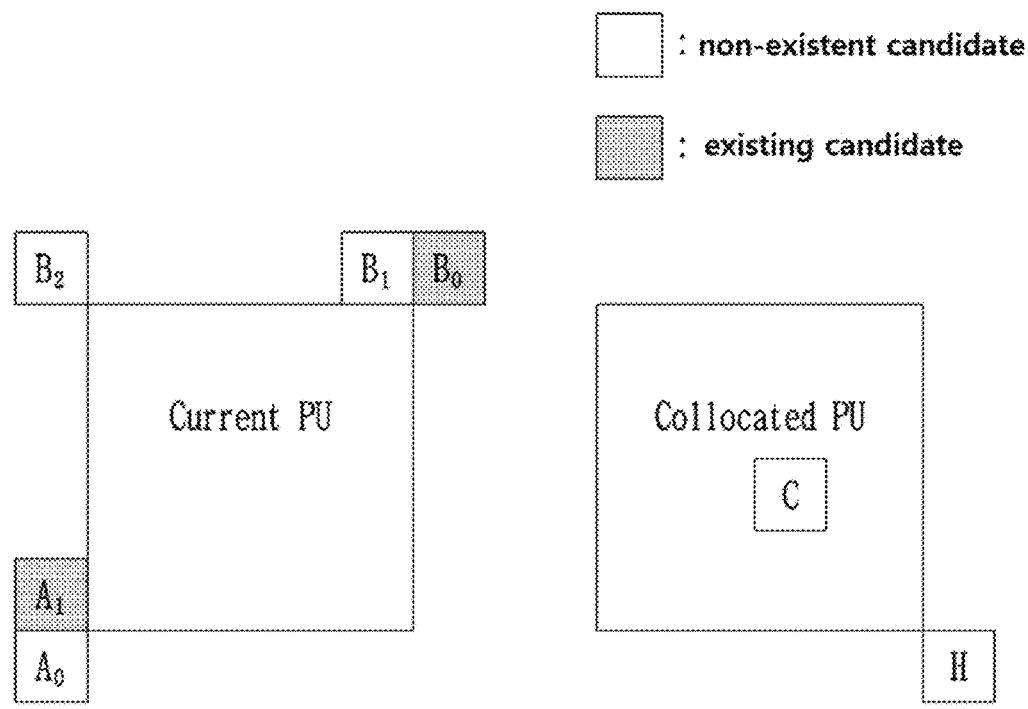

FIGS. 29a to 29d are examples for the case where a total of five merge candidates are generated. Referring to FIG. 29a, as one example of searching for a spatial/temporal candidate in the merge mode, temporal/spatial candidates capable of being used are A1 and B0. Therefore, referring to FIG. 29b, as one example of a candidate list in which the number of filled candidates is insufficient, the merge candidates selected after the process of searching for the temporal/spatial merge candidate are two of A1 and B0 in total. The hatched area of the candidate list is an empty space in the candidate list, and the empty space means an insufficient candidate when the number of candidates is insufficient after the process of searching for the temporal/spatial candidate is completed. Thus, a total of three candidates become insufficient.

Referring to FIG. 29c, according to an embodiment of the present invention, the WRP Flag of the spatial candidate is changed to fill the candidate, a new candidate A1-0 is generated by copying the spatial merge candidate A1 and then changing L0 WRP Flag information of A1, and a new candidate A1-1 is generated by changing L1 WRP Flag information of A1. In addition, a new candidate A1-2 is generated by changing both the L0 WRP Flag and the L1 WRP Flag information of A1. Here, the L0 WRP Flag means the WRP Flag of the L0 merge candidate, and the L1 WRP Flag means the WRP Flag of the L1 merge candidate.

Referring to FIG. 29d, according to another embodiment of the present invention, as an example of selecting and filling some of the candidates generated by changing the WRP Flag of the spatial candidate, a new candidate A1-0 is generated by copying the spatial merge candidate A1 and then changing the L0 WRP Flag information. In addition, a new candidate A1-1 may be generated by changing the L1 WRP Flag information of A1. In addition, a new candidate A1-2 may be generated by changing both the L0 WRP Flag and the L1 WRP Flag information of A1. In addition, a new candidate B0-0 may be generated by copying the spatial merge candidate B0 and then changing the L0 WRP Flag information of B0. In addition, a new candidate B0-1 may be generated by changing the L1 WRP Flag information of B0. In addition, a new candidate B0-2 may be generated by changing both the L0 WRP Flag and the L1 WRP Flag information of B0. Here, the L0 WRP Flag means the WRP Flag of the L0 merge candidate, and the L1 WRP Flag means the WRP Flag of the L1 merge candidate. The insufficient number of candidates among candidate candidates generated may be selected and used.

For example, a total of number of insufficient candidates is three, and A1-0, A1-1, and B0-2 are selected and used from among the six candidates A1-0, A1-1, A1-2, B0-0, B0-1, and B0-2 generated.

Hereinafter, a method of generating a candidate by changing the WRP Flag value of the temporal candidate will be described below.

As with spatial candidates, temporal candidates may also generate new merge candidates by changing the WRP Flag information.

Figure 30:
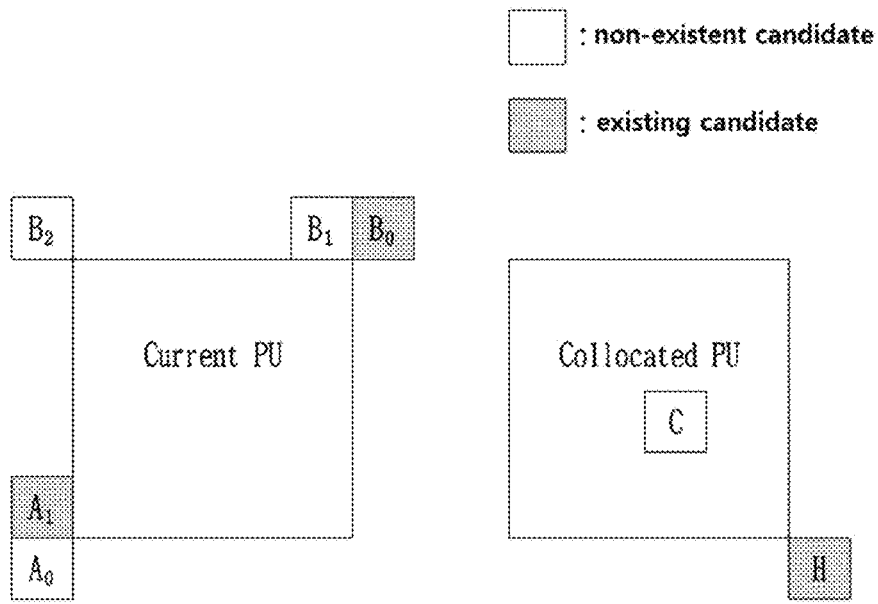
FIG. 30 is a diagram illustrating a process of generating a merge candidate by changing a WRP Flag of a temporal candidate according to an embodiment of the present invention.

FIG. 30 is a diagram illustrating a process of generating a merge candidate by changing a WRP Flag of a temporal candidate according to an embodiment of the present invention.

FIG. 30 is an example of a case in which a total of five merge candidates are generated. Referring to FIG. 30(a), the spatial candidates capable of being used are two of A1 and B0, and the temporal candidate is one of H. Therefore, referring to FIG. 30 (b), after the process of search for the temporal/spatial merge candidate completes, the merge candidates selected are three of A1, B0, and H in total. The hatched area of the candidate list is an empty space in the candidate list, and the empty space means an insufficient candidate when the number of candidates is insufficient after the step of searching for the temporal/spatial candidate search completes. Thus, a total of two candidates become insufficient.

Referring to FIG. 30(c), according to an embodiment of the present invention, a new candidate H' is generated by copying the temporal merging candidate H and then changing the WRP Flag information. The WRP Flag may be expressed as True and False. Here, it may be seen that the H' candidate is generated by changing the WRP Flag of the H candidate from True to False.

FIGS. 31a and 31b are diagrams illustrating a process of generating a merge candidate having bidirectional motion information by changing a WRP Flag of a temporal candidate according to an embodiment of the present invention.

FIGS. 31a and 31b show an example in which five merge candidates are generated in total. Referring to FIG. 31a (a), the available spatial candidate is one of A1, and the available temporal candidate is also one of H. Therefore, referring to FIG. 31a (b), after the process of searching for the temporal/spatial merge candidate, the selected merge candidates are two of A1 and H in total. The hatched area of the candidate list is an empty space in the candidate list, and the empty space is an insufficient candidate when the number of candidates is insufficient after the process of searching for the temporal/spatial candidate is completed. Thus, a total of three candidates become insufficient.

Referring to FIG. 31b, according to an embodiment of the present invention, a new candidate H-0 may be generated by copying the temporal merging candidate H and then changing the L0 WRP Flag information of H. In addition, a new candidate H-1 may be generated by changing the L1 WRP Flag information of H. The new candidate H-2 may be generated by changing both the L0 WRP Flag and the L1 WRP Flag information of H. Here, the L0 WRP Flag means the WRP Flag of the L0 merge candidate, and the L1 WRP Flag means the WRP Flag of the L1 merge candidate.

According to an embodiment of the present invention, in the case of a temporal merge candidate, the reference picture used by the temporal merge candidate may be different from the reference picture of the current block. In addition, referencing pictures as well as reference pictures may be different. That the reference pictures are different means that the positions of the reference pictures on the time axis are different from each other. Also, the referencing pictures may be different.

In the case of the current block, the current picture refers to a referencing picture. In the case of the candidate block, a picture to which a candidate block belongs is a referencing picture. Since the position of the reference picture on the time axis and the position of the reference picture on the time axis are different from each other, the motion information may be different.

In the merge mode, the motion information may be corrected by considering the temporal distance between pictures to which the reference block and the block to be referred belongs respectively. The temporal distance between the picture to which the current block belongs and the picture to which the current block refers and the temporal distance between the picture to which the candidate block belongs and the picture to which the candidate block refers are compared, so that the motion information of the candidate block is predicted to be more similar to the motion information of the current block, which is called motion information scaling.

Figure 32:
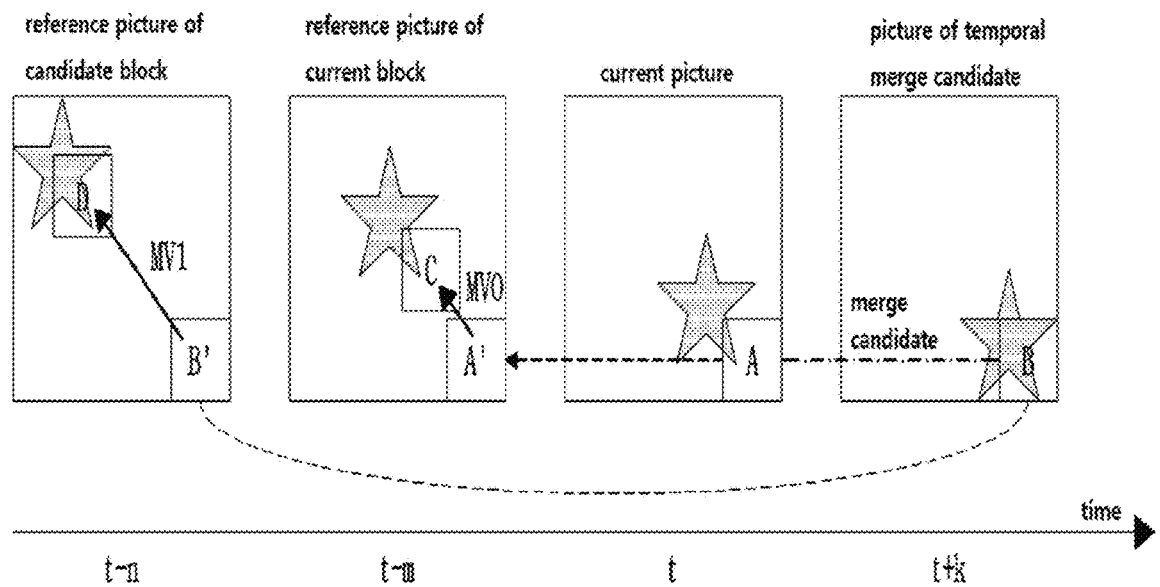
FIG. 32 is a diagram illustrating an example of a case in which motion information scaling of a temporal merge candidate is required according to an embodiment of the present invention.

FIG. 32 is a diagram illustrating an example of a case in which motion information scaling of a temporal merge candidate is required according to an embodiment of the present invention.

t indicates a position of a current picture on the time axis, and t+k indicates a position on a time axis of a picture to which a candidate block belongs. Also, t−n may indicate a position of a reference picture of a candidate block on the time axis. Also, t−m indicates the position of the reference picture of the current block on the time axis. As the position of each picture on the time axis changes, the motion of the video in the picture may be known. A indicates a current block and B indicates a temporal merge candidate block. In addition, A' indicates the position in the reference picture of the current block with the same spatial position as the current block A. In addition, B' indicates a position in a reference picture of a candidate block having the same spatial position as the candidate block B. In this case, the candidate block B performs inter prediction from the reference picture of the candidate block. The position of the D block may be found as a result of the inter prediction, and the position may be expressed as a motion vector MV1. The current block A performs inter prediction from the reference picture of the current block. The position of the C block may be found and the position may be expressed as a motion vector MV0. In the merge mode, the actual MV0 is not searched for. However, the closer the candidate motion vector is to MV0, the higher the coding efficiency. Therefore, when MV1 is used as a candidate as it is, the coding efficiency may not be good because the difference between MV0 and MV1 is large. Here, motion information scaling may be applied using the distance on the time axis between the current picture and the reference picture of the candidate block, and the distance on the time axis between the current picture and the reference picture of the current block. Therefore, when motion information scaling is applied to MV1, a motion vector that is transformed closer to MV0 may be obtained, and the coding efficiency may be improved by predicting MV0 using the motion vector.

According to an embodiment of the present invention, when scaling is performed on the motion information, a WRP Flag may be considered. The WRP is generated considering the global movement between the current picture and the reference picture, and the motion information may be reflected in the WRP. Since the WRP is a picture that is geometric transformed (warped) to be more similar to the current picture, the WRP considers the difference on the temporal axis between pictures in the geometric transform process. Thus, for example, when both the candidate block and the current block are set so that the WRP Flag means "referring to WRP", the motion information scaling may not be required. As another example, when the candidate block does not refer to the WRP and the current block refers to the WRP, the motion information of the candidate block may be scaled to display a smaller motion regardless of the temporal distance of the reference picture. As another example, when the WRP Flag of the candidate block is different from that of the current block, the motion information scaling may be performed considering the global motion information regardless of the temporal distance of the reference picture.

According to an embodiment of the present invention, the setting value of the WRP Flag may be arbitrarily designated for the merge candidate. Here, the motion information scaling considering the WRP Flag may be performed on the added temporal candidate, separately from the existing temporal candidate. According to the setting of the WRP Flag, it is possible to determine whether to perform the motion information scaling according to the WRP Flag setting, or to perform the motion information scaling according to whether to use the WRP Flag or global motion information, other than the temporal distance of the reference picture. Accordingly, according to the present invention, the coding efficiency may be improved by omitting the unnecessary motion information scaling process or performing a proper motion information scaling process according to the WRP Flag.

Hereinafter, a method of generating a combined list in consideration of the WRP Flag will be described below.

According to an embodiment of the present invention, as in the case of the temporal/spatial candidate, the combined list candidate may also generate a new merge candidate by changing the WRP Flag information. For example, a new candidate may be obtained by first generating a combined list candidate and then changing the WRP Flag information of the combined list candidate generated.

FIGS. 33a to 33f are diagrams illustrating a process of generating a candidate by changing a WRP Flag of a combined list merge candidate according to an embodiment of the present invention.

Figure 33A:
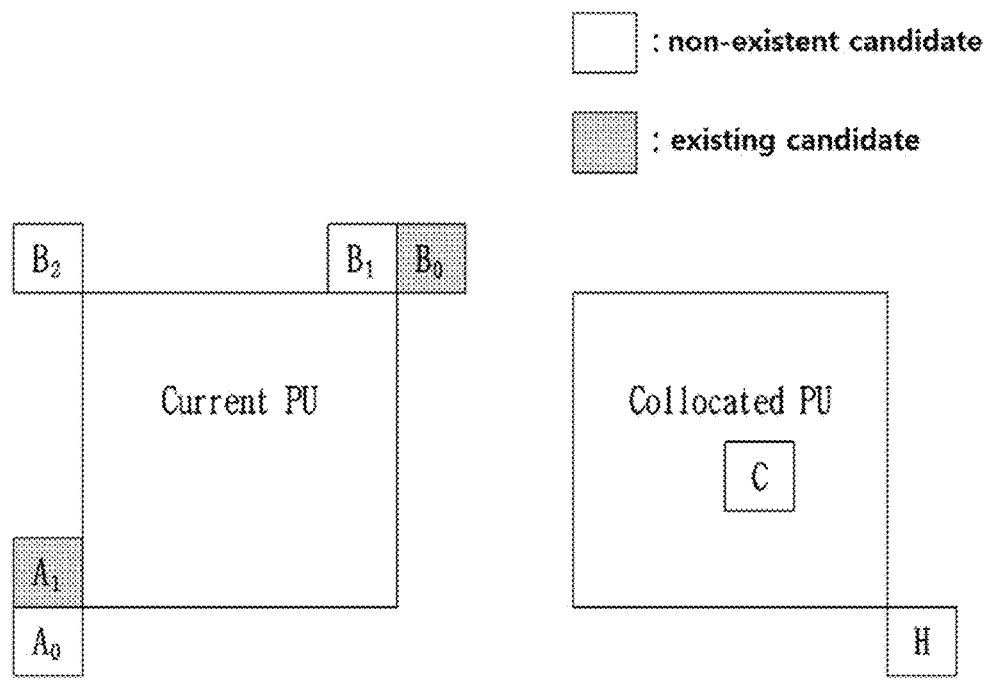
Figure 33C:
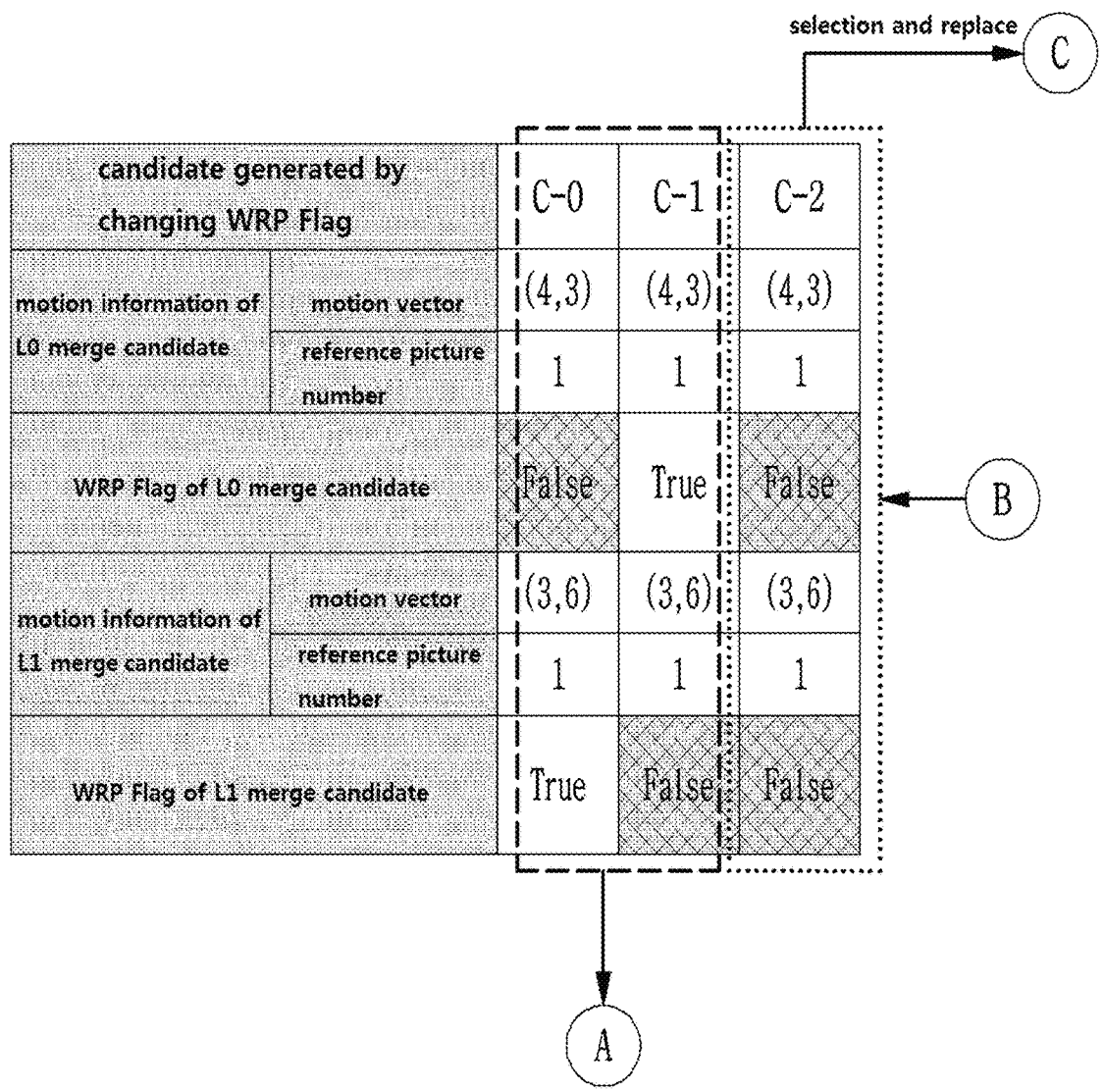
Figure 33D:
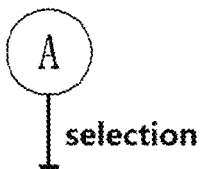
Figure 33E:
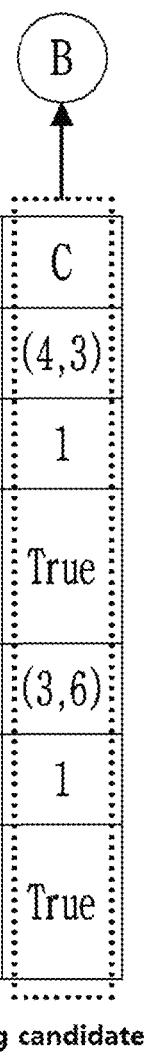

FIGS. 33a to 33f show an example of a case in which a total of five merge candidates are generated. FIGS. 33a to 33f are examples of cases in which the number of candidates after the process of searching for the temporal/spatial merge candidate is insufficient. In FIGS. 33a to 33f, the WRP Flag may be expressed as True and False. Referring to FIG. 33a, as one example of searching for the temporal and spatial candidate in the merge mode, available temporal/spatial candidates are two of A1 and B0. Therefore, referring to FIG. 33b, as one example of a candidate list in which the number of filled candidates is insufficient, the selected merge candidates after searching for the temporal/spatial merge candidate are two of A1 and B0 in total. On the other hand, candidate C means a candidate generated by the combined list method. For example, the candidate C may be generated using the L0 merge candidate of A1 and the L1 merge candidate of B0. Therefore, after performing the combined list, a total of two candidates becomes insufficient. Meanwhile, although only one combined list candidate is generated in FIG. 33b, several combined lists may be generated according to a combination of A1 and B0.

Referring to FIGS. 33c to 33f, an example of adding or replacing a candidate by changing a WRP Flag of a combined list candidate is shown. In accordance with an embodiment of the present invention, a new candidate C-0 is generated by copying the combined list candidate C and then changing the L0 WRP Flag information of C. In addition, a new candidate C-1 may be generated by changing the L1 WRP Flag information of C. Also, by changing both the L0 WRP Flag and the L1 WRP Flag information of C, a new candidate C-2 may be generated (3300). In this case, the L0 WRP Flag means the WRP Flag of the L0 merge candidate, and the L1 WRP Flag means the WRP Flag of the L1 merge candidate. For example, C-0 and C-1 are selected from among three generated candidates C-0, C-1, and C-2 (3310), because the number of insufficient candidates is two in total.

Meanwhile, the combined list candidate is not a candidate generated by the temporal/spatial adjacent block, but a newly generated candidate. Also, as many candidates are searched for before generating the combined list candidates, many types of combined list candidates are generated. Therefore, there are cases in which it is possible to fill all candidates that are insufficient even with only the combined list candidates. However, since the combined list candidates are a combination of candidates that are searched for and generated before the combined list candidates are generated, the diversity of the candidates may be weak. The diversity of candidates means the choice of motion information that the candidate may present. When there are many similar candidates, the motion prediction is biased and thus the prediction efficiency is decreased.

Therefore, according to an embodiment of the present invention, it is possible to increase the diversity of the candidate and thus improve the encoding efficiency, by replacing the existing combined list candidate, not copying the combined list candidate and adding a candidate for which a WRP Flag is changed. For example, referring to FIGS. 33c to 33f, when a total of three merge candidates are generated, there are no insufficient candidates by generating C of a combined list candidate (3320), but C is replaced by C-2 (3330). Through this replacement process, diversity of candidates may be increased. Here, the WRP Flag may be set by a predetermined order or method without considering the WRP Flag of the generated combined list candidate or the temporal/spatial candidate.

Meanwhile, the method of adding the candidate by changing the WRP Flag of the combined list candidate and the method of replacing the candidate may be used together.

Hereinafter, a method of generating a zero vector candidate in consideration of the WRP Flag will be described below.

According to an embodiment of the present invention, a new vector candidate may be generated by changing the WRP Flag information for the zero vector candidates like the temporal/spatial candidate.

For example, in the case of unidirectional prediction, zero vectors having different WRP Flag values are generated according to types of WRP Flag values, thereby obtaining a new candidate. When the WRP Flag value has a value of True or False, a zero vector candidate with the WRP Flag value being True and a zero vector candidate with the WRP Flag value being False are created.

As another example, in the case of bi-directional prediction, the candidate is generated by applying a zero vector candidate generation method used in unidirectional prediction to the L0 merge candidate, and the candidate is generated by applying a zero vector candidate generation method used in unidirectional prediction to the L1 merge candidate, and then various zero vector candidates are generated by combining the candidates generated in the L0 merge candidate and the L1 merge candidate, respectively. Here, the zero vector candidate generation order may be sequentially combined by a predetermined order.

FIG. 34 is a diagram illustrating a process of generating zero vector candidates that have the same motion information but are different from each other by changing the WRP Flag according to an embodiment of the present invention.

In the case that the WRP Flag has a value of True and False, even when the motion information is the same, four kinds of zero vector candidates that are different from each other may be generated. Z0 is a zero vector candidate in which the WRP Flag values of the L0 merge candidate and the L1 merge candidate are generated as True and True, respectively. Also, Z1 is a zero vector candidate in which the WRP Flag values of the L0 merge candidate and the L1 merge candidate are generated as True and False, respectively. Also, Z2 is a zero vector candidate in which WRP Flag values of L0 merge candidate and L1 merge candidate are generated as False and True, respectively. Also, Z3 is a zero vector candidate in which the WRP Flag values of the L0 merge candidate and the L1 merge candidate are generated as False and False, respectively.

According to an embodiment of the present invention, a WRP Flag may be used in a merge candidate generation process of video encoding/decoding using a geometric transform reference picture.

Further, the WRP Flag information is fetched from the merge candidate. In addition, the WRP Flag information of the merge candidate is changed. In addition, the merge candidate is generated by changing the WRP Flag. In addition, a merge candidate is added by changing the WRP Flag. In addition, the existing merge candidate may be replaced by changing the WRP Flag.

Further, the WRP Flag information is fetched from the spatial merge candidate. In addition, the WRP Flag information of the spatial merge candidate is changed. In addition, the merge candidate may be generated by changing the WRP Flag of the spatial merge candidate. In addition, a merge candidate is added by changing the WRP Flag of the spatial merge candidate. In addition, the existing merge candidate may be replaced by changing the WRP Flag of the spatial merge candidate.

In addition, the WRP Flag information is fetched from the temporal merge candidate. In addition, the WRP Flag information of the temporal merge candidate is changed. In addition, the merge candidate is generated by changing the WRP Flag of the temporal merge candidate. In addition, a merge candidate is added by changing the WRP Flag of the temporal merge candidate. In addition, the existing merge candidate may be replaced by changing the WRP Flag of the temporal merge candidate.

In addition, the WRP Flag information is fetched from the combined list merge candidate. Also, the WRP Flag information of the combined list merge candidate is changed. Also, the merge candidate is generated by changing the WRP Flag of the combined list merge candidate. Also, a merge candidate is added by changing the WRP Flag of the combined list merge candidate. Also, the existing merge candidate may be replaced by changing the WRP Flag of the combined list merge candidate. In addition, the motion information may be scaled according to the changed WRP Flag.

In addition, the WRP Flag information may be fetched from the zero vector merge candidate. In addition, the WRP Flag information of the zero vector merge candidate may be changed. In addition, the merge candidate is generated by changing the WRP Flag of the zero vector merge candidate. In addition, a merge candidate is added by changing the WRP Flag of the zero vector merge candidate. The existing merge candidate may be replaced by changing the WRP Flag of the zero vector merge candidate.

According to an embodiment of the present invention, a method and apparatus for constructing and utilizing information used in video signal prediction in the process of performing video signal prediction in a video encoder/decoder using geometric transform pictures may be provided.

According to the present invention, by removing redundant information and omitting a redundant operation, from additional information required in a process of performing video signal prediction in a video encoder/decoder using a geometric transform picture, the amount of data transmitted from the video encoder to the decoder may be reduced, thereby reducing the complexity.

According to the present invention, when a prediction signal is constructed and utilized by reflecting a characteristic that a video signal has in common in the process of performing video signal prediction in a video encoder/decoder using geometric transform pictures, the redundancy of the additional information is removed and redundant computational operations are omitted, thereby improving the coding efficiency of the video signal in the exiting video encoding/decoding module and solving the complexity.

According to the present invention, when the prediction information is constructed and utilized by reflecting the video characteristics in the video encoder/decoder using the geometric transform picture, the redundancy of the additional information is removed and redundant computational operations are omitted, thereby improving the performance of the video encoder/decoder.

The video compression technique compresses video information by removing the redundancy of the video signal constituting the video. In a video compression technique, inter prediction is a method of compressing the video signal by using, as a prediction area, a similar area between videos that are different temporally, as a method of eliminating redundancy between video screens. The inter prediction finds, from a reference picture (hereinafter, referred to as "reference region"), an area in which an original picture region (hereinafter, referred to as "predicted region") and a video signal are similar to each other, and transmits a translational information between the prediction area and the reference area and a prediction error which is a video signal difference between the prediction area and the reference area. Therefore, since the prediction error is reduced as the similarity of the video signal between the original picture and the reference picture is higher, the compression efficiency of the video compression technique may be increased.

In a video compression technique, as a method of generating a reference picture in inter prediction, there is a method of generating a geometric transform picture through video geometric transform. The geometric transform picture may be obtained by deriving motion information of a pixel position between a reference picture and a current picture, and may have a pixel distribution similar to the current picture as a geometrically geometric transform picture from the reference picture using the derived information. Therefore, when the geometric transform picture is referred to in the inter prediction, the video compression efficiency may be increased.

Figure 35:
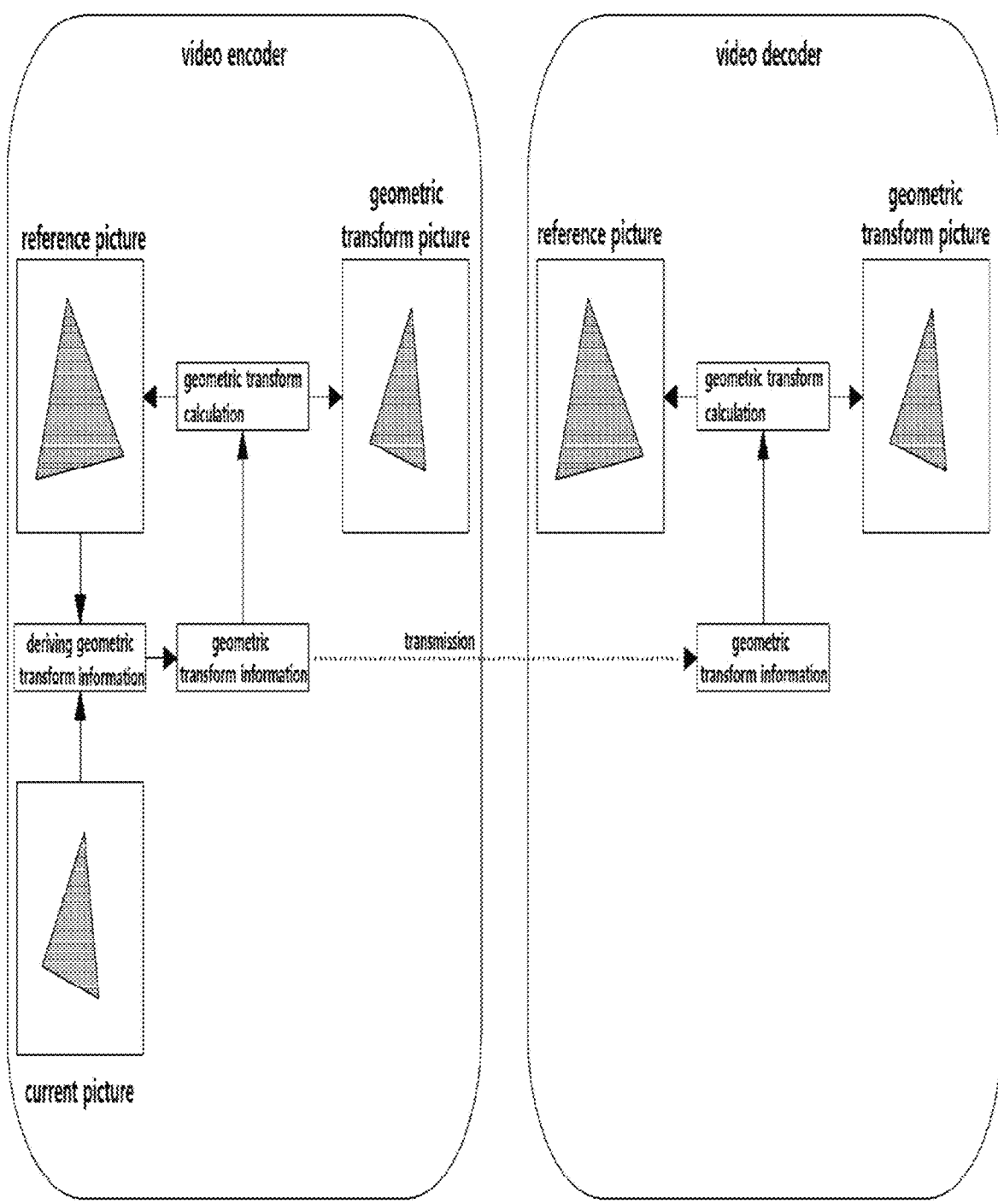
FIG. 35 is a conceptual diagram of an encoder/decoder using a geometric transform picture according to an embodiment of the present invention.

FIG. 35 is a conceptual diagram of an encoder/decoder using a geometric transform picture according to an embodiment of the present invention.

Since the video encoder has original information of the current picture as the input signal, the geometric transform information may be derived by calculating the geometric transform relation from the reference picture and the original of the current picture. The video encoder generates a geometric transform picture by calculating a geometric transform between the derived geometric transform information and the reference picture, and uses the generated geometric transform picture as reference information for inter prediction.

The video encoder may transmit the derived geometric transform information to the video decoder, and the video decoder may generate the same geometric transform picture as the video encoder by calculating the geometric transform from the geometric transform information and reference picture received from the video encoder. Also, the video encoder and/or decoder may use the decoded picture prior to the current picture as a reference picture for inter prediction. Here, the number of reference pictures may be one or more, and the one or more reference pictures are constructed in one or more reference picture lists and used for a video encoding/decoding process.

In a video encoder and/or decoder using multiple reference picture lists, there may be a redundant reference picture list having the same order and construction as the reference pictures constructing the reference picture list. In this case, the video encoder and/or the decoder may acquire prediction information referring to the reference picture of one reference picture list by fetching the same from information referring to the reference picture of other redundant reference picture list, or may not use prediction information referring to the reference picture of other redundant reference picture list. Accordingly, the coding efficiency may be improved by omitting the transmission of the prediction information of any one redundant reference picture list as described above.

Figure 36:
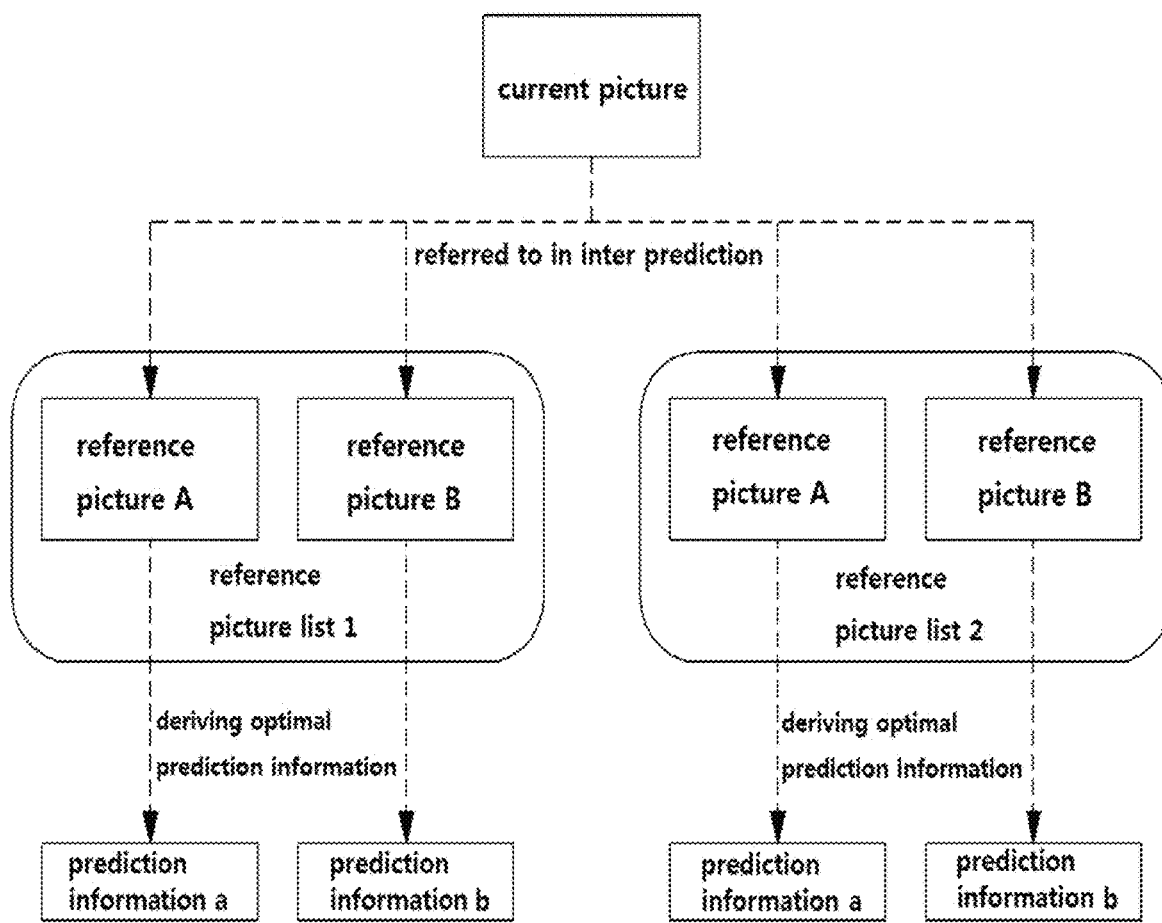
FIG. 36 is a diagram illustrating a process in which redundant prediction information is derived through inter prediction when a reference picture construction in a reference picture list is overlapped in an encoder/decoder according to an embodiment of the present invention.

FIG. 36 is a diagram illustrating a process in which redundant prediction information is derived through inter prediction when a reference picture construction in a reference picture list is overlapped in an encoder/decoder according to an embodiment of the present invention.

Referring to FIG. 36, each of a total of two reference picture lists is constructed with two reference pictures. In addition, the two reference picture lists are constructed with the same reference pictures. Here, the current picture predicts the respective reference pictures to derive the prediction information, in which the respective reference picture constructions of the reference picture list 1 and reference picture list 2 are the same as a reference picture A and a reference picture B, the prediction information (i.e., prediction information a and prediction information b) derived from the prediction picture of the respective reference picture lists may be redundant.

Figure 37:
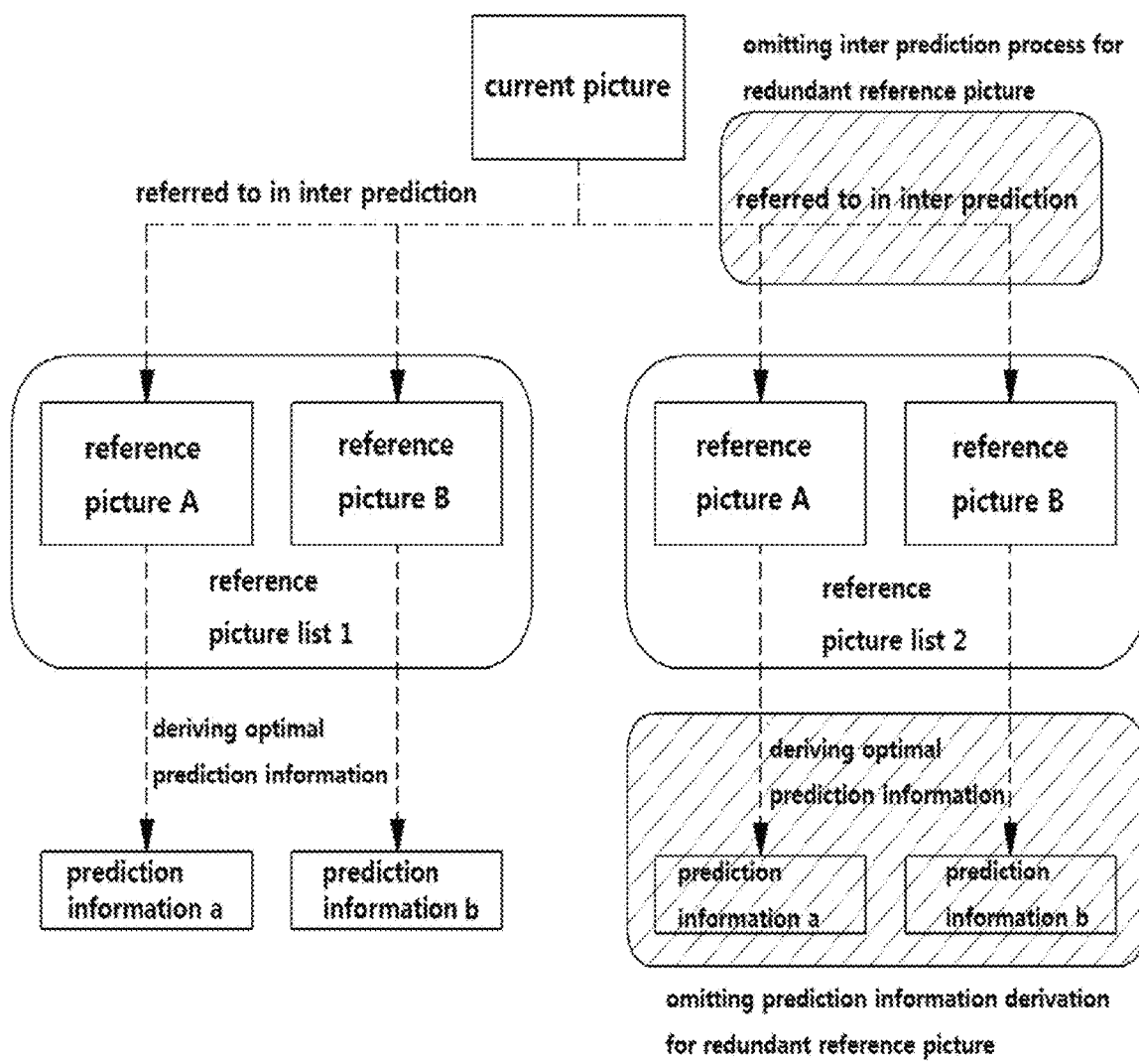
FIG. 37 is a flowchart illustrating a process in which an inter prediction process and a prediction information derivation process for a redundant reference picture list are omitted, when a reference picture construction of a reference picture list is overlapped in an encoder/decoder according to an embodiment of the present invention.

FIG. 37 is a flowchart illustrating a process in which an inter prediction process and a prediction information derivation process for a redundant reference picture list are omitted, when a reference picture construction of a reference picture list is overlapped in an encoder/decoder according to an embodiment of the present invention.

Referring to FIG. 37, the reference picture list 1 and the reference picture list 2 are similarly constructed with a reference picture A and a reference picture B. Accordingly, the prediction information a and the prediction information b derived by referring to the reference picture A and the reference picture B of the reference picture list 1 respectively are the same as the prediction information a and the prediction information b derived by referring to the reference picture A and reference picture B of the reference picture list 2 respectively. According to an embodiment of the present invention, when the reference picture list is redundant, the video encoder/decoder may omit the inter prediction process for any one redundant reference picture. In addition, the prediction information may be fetched from the same reference picture of another reference picture list having a redundant relation.

Figure 38:
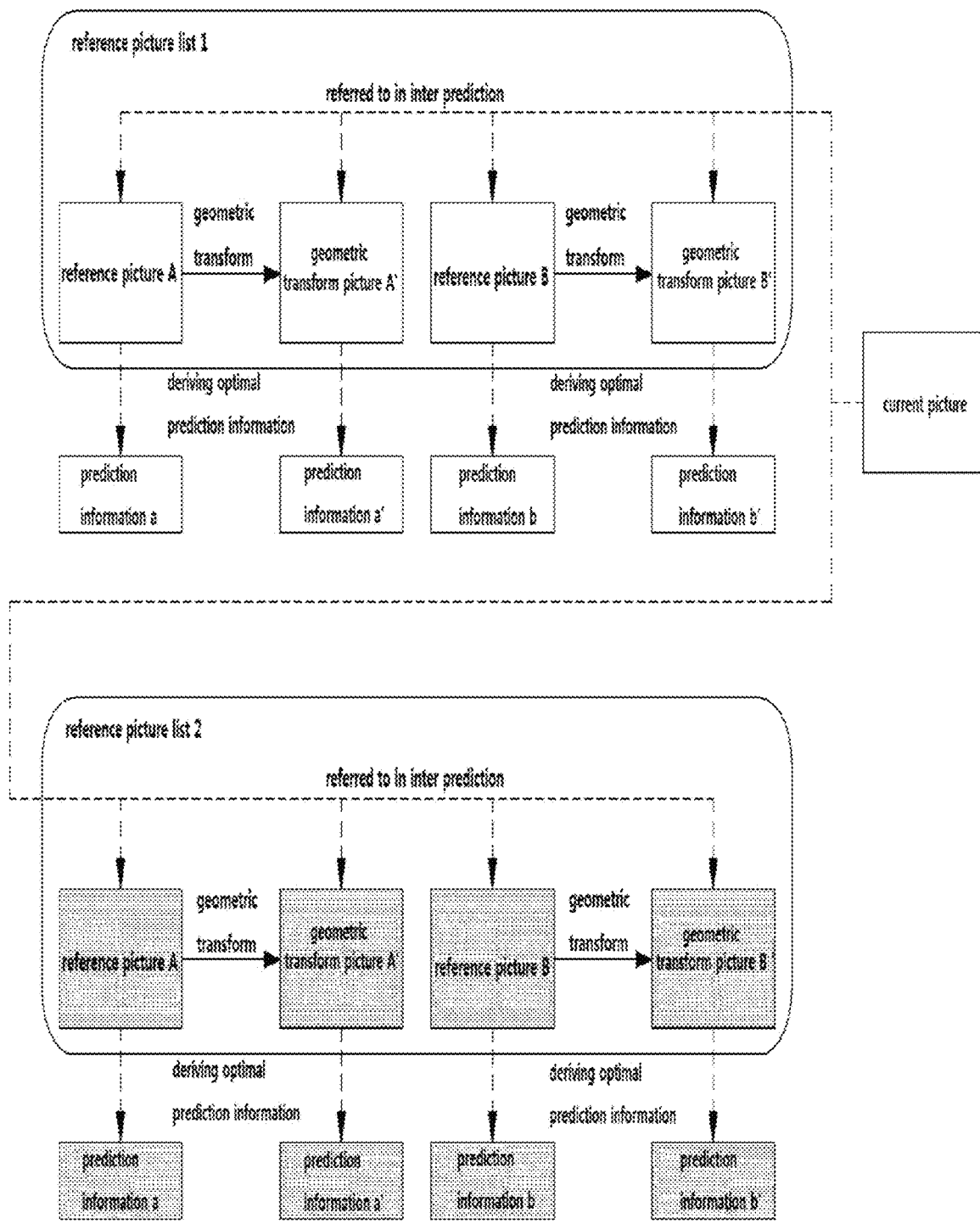
FIG. 38 is a diagram illustrating a process in which redundant prediction information is derived through inter prediction, when the reference picture construction of the reference picture list is overlapped in the encoder/decoder using the geometric transform picture, according to an embodiment of the present invention.

FIG. 38 is a diagram illustrating a process in which redundant prediction information is derived through inter prediction, when the reference picture construction of the reference picture list is overlapped in the encoder/decoder using the geometric transform picture, according to an embodiment of the present invention.

Referring to FIG. 38, the respective reference picture lists for a total of two reference picture lists are constructed with two reference pictures. In addition, the two reference picture lists are constructed with the same reference pictures. Therefore, the geometric transform picture derived by using the geometric transform relationship between the reference picture and the current picture in the reference picture list 1 and the geometric transform picture derived by using the geometric transform relationship between the reference picture and the current picture in the reference picture list 2 are constructed similarly.

In this case, the current picture derives the prediction information by predicting the respective reference pictures and geometric transform pictures. Since the reference pictures of the reference picture list 1 and the reference picture list 2 are similarly constructed with the reference picture A and the reference picture B, and the geometric transform pictures are similarly constructed with the geometric transform picture A' and the geometric transform picture B', the prediction information (that is, prediction information a, prediction information b, predication information a', and prediction information b') derived from the reference picture and the geometric transform picture of the respective reference picture lists may be overlapped.

According to an embodiment of the present invention, when there is a reference picture list having redundant reference picture construction, a video encoder/decoder referring to a geometric transform picture omits a process of performing inter prediction referring to a geometric transform picture of any one redundant reference picture list. In addition, it is possible to omit a process of deriving the prediction information referring to the geometric transform picture of the redundant reference picture list. Through the above process, the complexity of the video encoder/decoder may be improved and the compression performance may be improved.

On the other hand, the number of reference picture lists is not limited to two, but may be M, and the geometric transform information in the respective lists may be N, not two. Here, M and N are integers greater than zero.

According to an embodiment of the present invention, when there are multiple reference picture lists having redundant reference picture construction, a video encoder/decoder using reference pictures and geometric transform pictures as reference information omits a prediction process of referring to a geometric transform picture generated from the reference picture of the redundant reference picture lists. In addition, the prediction information may be fetched from the reference picture of the reference picture list having redundant relation.

Figure 39A:
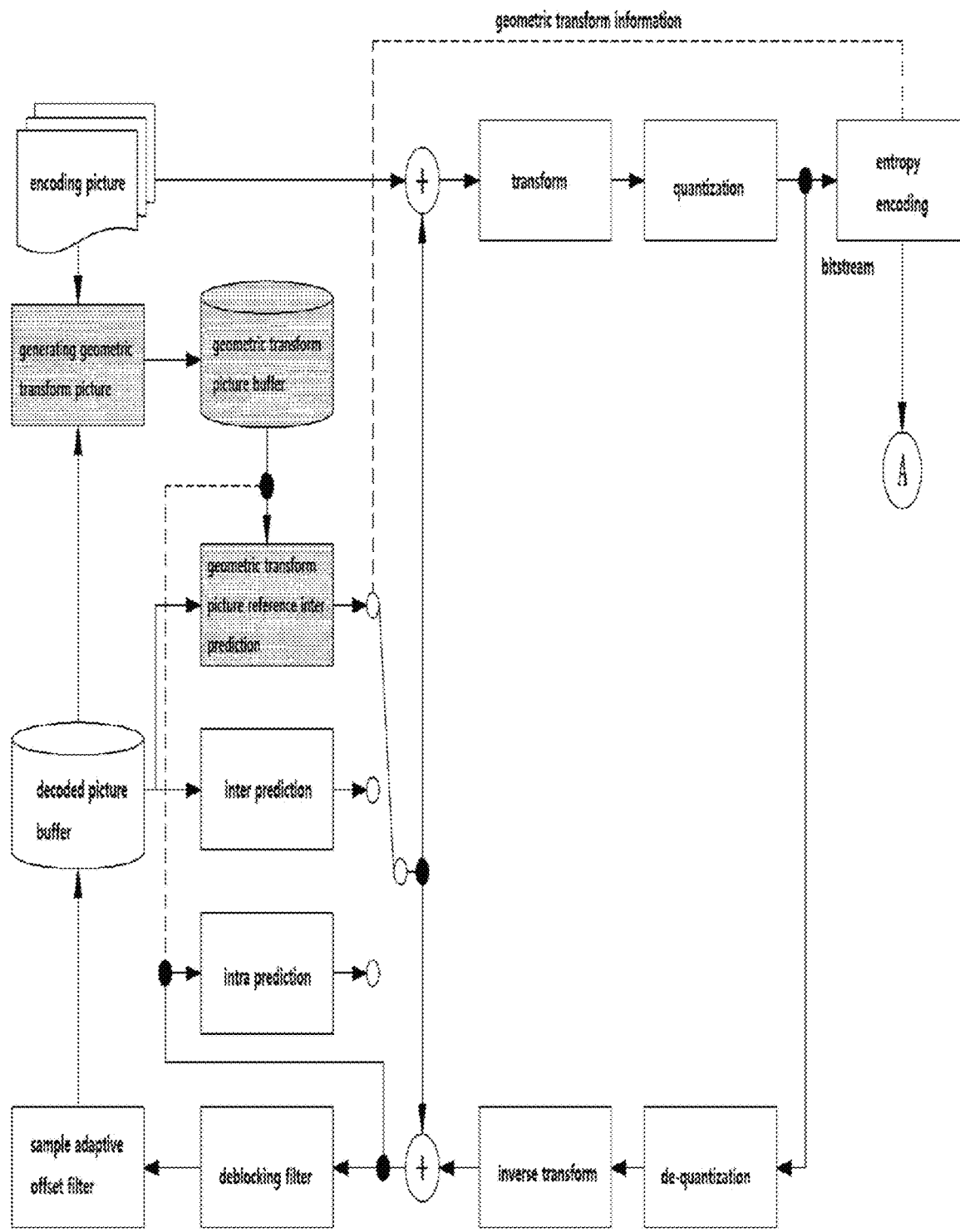
FIGS. 39A and 39B are block diagrams illustrating a configuration of an encoder/decoder using a geometric transform picture according to an embodiment of the present invention.
Figure 39B:
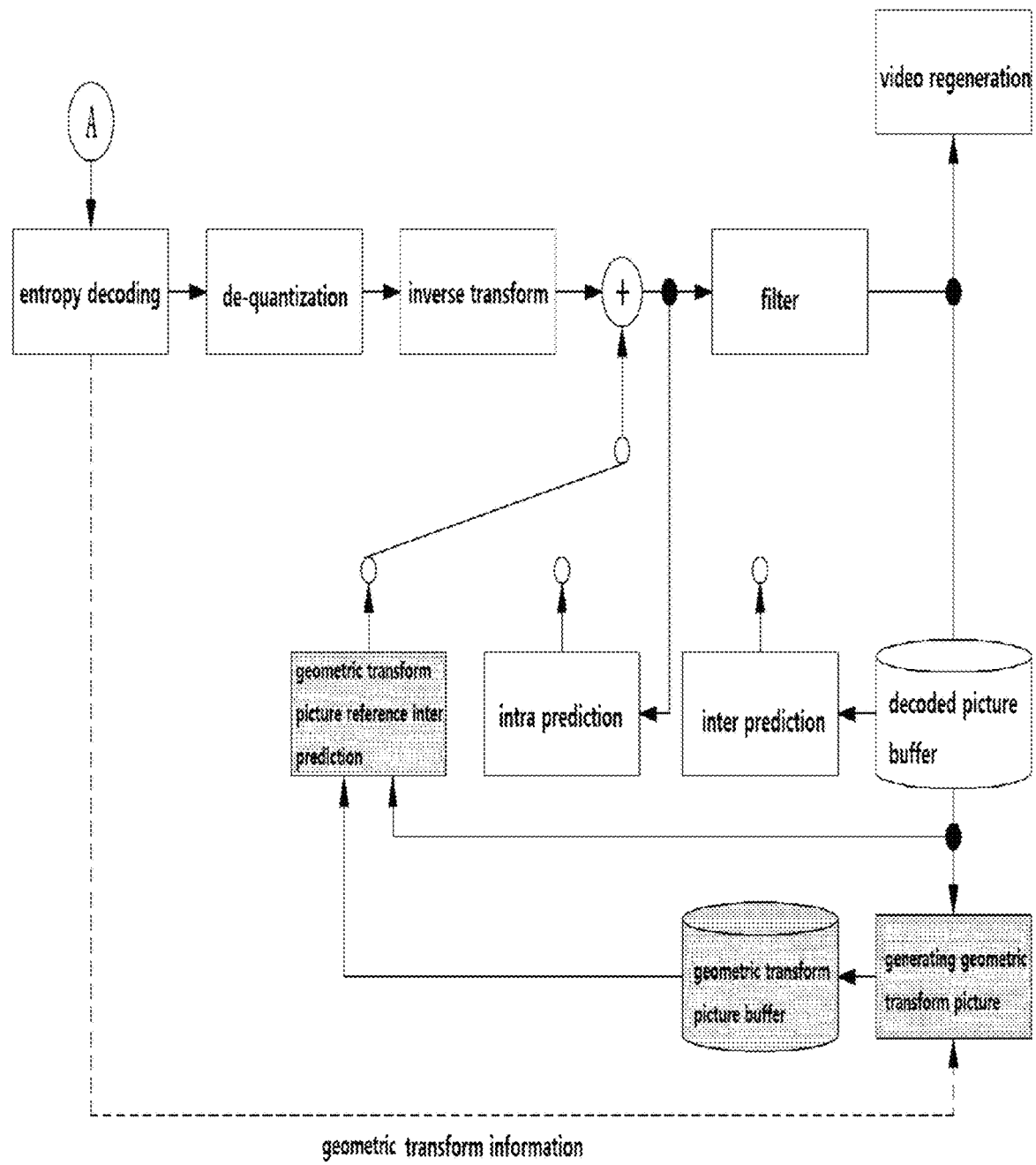

FIGS. 39a and 39b are block diagrams illustrating a configuration of an encoder/decoder using a geometric transform picture according to an embodiment of the present invention.

A video encoder that uses reference pictures and/or geometric transform pictures as reference information performs inter prediction that uses a reference picture stored in a decoded picture buffer as reference information, or geometric transform picture reference inter prediction that refers to both the reference picture in the decoded picture buffer and the geometric transform picture in the geometric transform picture buffer, together with intra prediction, thereby deriving optimal prediction information.

In this case, the geometric transform picture to be referred to may be a picture generated by deriving the geometric transform information by calculating a geometric transform relation between the encoded picture (current picture) performing encoding at present and the reference picture, and then calculating a geometric transform relation between the derived geometric transform information and the reference picture.

When the geometric transform picture reference inter prediction method in the video encoder is determined as the optimal prediction method, the video encoder transmits information on the selected geometric transform picture to the decoder. Since the geometric transform picture is generated from the reference picture, the information about the geometric transform picture may be used on the basis of the information of the reference picture used in the generation of the reference picture, and whether to use the geometric transform picture corresponding to the reference picture may be added.

Figure 40:
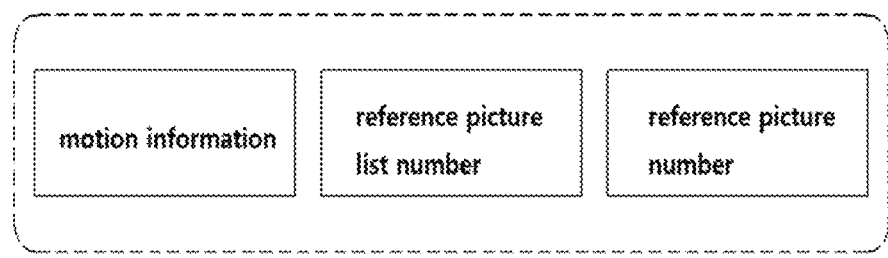
FIG. 40 is a diagram illustrating construction of inter prediction information of a video encoder/decoder according to an embodiment of the present invention.
Figure 40:
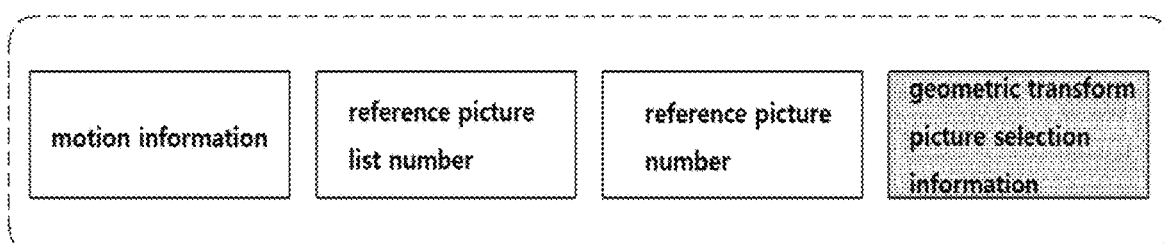

FIG. 40 is a diagram illustrating construction of inter prediction information of a video encoder/decoder according to an embodiment of the present invention.

FIG. 40(a) is a diagram showing an example of the inter prediction information construction of the existing video encoder/decoder, and FIG. 40(b) is a diagram showing an example of an inter prediction information construction of a video encoder/decoder using a geometric transform picture.

Referring to FIG. 40(a), inter prediction information of the existing video encoder/decoder includes motion information derived as optimal prediction information and information of a reference picture referred to in prediction (for example, reference picture list number, reference picture number). Referring to FIG. 40(b), the inter prediction information of the encoder/decoder using the geometric transform picture may be provided such that the geometric transform picture selection information is added to the inter prediction information of the existing video encoder/decoder. Since the geometric transform picture is generated from the reference picture, the index information for the geometric transform picture includes information on whether the corresponding geometric transform picture is selected from the index information (for example, reference picture list number and reference picture number) of the reference picture used for generating the reference picture, thereby removing the redundancy of information that may occur in the geometric transform picture index information in the prediction information.

Figure 41:
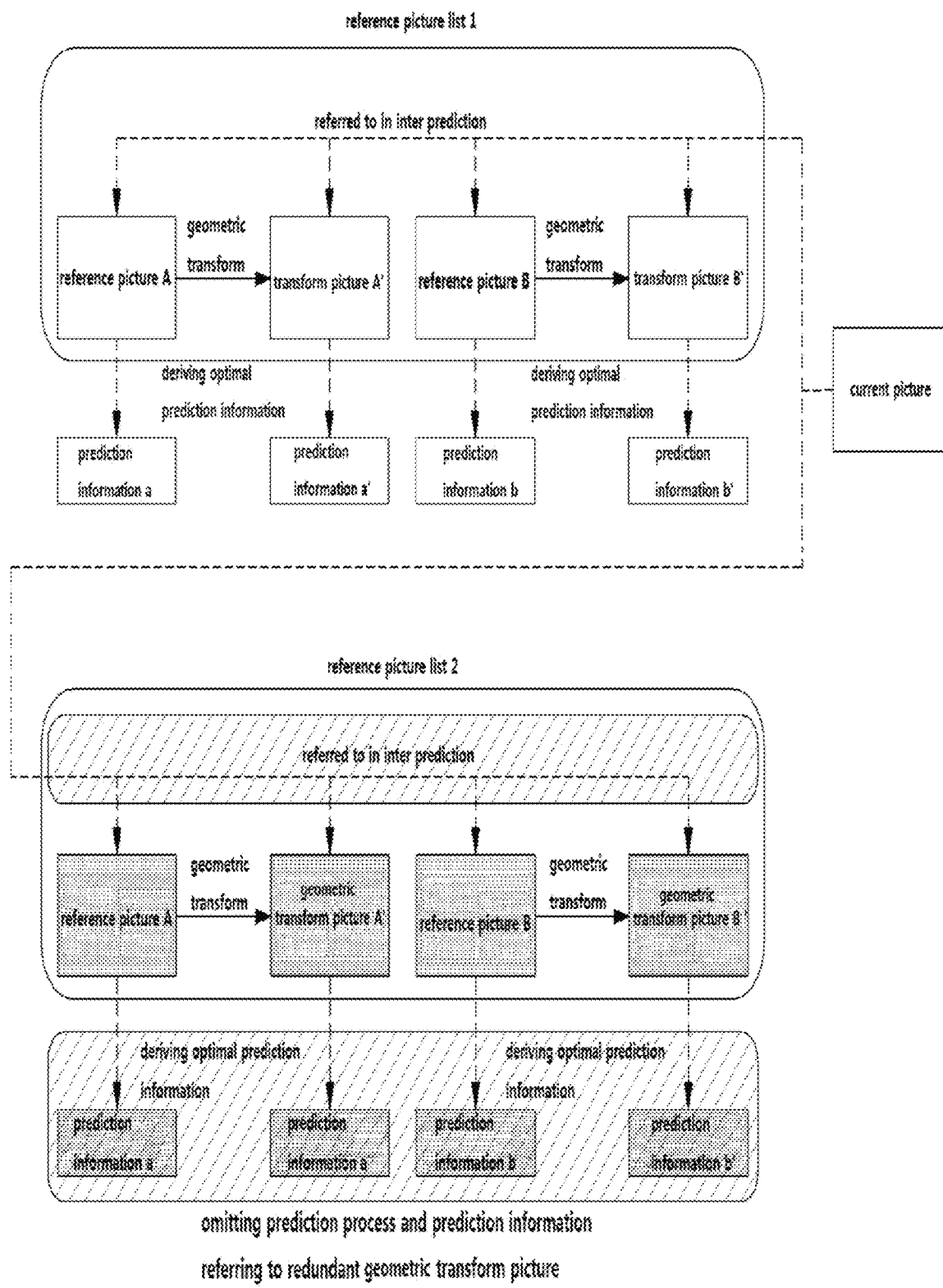
FIG. 41 is a diagram illustrating an inter prediction process and a prediction information derivation omission process for a redundant reference picture list in inter prediction of a video encoder/decoder using a geometric transform picture according to an embodiment of the present invention.

FIG. 41 is a diagram illustrating an inter prediction process and a prediction information derivation omission process for a redundant reference picture list in inter prediction of a video encoder/decoder using a geometric transform picture according to an embodiment of the present invention.

Referring to FIG. 41, each of a total of two reference picture lists is constructed with two reference pictures. In addition, the two reference picture lists are constructed with the same reference picture. Therefore, the geometric transform picture derived by using a geometric transform relationship between the reference picture and the current picture in the reference picture list 1 and the transform picture derived by using a geometric transform relationship between the reference picture and the current picture in the reference picture list 2 are constructed similarly.

In this case, the current picture predicts the respective reference picture and geometric transform picture to derive prediction information. Since the reference picture of the reference picture list 1 and the reference picture list 2 are similarly constructed with the reference picture A and the reference picture B, and the geometric transform pictures are similarly constructed with the geometric transform picture A' and the geometric transform picture B', the prediction information (that is, prediction information a, prediction information b, predication information a', and prediction information b') derived from the reference picture and the transform picture of the respective reference picture lists may be overlapped.

According to an embodiment of the present invention, a video encoder/decoder referring to a geometric transform picture may omit a process of performing inter prediction referring to the geometric transform picture of the redundant reference picture list, when there is a reference picture list having redundant reference picture construction. In addition, the derivation of the prediction information referring to the geometric transform picture of the overlapping reference picture list may be omitted. Through the above process, the complexity of the video encoder/decoder may be solved and the compression performance may be improved.

Figure 42:
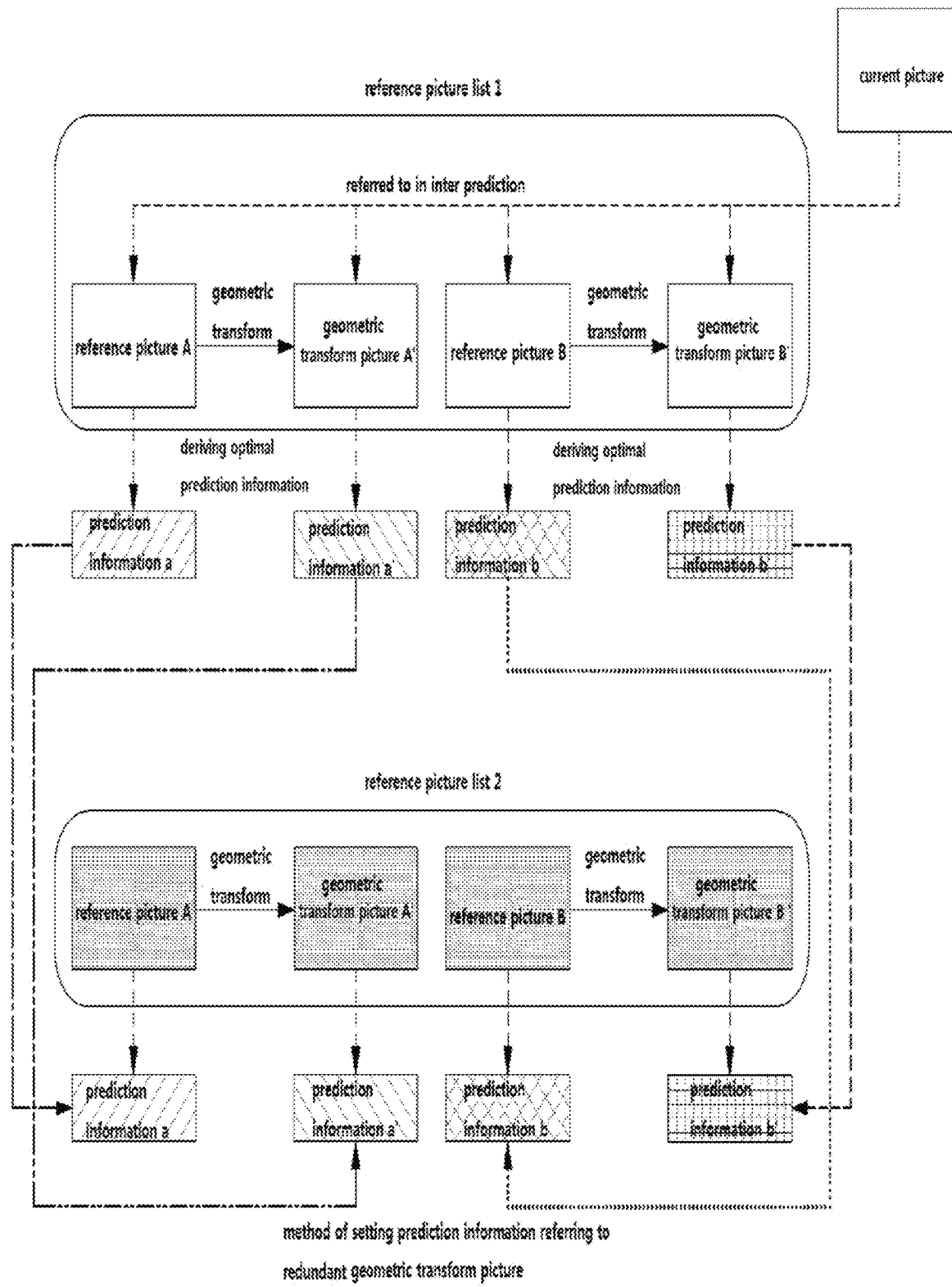
FIG. 42 is a diagram illustrating a process of setting prediction information for a redundant reference picture list in inter prediction of a video encoder/decoder using a geometric transform picture according to an embodiment of the present invention.

FIG. 42 is a diagram illustrating a process of setting prediction information for a redundant reference picture list in inter prediction of a video encoder/decoder using a geometric transform picture according to an embodiment of the present invention.

According to an embodiment of the present invention, prediction information referring to a geometric transform picture of another reference picture list having a redundant relationship with the current prediction information may be used to set prediction information for a redundant reference picture list. For example, when it is necessary to use the prediction information a' and the prediction information b' derived by referring to the geometric transform picture of the reference picture list 2, the encoder/decoder may not use the prediction information a' and the prediction information b' of the reference picture list 1, respectively, without deriving separate prediction information.

The number of reference picture lists is not limited to two, but may be L, and the number of reference pictures in each list may be M, not two. In addition, the number of geometric transform information in each list may be N, not two. Where L, M, and N are integers greater than zero.

Figure 43:
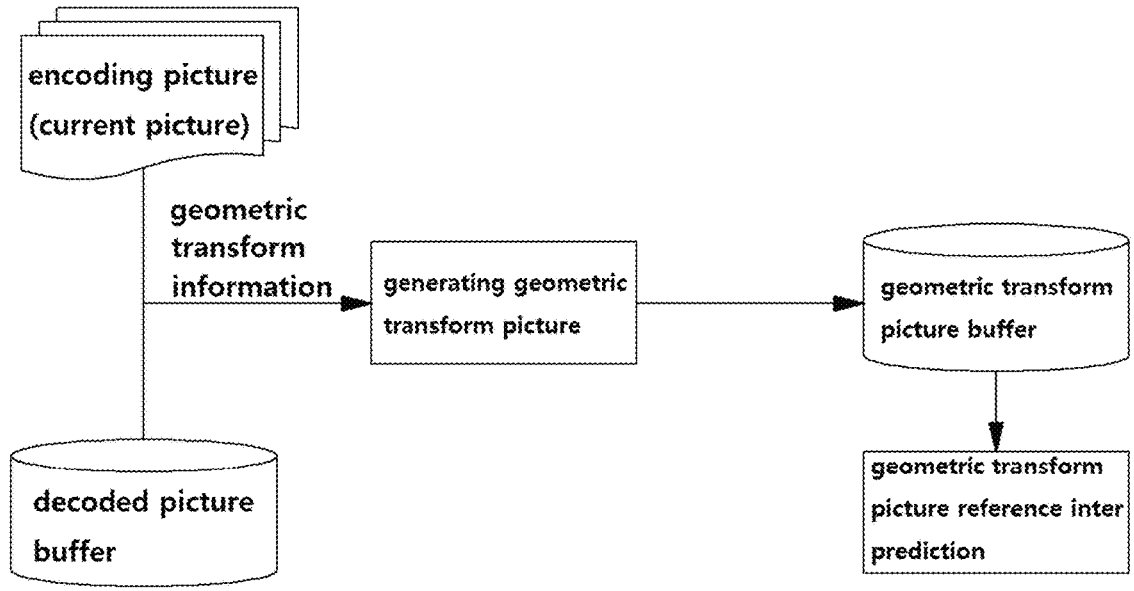
FIG. 43 is a diagram illustrating a process of constructing a geometric transform picture in an encoder using a geometric transform picture according to an embodiment of the present invention.

FIG. 43 is a diagram illustrating a process of constructing a geometric transform picture in an encoder using a geometric transform picture according to an embodiment of the present invention.

The encoder may derive geometric transform information from an encoding picture (current picture) and a reference picture of a decoded picture buffer. Also, the encoder may generate a geometric transform picture from the reference picture using the derived geometric transform picture. In addition, the encoder may store the generated geometric transform picture in a geometric transform picture buffer. Also, the encoder may perform inter prediction and derive prediction information by referring to the geometric transform picture of the geometric transform picture buffer.

Figure 44:
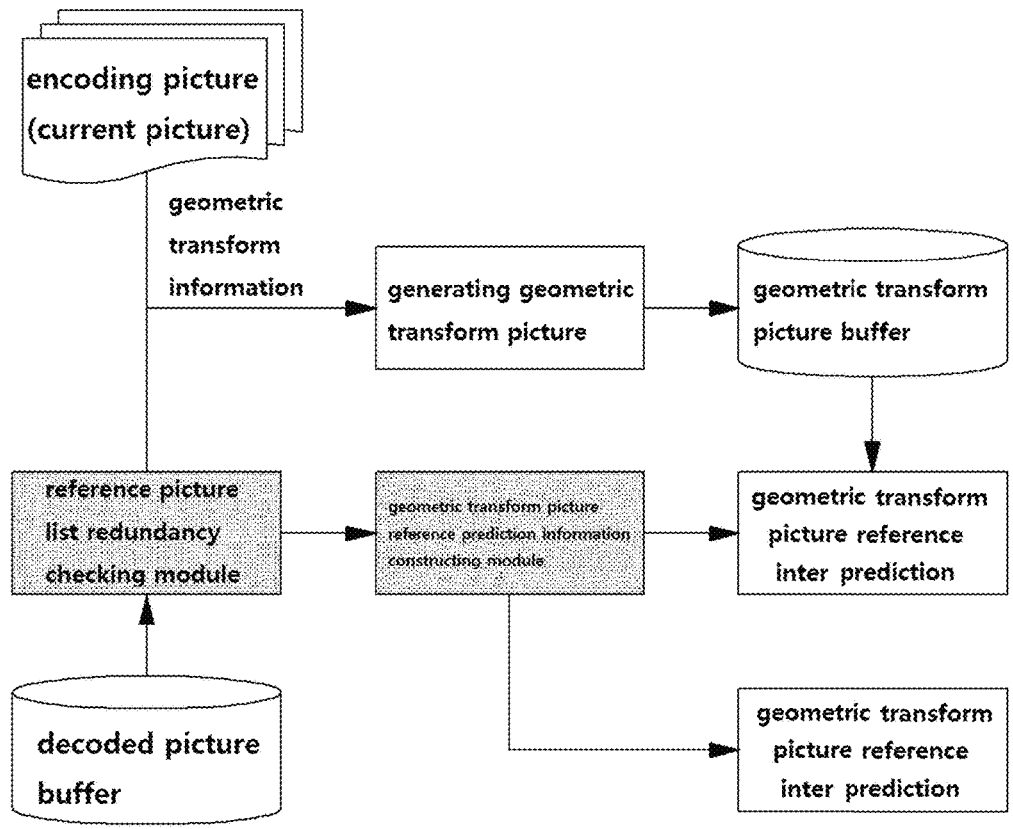
FIG. 44 is a diagram illustrating a configuration of an encoder using a geometric transform picture according to an embodiment of the present invention.

FIG. 44 is a diagram illustrating a configuration of an encoder using a geometric transform picture according to an embodiment of the present invention.

The reference picture list redundancy checking module may check whether the reference picture list is redundant from the reference picture construction information at the time of deriving the geometric transform information from the reference picture in the decoded picture buffer. The reference picture construction information may mean a reference picture construction state or a reference picture set (RPS) in the DPB.

When the reference picture list is redundant, the reference picture list redundancy checking module may not derive prediction information referring to geometric transform reference picture generated from the reference picture of the redundant reference picture list. In addition, the encoder may fetch prediction information from a reference picture having a redundant relation and use the same as prediction information for the geometric transformed reference picture. In addition, the encoder may use the prediction information for inter prediction or bidirectional prediction of a geometric transform reference picture inter prediction.

Figure 45:
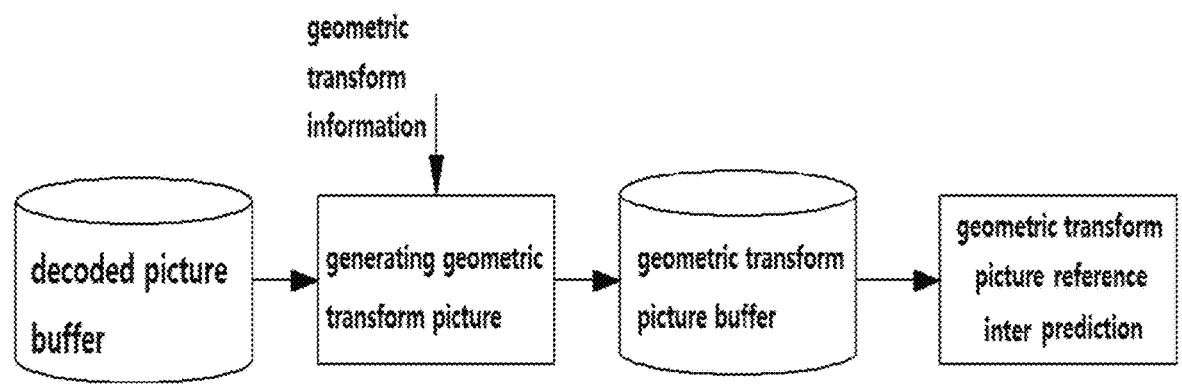
FIG. 45 is a diagram illustrating a process of constructing a geometric transform picture in a decoder using a geometric transform picture according to an embodiment of the present invention.

FIG. 45 is a diagram illustrating a process of configuring a geometric transform picture in a decoder using a geometric transform picture according to an embodiment of the present invention. The decoder may generate the geometric transform picture from the reference picture of the decoded picture buffer using the geometric transform information received from the encoder. In addition, the decoder may store the generated geometric transform picture in a geometric transform picture buffer and use the same for geometric transform picture reference inter prediction.

Figure 46:
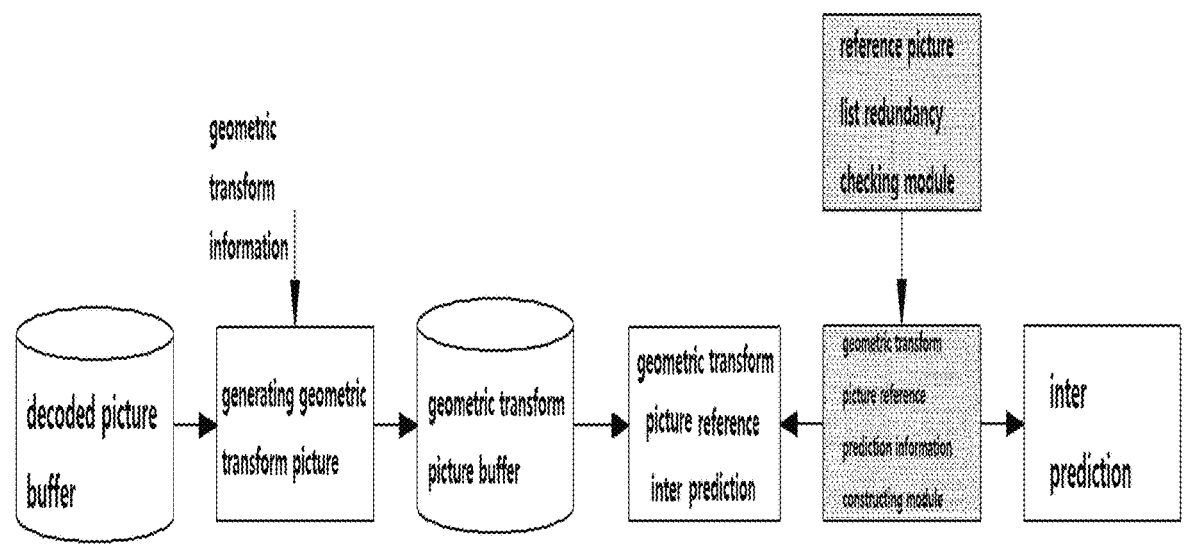
FIG. 46 is a diagram illustrating a configuration of a decoder using a geometric transform picture according to an embodiment of the present invention.

FIG. 46 is a diagram illustrating a configuration of a decoder using a geometric transform picture according to an embodiment of the present invention.

The reference picture list redundancy checking module may check whether there is a redundant reference picture list by checking the reference picture list construction. When there is a redundant reference picture list, the reference picture list redundancy checking module may transmit the redundant reference picture list information to the geometric transform picture reference prediction information constructing module. The geometric transform picture reference prediction information constructing module may fetch prediction information referring to the same reference picture as the reference picture that the current prediction information refers to in the redundant reference picture list and set the prediction information as the current prediction information.

Figure 47:
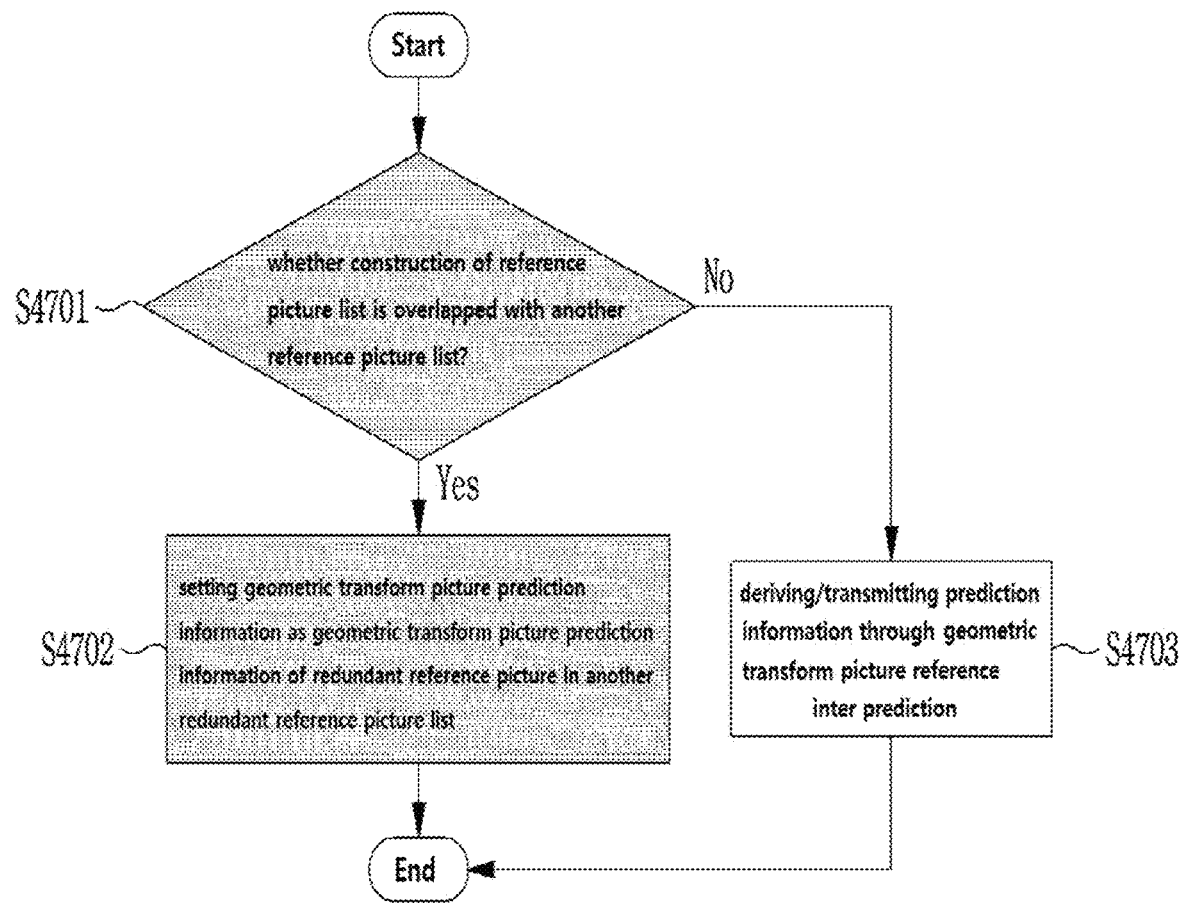
FIG. 47 is a flowchart illustrating an operation of an encoder using a geometric transform picture according to an embodiment of the present invention.

FIG. 47 is a flowchart illustrating an operation of an encoder using a geometric transform picture according to an embodiment of the present invention. Whether or not the reference picture construction of the reference picture list is overlapped with another reference picture list is checked (S4701).

When the reference picture list is overlapped with another reference picture list, geometric transform picture prediction information that refers to the same geometric transform reference picture as the current prediction information may be used in another reference picture list having a redundant relationship with the current reference picture list (S4702). For example, geometric transform picture prediction information referring to the same geometric transformed reference picture may be fetched and used as geometric transform picture prediction information of the current reference picture list. Also, when the geometric transformed reference picture and the reference picture correspond to each other according to a predetermined rule, the information of the reference picture is fetched and used as information on the geometric transformed reference picture.

The geometric transform picture prediction information may be information required for prediction referring to a geometric transform picture such as motion information, a reference picture list number, reference picture index, and geometric transform reference picture selection information. In addition, the information of the reference picture may include a reference picture list number, reference picture index, and the like.

When the reference picture list is not overlapped with another reference picture list, the current prediction information may be derived through geometric transform picture reference inter prediction, and the derived prediction information may be transmitted to the decoder (S4703).

On the other hand, geometric transform picture reference inter prediction or existing inter prediction may be additionally performed due to an additional process such as bi-directional prediction.

Figure 48:
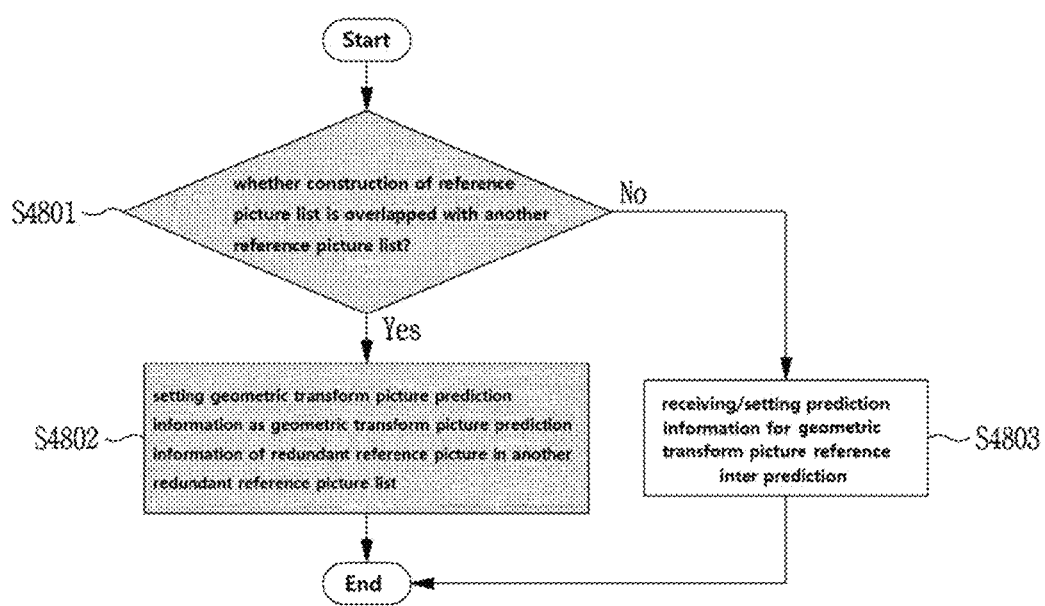
FIG. 48 is a flowchart illustrating an operation of a decoder using a geometric transform picture according to an embodiment of the present invention.

FIG. 48 is a flowchart illustrating an operation of a decoder using a geometric transform picture according to an embodiment of the present invention.

It is possible to check whether the reference picture structure of the reference picture list is overlapped with another reference picture list (S4801).

When the reference picture list is overlapped with another reference picture list, geometric transform picture prediction information referring to the same geometric transform reference picture as the current prediction information is used in another reference picture list having a redundant relationship with the current reference picture list (S4802). For example, geometric transform picture prediction information referring to the same geometric transformed reference picture may be fetched and used as geometric transform picture prediction information of the current reference picture list. Also, when the geometric transformed reference picture and the reference picture correspond to each other according to a predetermined rule, the information of the reference picture may be fetched and used as information on the geometric transformed reference picture.

The geometric transform picture prediction information may be information required for prediction referring to a geometric transform picture such as motion information, a reference picture list number, reference picture index, and geometric transform reference picture selection information. In addition, the information of the reference picture may include a reference picture list number, reference picture index, and the like.

When the reference picture list is not overlapped with another reference picture list, the geometric transform picture reference inter prediction information may be set using the prediction information received from the encoder (S4803).

Meanwhile, geometric transform picture reference inter prediction or existing inter prediction may be additionally performed due to an additional process such as bi-directional prediction.

Figure 49A:
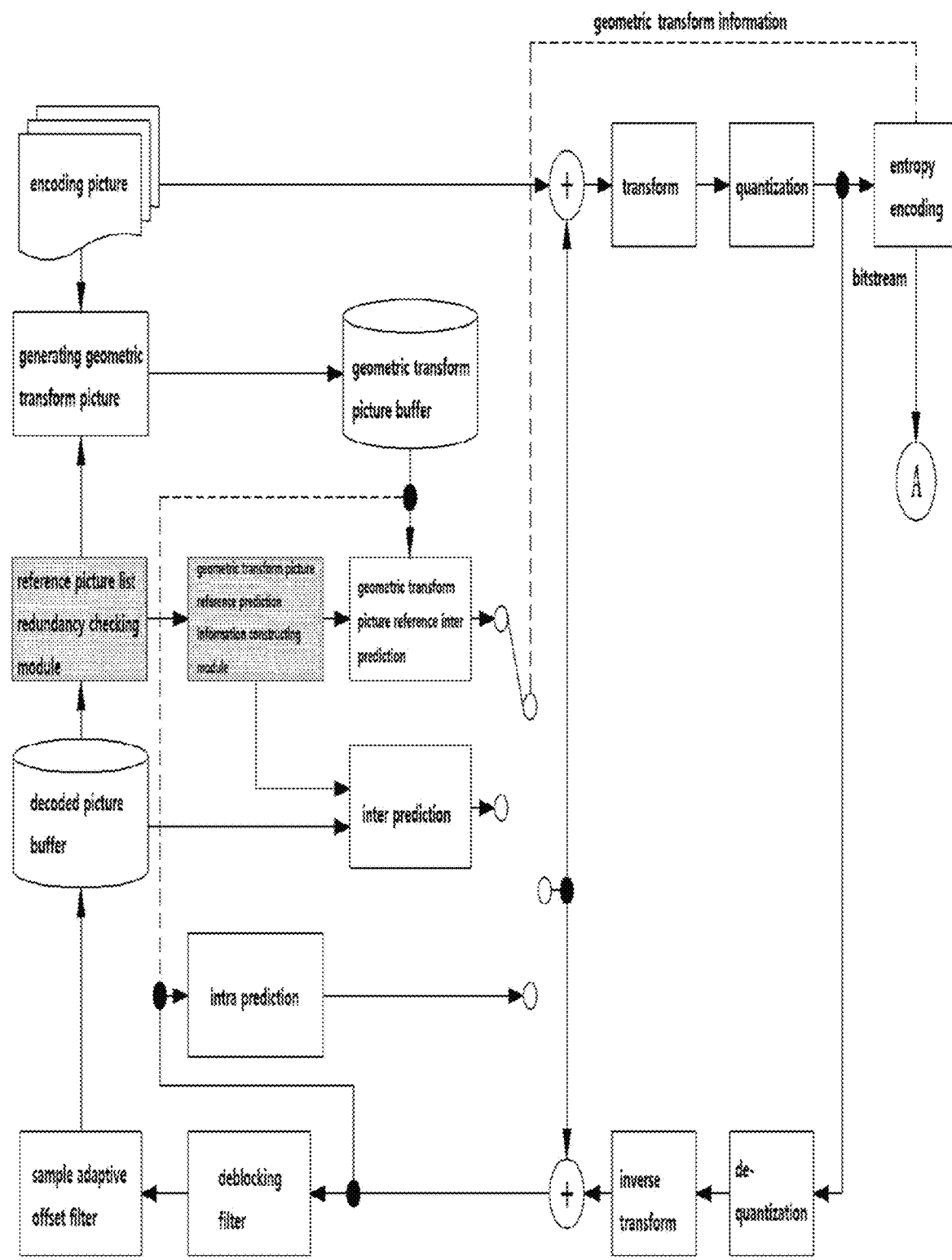
FIGS. 49A and 49B are block diagrams illustrating a configuration of an encoder/decoder using a geometric transform picture according to another embodiment of the present invention.
Figure 49B:
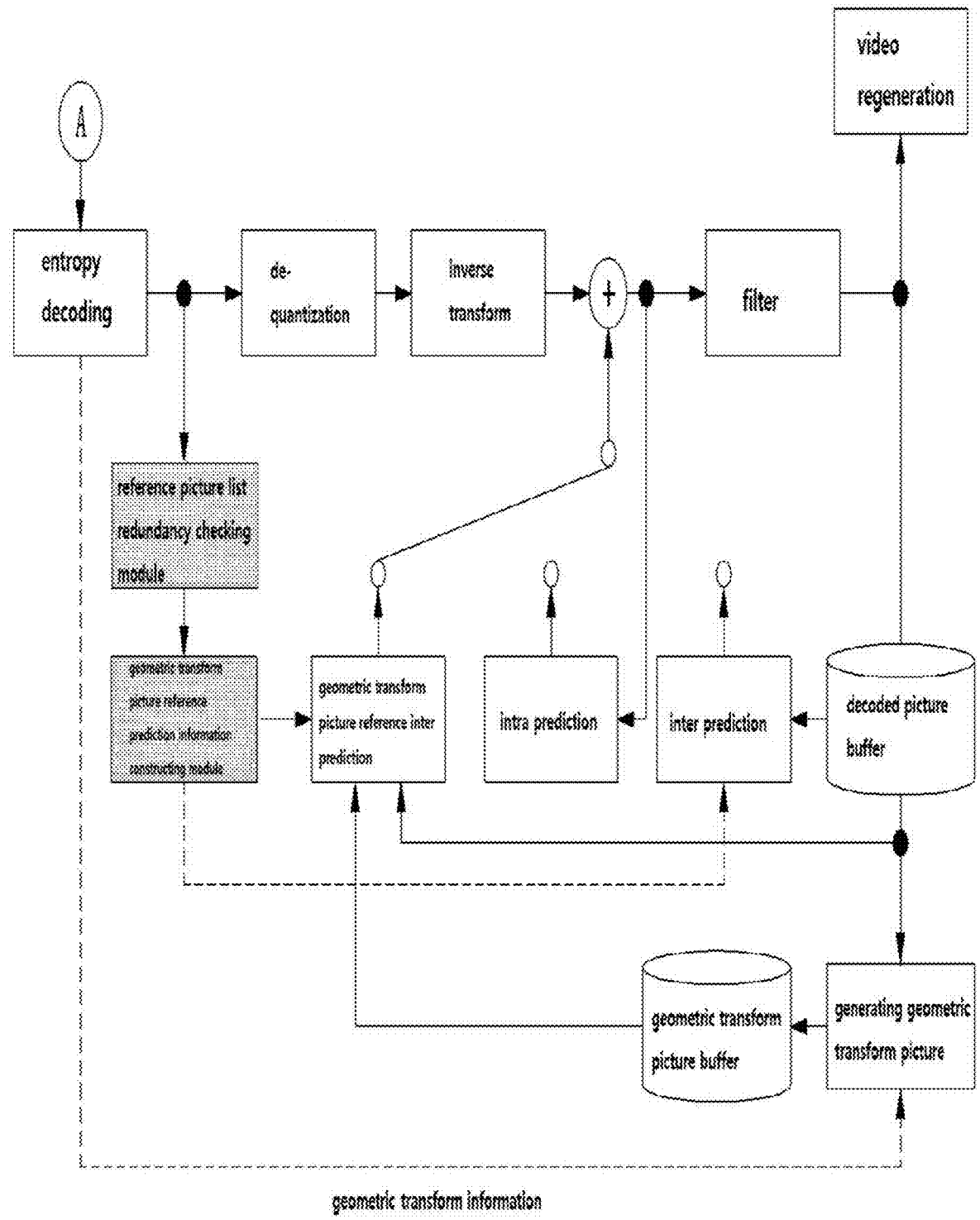

FIG. 49a and FIG. 49b are block diagrams showing a configuration of an encoder/decoder using a geometric transform picture according to another embodiment of the present invention.

The reference picture list redundancy checking module of the encoder and/or decoder may check redundant reference picture lists from prediction information such as a decoded picture buffer (DBP) or a reference picture set (RPS), thereby checking whether the reference picture list is overlapped.

The geometric transform picture reference prediction information constructing module of the encoder may not derive the prediction information for the geometric transform picture when there is a redundant reference picture list. In addition, the geometric transform picture reference prediction information constructing module may fetch prediction information from the same reference picture of another reference picture list having a redundant relation and set the same as prediction information for the geometric transform picture.

The geometric transform picture reference prediction information constructing module of the decoder may not receive the prediction information for the geometric transform picture when there is a redundant reference picture list. In addition, the geometric transform picture reference prediction information constructing module may fetch prediction information from the same reference picture of another reference picture list having a redundant relation and set the same as prediction information for the geometric transform picture.

On the other hand, various units such as a picture unit, a slice unit, and a tile unit may be implemented.

According to an embodiment of the present invention, it is possible to remove redundancy of geometric transform picture prediction information in a video encoder/decoder using a geometric transform picture. In addition, the redundant prediction process may be omitted. Also, the current geometric transform picture prediction information may be fetched from the redundant geometric transform picture prediction information. In addition, when constructing the current geometric transform picture index information, the index information of the reference picture used in generating the geometric transform picture may be used.

In addition, when the reference picture used for generating the geometric transformed reference picture is the same for the reference picture list having the same structure and order of the reference picture as the current reference picture list, geometric transform pictures are also determined to be the same.

Also, prediction information referring to a redundant geometric transform picture may be fetched and used as prediction information for the current geometric transform picture.

In addition, inter prediction referring to a redundant geometric transform picture may be omitted.

According to the present invention, it is possible to omit transmission/reception of redundant geometric transform information in video encoding/decoding and omit generation of redundant geometric transform pictures. Through the above process, the coding efficiency of the video encoder/decoder may be increased and the complexity may be reduced.

Figure 50:
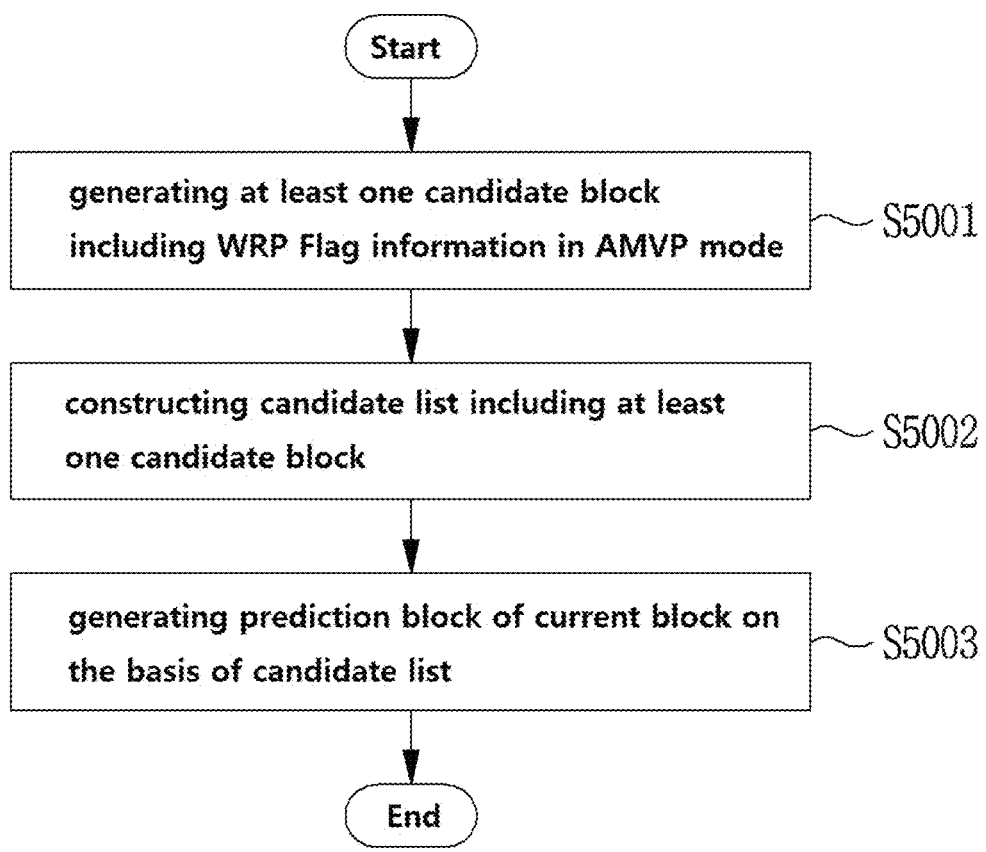
FIG. 50 is a flowchart illustrating an image encoding method according to an embodiment of the present invention.

FIG. 50 is a flowchart illustrating a video encoding method according to an embodiment of the present invention.

Referring to FIG. 50, at least one candidate block including warped reference picture (WRP) flag information may be generated in an advanced motion vector prediction (AMVP) mode (S5001).

In addition, a candidate list including the at least one candidate block may be constructed (S5002).

Meanwhile, the WRP Flag information may be compared between candidate blocks having the same motion information.

Meanwhile, it may be determined whether the candidate block and the current block refer to the WRP.

Meanwhile, the priority among the candidate blocks may be determined on the basis of the WRP Flag information of the current block.

Meanwhile, a new candidate block may be generated by changing the WRP Flag value of the at least one candidate block generated.

Meanwhile, when there is a zero vector candidate in the candidate list, a new zero vector candidate may be generated by changing the WRP Flag value of the zero vector candidate.

Meanwhile, when the WRP Flag values of the candidate block and the current block are the same, motion information scaling may not be performed.

In addition, a prediction block of the current block may be generated on the basis of the candidate list (S5003).

Figure 51:
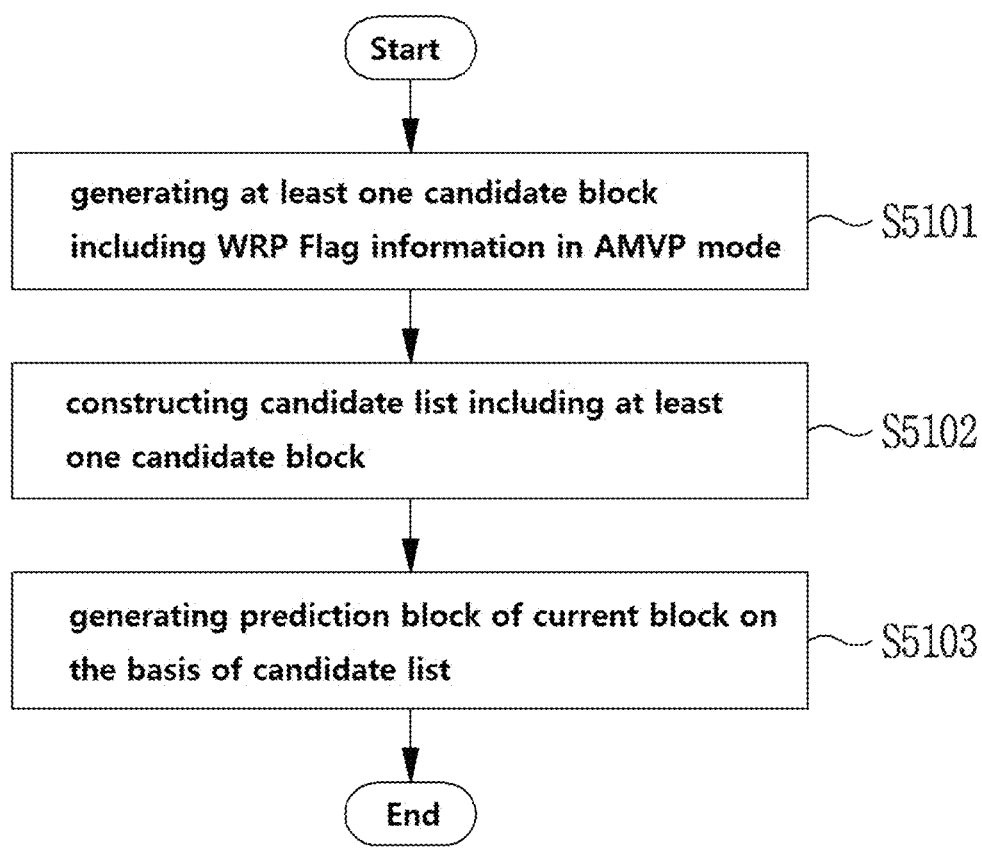
FIG. 51 is a flowchart illustrating a video decoding method according to an embodiment of the present invention.

FIG. 51 is a flowchart illustrating a video decoding method according to an embodiment of the present invention.

Referring to FIG. 51, at least one candidate block including warped reference picture (WRP) flag information may be generated in an advanced motion vector prediction (AMVP) mode (S5101).

In addition, a candidate list including the at least one candidate block may be constructed (S5102).

Meanwhile, WRP Flag information may be compared between candidate blocks having the same motion information.

Meanwhile, it may be determined whether the candidate block and the current block refer to the WRP.

Meanwhile, the priority among the candidate blocks may be determined on the basis of the WRP Flag information of the current block.

Meanwhile, a new candidate block may be generated by changing the WRP Flag value of the at least one candidate block generated.

Meanwhile, when there is a zero vector candidate in the candidate list, a new zero vector candidate may be generated by changing the WRP Flag value of the zero vector candidate.

Meanwhile, when the WRP Flag values of the candidate block and the current block are the same, motion information scaling may not be performed.

In addition, a prediction block of the current block may be generated on the basis of the candidate list (S5103).

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or greater. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or greater. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used for encoding/decoding a video.

The invention claimed is:

1. A decoding method comprising:
generating a prediction block for a current block; and
generating a reconstructed block for the current block using the prediction block, wherein
a list comprising a plurality of candidates for inter prediction for the current block is generated,
motion information of one or more neighboring blocks of the current block are added to the list as the plurality of the candidates,
an additional candidate is added to the list in a case that the number of candidates in the list is less than a predetermined number,
the additional candidate is generated based on information for a L0 prediction of an existing candidate in the list and information for a L1 prediction of the existing candidate, and
an index indicating a reference picture of the additional candidate is the same as an index indicating a reference picture of the existing candidate.

2. The decoding method of claim 1, wherein
the prediction block is generated based on warping for a reference image.

3. The decoding method of claim 2, wherein
motion information for the current block used to generate the prediction block is generated based on motion information in a list comprising a plurality of motion information.

4. The decoding method of claim 1, wherein
the prediction block is generated based on motion information for a current block and a geometric transformation.

5. The decoding method of claim 4, wherein
the geometric transformation includes at least one of enlargement, reduction and rotation.

6. The decoding method of claim 4, wherein
the geometric transformation is used in a mode which use a motion vector predictor.

7. The decoding method of claim 4, wherein
the geometric transformation is used in a merge mode.

8. The decoding method of claim 4, further comprising:
acquiring geometric transformation usage information, wherein
the geometric transformation usage information indicates whether the geometric transformation is used for a specific unit comprising the current block.

9. The decoding method of claim 8, wherein
the specific unit is a coding unit.

10. An encoding method comprising:
generating a prediction block for a current block; and
generating a reconstructed block for the current block using the prediction block, wherein
a list comprising a plurality of candidates for inter prediction for the current block is generated,
motion information of one or more neighboring blocks of the current block are added to the list as the plurality of the candidates,
an additional candidate is added to the list in a case that the number of candidates in the list is less than a predetermined number,
the additional candidate is generated based on information for a L0 prediction of an existing candidate in the list and information for a L1 prediction of the existing candidate, and
an index indicating a reference picture of the additional candidate is the same as an index indicating a reference picture of the existing candidate.

11. The encoding method of claim 10, wherein
the prediction block is generated based on warping for a reference image.

12. The encoding method of claim 11, wherein
motion information for the current block used to generate the prediction block corresponds to motion information in a list comprising a plurality of motion information.

13. The encoding method of claim 10, wherein
the prediction block is generated based on motion information for a current block and a geometric transformation.

14. The encoding method of claim 13, wherein
the geometric transformation includes at least one of enlargement, reduction and rotation.

15. The encoding method of claim 13, wherein
the geometric transformation is used in a mode which use a motion vector predictor.

16. The encoding method of claim 13, further comprising:
generating geometric transformation usage information, wherein
the geometric transformation usage information indicates whether the geometric transformation is used for a specific unit comprising the current block.

17. A non-transitory computer-readable medium storing a bitstream generated by the encoding method of claim 10.

18. A non-transitory computer-readable medium storing a bitstream, the bitstream comprising:
encoded image information;
wherein decoding for a current block is performed using the encoded image information,
a prediction block for the current block is generated,
a reconstructed block for the current block is generated using the prediction block,
a list comprising a plurality of candidates for inter prediction for the current block is generated,
motion information of one or more neighboring blocks of the current block are added to the list as the plurality of the candidates,
an additional candidate is added to the list in a case that the number of candidates in the list is less than a predetermined number,
the additional candidate is generated based on information for a L0 prediction of an existing candidate in the list and information for a L1 prediction of the existing candidate, and
an index indicating a reference picture of the additional candidate is the same as an index indicating a reference picture of the existing candidate.

* * * * *